(12) United States Patent
Akey et al.

(10) Patent No.: US 12,552,045 B2
(45) Date of Patent: Feb. 17, 2026

(54) COLLABORATIVE ROBOT CUTTING SYSTEM AND METHOD

(71) Applicant: Vectis Automation, LLC, Loveland, CO (US)

(72) Inventors: Andrew Akey, Windsor, CO (US);
Joshua Pawley, Windsor, CO (US);
Douglas Rhoda, Fort Collins, CO (US);
Alex Roerty, Berthoud, CO (US); Todd Scarpella, Fort Collins, CO (US)

(73) Assignee: Vectis Automation, LLC, Loveland, CO (US)

( * ) Notice: Subject to any disclaimer, the term of this patent is extended or adjusted under 35 U.S.C. 154(b) by 581 days.

(21) Appl. No.: 17/942,213

(22) Filed: Sep. 12, 2022

(65) Prior Publication Data

US 2023/0085100 A1    Mar. 16, 2023

Related U.S. Application Data

(60) Provisional application No. 63/243,189, filed on Sep. 12, 2021.

(51) Int. Cl.
| | |
|---|---|
| *G06F 17/00* | (2019.01) |
| *B23Q 15/12* | (2006.01) |
| *B25J 11/00* | (2006.01) |
| *B25J 19/06* | (2006.01) |

(52) U.S. Cl.
CPC ........... *B25J 11/0055* (2013.01); *B23Q 15/12* (2013.01); *B25J 19/06* (2013.01); *G05B 2219/35098* (2013.01); *G05B 2219/39001* (2013.01)

(58) Field of Classification Search
CPC ...... B25J 11/0055; B25J 19/06; B25J 9/1674; B25J 9/1676; B23Q 15/12; G05B 2219/35098; G05B 2219/39001; G05B 2219/40202

USPC ........................................................ 700/255
See application file for complete search history.

(56) References Cited

U.S. PATENT DOCUMENTS

| | | | |
|---|---|---|---|
| 8,497,447 B2* | 7/2013 | Heiml .................... | B23P 21/00 219/121.41 |
| 10,259,070 B1* | 4/2019 | Pfaff ...................... | B23K 10/00 |
| 10,373,304 B2* | 8/2019 | Becker ................... | H04N 23/56 |
| 11,084,117 B1* | 8/2021 | Pfaff ...................... | B23K 26/38 |

(Continued)

FOREIGN PATENT DOCUMENTS

| | | | | |
|---|---|---|---|---|
| CA | 3036127 A1 * | 3/2018 | ............ | B28B 1/001 |
| CA | 2340130 A1 * | 6/2019 | | |

(Continued)

OTHER PUBLICATIONS

Robotic Welding—Automate With Collaborative Robots (Year: 2025).*

*Primary Examiner* — Ronnie M Mancho
(74) *Attorney, Agent, or Firm* — Glenn H. Lenzen; Elevated IP, LLC

(57) ABSTRACT

A collaborative robot cutting system for the assembly, construction, fabrication, and/or the completion of structural components for manufactured assemblies. A method of preparing work pieces and materials for further manufacturing operations employing the intuitive graphical interactive programming features of a robot cutting system user interface to enhance productivity and versatility in high mix, low volume fabrication environments with minimal operator training.

19 Claims, 50 Drawing Sheets

(56) References Cited

U.S. PATENT DOCUMENTS

| | | | | |
|---|---|---|---|---|
| 2010/0044350 A1* | 2/2010 | Heiml | ............... | B23K 37/047 |
| | | | | 228/103 |
| 2018/0071949 A1* | 3/2018 | Giles | ............... | B28B 1/001 |
| 2022/0040780 A1* | 2/2022 | Pfaff | ............... | G05B 19/19 |
| 2024/0261909 A1* | 8/2024 | Akey | ............... | B25J 11/005 |

FOREIGN PATENT DOCUMENTS

| | | | | | |
|---|---|---|---|---|---|
| CN | 201342671 Y | * | 11/2009 | | |
| CN | 104057209 B | * | 1/2016 | ......... | B23K 37/0229 |
| CN | 106078208 A | * | 11/2016 | ............ | B23P 23/00 |
| CN | 205798934 U | * | 12/2016 | | |
| CN | 106449867 A | * | 2/2017 | ........... | H10F 71/137 |
| CN | 109940323 A | * | 6/2019 | | |
| CN | 110039216 A | * | 7/2019 | | |
| CN | 110899417 A | * | 3/2020 | | |
| CN | 210703200 U | * | 6/2020 | | |
| CN | 210804972 U | * | 6/2020 | | |
| CN | 111702486 A | * | 9/2020 | ............ | B23P 23/00 |
| CN | 112192005 A | * | 1/2021 | ............ | B23K 9/28 |
| CN | 216576258 U | * | 5/2022 | | |
| CN | 221363186 U | * | 7/2024 | | |
| WO | WO-2019113618 A1 | * | 6/2019 | ............ | B25J 9/163 |

* cited by examiner

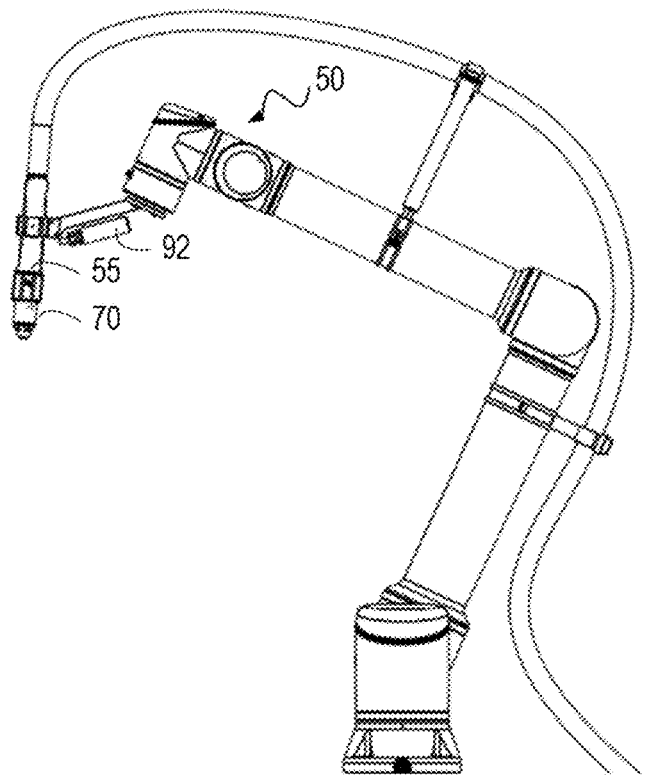
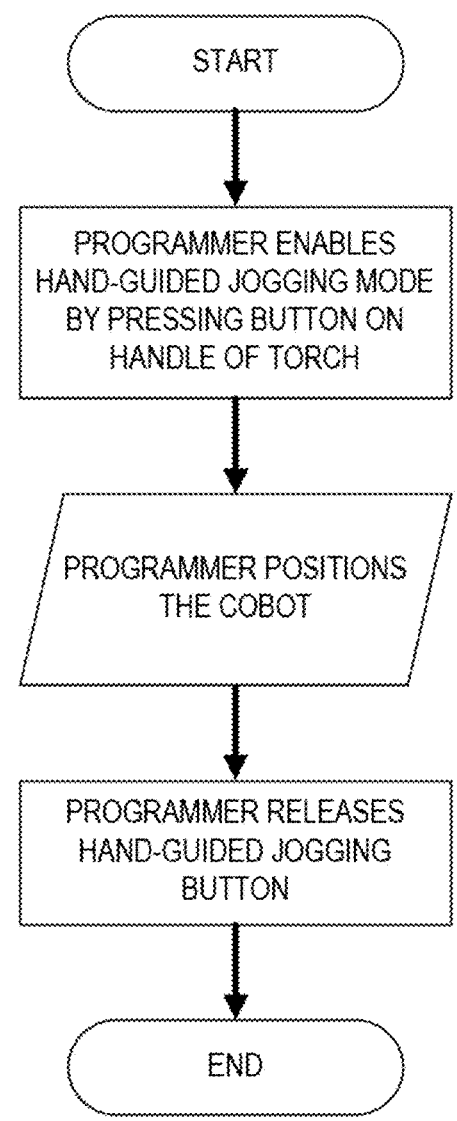
FIG. 20-A     FIG. 20-B

COLLABORATIVE ROBOT CUTTING SYSTEM AND METHOD

CROSS-REFERENCE TO RELATED APPLICATIONS

This application claims priority to U.S. Provisional Patent Application Ser. No. 63/243,189 filed on Sep. 12, 2021, the entire contents of which are incorporated herein by reference

FIELD OF THE INVENTION

The present invention relates generally to cutting systems. More specifically, the present invention relates to robot cutting systems, and in particular to robot cutting cell units. In particular, the present invention relates to a readily re-deployable collaborative robot cutting system adaptable for intuitive programming and operation by an operator without requiring specialized and extensive training and a method for fabricating workpieces of various metals having precisely cut shapes and edges therewith.

BACKGROUND OF THE INVENTION

The fabrication of assemblies formed of metal structural elements and components having complex non-linear joint surfaces and edges requires the preparation and processing of the structural elements, for example, beveling the edges thereof, by skilled metal processing workers or by using complex, highly-automated systems designed to generate the precise edges mandated for quality joint fit up. The structural components may be manufactured using both ferrous and non-ferrous base metal alloys. The physical properties, chemical composition, sensitivity to oxidation and heat transfer characteristics of various alloys demand close attention to materials processing techniques used to fabricate a wide variety of structures and products. As noted above, joint fit up is critical to the fabrication of multicomponent products, particularly to the fabrication of multicomponent products that are adaptable to automated, high-volume production processes. Completed structures may be assembled by using mechanical fasteners, adhesives, materials joining techniques such as welding and brazing or a combination of some or all of the foregoing. Exemplary structures extend at one end of the spectrum from commonplace household appliances, furniture, exercise and lawn maintenance equipment to expensive and sophisticated space and airborne platforms, military equipment, scientific apparatus, chemical processing systems and medical devices fabricated from exotic metals. The list is endless.

Welding engineering is a highly-specialized discipline which requires knowledge of not only structures, materials and manufacturing processes, but also knowledge of specific materials cutting processes and parameters including weld joint configuration and preparation, cutting process selection, preheat and post heat requirements as needed to prevent cracking, and other variables. A knowledgeable and experienced metal processing worker such as a machinist or a welder may assess the requirements of a particular job based upon prior experience and may adjust one or more of the foregoing parameters to achieve the desired edge configuration with the precision required for proper assembly. However, a less experienced individual may not be able to set up a cutting job without performing trial and error runs on test pieces, a process which is time consuming, inefficient, and costly.

Among the numerous metal cutting processes used in the metal fabrication industry, three thermal energy processes are used extensively: flame cutting, more commonly referred to as oxyfuel gas cutting or oxyacetylene cutting, plasma cutting and laser cutting. The choice of process depends upon the material composition, thickness, and other variables. High pressure water jet cutting processes are also employed to cut metals and non-metallic materials that prove difficult to cut with other tools or processes. Cutting with a waterjet is capable of generating a smooth edge without producing a heat affected zone extending along the edge surface.

In the oxyacetylene cutting process, a torch is used to heat steel to its autoignition temperature. A stream of oxygen is then focused via a nozzle in the torch onto the metal, forming a metal oxide that flows out of the kerf as slag or dross. The oxidation of iron by this method is highly exothermic, and once the process is initialed, it is self-sustaining so long as sufficient heat and focused oxygen flow is provided. The oxyacetylene process is not used to cut non-ferrous metals such as aluminum, titanium, or stainless steels. Preferably, these materials are cut using the plasma cutting process using air, argon, oxygen, or nitrogen heated electrically to generate a high-pressure focused plasma jet or using the laser cutting process in which laser energy provides the source of heat for melting the substate metal. Both processes use a focused high-pressure flow of a suitable gas such as nitrogen to produce precise clean edges.

The afore-mentioned automated processes may be used in connection with work-holding fixtures, cutting torch positioners and robot systems that can be programmed for specific cutting applications. Nonetheless, if an operator enters incorrect parameter settings or fails to notice technical process irregularities during the course of producing a cut, inevitably, scrap and rework will be the result.

Various attempts to minimize cutting parameter selection and input errors include the use of pre-prepared tables or mathematical equations to aid an operator in calculating setup parameters. Advances in process control technology include the integration of a graphical user interface into a cutting power supply control system and user interface and display systems having a processors which receive and analyze the power supply parameter settings in real time during a process cycle. The display is configured to send a pictograph warning graphically to the system operator in response to the detection of maladjustment in a parameter setting. While such control systems have been important contributions to the manufacturing industry, these and other prior art systems require complex off-site programming and operator training to properly set up and operate the systems. These systems are further limited by high capital acquisition costs and limited versatility for use across multiple and diverse applications.

As noted above, automated robot and positioning systems controlled by computer software programs have displaced manual cutting, machining and welding fabrication operations in many industries. Analogous to CAD/CAM machine tool equipment, automatic robot cutting and welding systems are designed to minimize or completely eliminate the variables associated with manual operations, reduce the tedium associated with repetitive tasks, and enhance productivity and efficiency. In addition to the foregoing, typically, automated cutting systems include a work holding table or positioner and a device such as an extendable boom or a robot arm which holds the cutting implement such as an oxyacetylene or plasma torch or laser cutting implement. Either or both of these positioning and implement holding devices may be programmed to rotate about or translate along one or more axes to define a cutting path and may include multiple workstations which permit cutting of a first workpiece at one station while an operator removes a completed component and sets up a new work piece at a different station.

Depending upon the application, automated robot cutting systems can be massive assemblies requiring substantial acquisition and installation capital expenditures, dedicated floor space, safety systems, utility inputs for electrical power, hydraulics and/or cooling water; and overhead cranes or lateral material conveyance systems for work material and finished assembly transport. Although such systems may be designed for smaller manufacturing operations and may be moved from one location to another via forklift and pickup truck, a typical cutting station or cell is not amenable for use with different cutting systems (oxyacetylene, plasma or laser, for example), high mix, low volume production, or movement within a manufacturing facility without potentially disrupting other operations.

Materials processing operations such as machining, cutting and welding are so precise and the risks of property loss and/or personal injury to users of the end product structures and assemblies so pervasive in modern society are sufficiently high, that the setup and identification of the input variables in both manual and computer-controlled robot cutting operations, as well as the execution of the cutting process applicable to a given application, require manual input, a process that draws upon the skills and experience of the individual operator performing the task. However, a severe lack of skilled workers in today's workforce presents yet another challenge to meeting the demands of a highly consumptive economy. For example, in the cutting and welding field, the American Welding Society estimates the average age of a welder to be 54 years old. The number of active welders is decreasing at a rate that is significantly higher than the entry rate of new welders into the field, and a potential shortage of approximately 400,000 welders in the United States is project to exist by 2025. The situation is further exacerbated by socio-economic societal changes brought about by the expectations and demands of younger generations for higher paying jobs in what are viewed as the "high tech" fields of computer science, programming, communications and information technology and the like. Traditional jobs in manufacturing, agriculture, foundries and mining are now viewed as less desirable or have migrated off-shore.

Consequently, manufacturers are under tremendous stress to increase manufacturing productivity through automation but currently have only risky and costly options to do so. Traditional robotic system solutions are a significant financial risk, bulky and expensive, with long delivery times, significant set-up time and cost, and what operations managers view as "well, no-turning-back now" risk. While larger corporations may be able to bear the cost and risk of traditional automation, the smaller shops that make up 75% of America's 250,000+ manufacturers are prohibited by the high capital investment requirements from availing themselves of the advantages offered by either partially or fully automated systems.

In view of the above, it is evident on the one hand that demands in the cutting and welding industry for reliable, consistent and repeatable materials processing and fabrication processes may be satisfied by sophisticated and very costly automated systems that minimize the potentially adverse and unpredictable effects of human and process variables on weld quality. However, conflicting demands for relatively inexpensive, mobile and versatile systems capable of producing end products and components therefor of the highest quality that may also be set up and operated by less experienced individuals in high mix, low volume production environments create a tension in the manufacturing industry that heretofore has not been addressed by prior art systems. Accordingly, it will be apparent to those skilled in the art from this disclosure that a need exists for a collaborative robot materials cutting system that can be set up and programmed intuitively by an operator without the need for significant computer programming and coding training. A need also exists for a readily re-deployable and transportable automated cutting system that may be installed in a manufacturing operation and moved from one worksite to another without significant labor or rigging or substantial acquisition and installation capital expenditures, dedicated floor space, or ancillary internal support and operating systems The present invention addresses aforementioned needs in the art as well as other needs, all of which will become apparent to those skilled in the art from the accompanying disclosure.

SUMMARY OF THE INVENTION

In accordance with the embodiments of the present invention, a collaborative robot cutting system is disclosed for performing cutting tasks related to the initial cutting operations for producing precise structural components for application in the assembly, construction, fabrication and/or completion of assembled products.

In an embodiment, the collaborative robot cutting system contains a control system which enables an operator or a programmer to guide the robot to a preselected position in a cutting path by hand.

In another embodiment the collaborative robot cutting system includes a user interface or a teach pendant adapted to allow programming to be completed in an intuitive and graphical manner without requiring significant and specific education, training or computer programming and coding experience or skills.

In yet another embodiment, a highly-mobile collaborative robot cutting system includes a mobile base having a gridded worksurface, the mobile base being adapted to be relocated without significant labor and/or rigging to bring the cutting system to the work.

In still another embodiment, a highly-mobile collaborative robot cutting system includes a collaborative robot cutting arm, a mobile base including a bottom or lower platform adapted to stow and transport cutting system accessory equipment, and an upper cantilevered extended support member adapted to mount the collaborative robot cutting arm, the mobile base being adapted to be relocated without significant labor and/or rigging to bring the cutting system to the work.

In an embodiment, the extended support member is a cantilevered beam.

In another embodiment, a highly-mobile collaborative robot cutting system includes a collaborative robot cutting arm, an extended mobile base including a bottom or lower platform adapted to stow and transport cutting system accessory equipment, and an upper cantilevered arm or beam adapted to mount the collaborative robot cutting arm, the extended mobile base being adapted to be relocated without significant labor and/or rigging to bring the cutting system to the work.

In still another embodiment, a highly-mobile collaborative robot cutting system includes a collaborative robot cutting arm, an extended mobile base including a bottom or lower platform adapted to stow and transport cutting system accessory equipment, and an upper cantilever arm or beam adapted to mount the collaborative robot cutting arm, wherein the cantilevered arm or beam is selectively rotatable about an axis to bring the cutting system to the work without moving the mobile base.

In yet another embodiment, a highly mobile collaborative robot cutting system includes an extended mobile base, the extended mobile base being adapted to be relocated without significant labor and/or rigging to bring the cutting system to the work.

In still another embodiment, a collaborative robot cutting system includes a programmable robot arm having a preselected reach distance, the programmable robot arm being adapted to hold a cutting implement.

In another embodiment, the collaborative robot cutting system and mobile base are adapted to be positioned adjacent separate preexisting fixtures within the reach distance of the programmable cutting arm, whereby cutting operations are performed on materials on the adjacent separate fixtures.

In yet another embodiment, a collaborative robot cutting system includes a programmable robot arm having a cam lock mechanism mounted on a magnetic base.

In another embodiment, the programmable collaborative robot arm includes a built-in safety in the robot arm itself.

In another embodiment, the collaborative robot cutting system and mobile base include a safety system which permits the collaborative cutting system to be operated at a faster speed under predetermined conditions which are safe for an operator and which reduces the system operating speed in accordance with recognized safety standards in response to conditions detected by the safety system.

In still another embodiment, the collaborative robot cutting system includes a corner-mounted operator protection safety system mounted in a mobile base.

In yet another embodiment, a collaborative robot cutting system provides increased operator safety by placing the operator at a position removed from the site of cutting fume generation, assisting with, or eliminating potentially fatiguing and injurious repetitive lifting procedures and out-of-position tasks.

In another embodiment, a collaborative robot cutting system provides enhanced production efficiency by allowing an operator to set up and complete more tasks through parallel and simultaneously performed operational steps and by shifting repetitive, monotonous cutting tasks to the collaborative robot cutting system.

In an embodiment, a collaborative cutting system includes a gridded worktable adapted to receive and secure work material and work holding fixtures thereto.

In still another embodiment, a method for cutting materials using a collaborative robot cutting system is disclosed in accordance with the present invention.

In an embodiment, a collaborative robot cutting system is disclosed for performing cutting tasks related to cutting materials of various shapes and thicknesses.

These and other features, aspects and advantages of the present invention will become apparent to those skilled in the art from the following detailed description of preferred embodiments taken in connection with the accompanying drawings, which are summarized briefly below.

BRIEF DESCRIPTION OF THE DRAWINGS

Referring now to the attached drawings which form a part of this original disclosure:

FIG. 20-A is a perspective view of a collaborative robot arm in accordance with an embodiment;

FIG. 20-B is a flow diagram illustrating the process workflow steps of the hand, guided jogging movement of the robot arm;

DETAILED DESCRIPTION OF THE PREFERRED EMBODIMENTS

Figure 1:
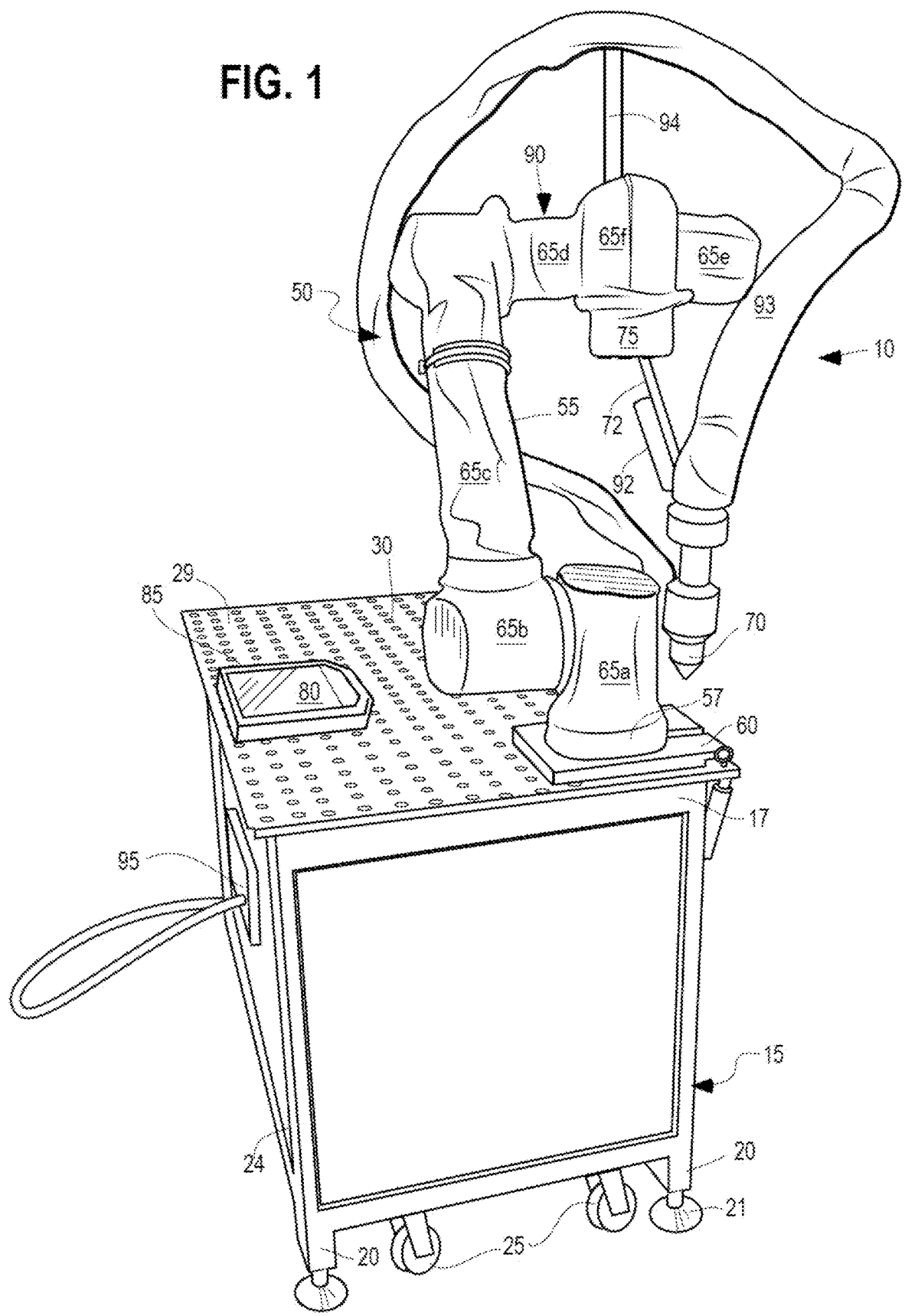
FIG. 1 is a right top perspective view of the elements of a collaborative robot cutting system having a mobile base in accordance with an embodiment of the present invention.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claim and its equivalents.

Overview of System for Cutting

First, the operator/programmer either brings the work materials to be cut to the collaborative robot or, alternatively, brings the robot to the work material. If the collaborative robot is taken to the work material, the cutting system, by way of example and not of limitation a plasma cutting machine, is plugged into available single phase or three phase wall power, and the collaborative robot is plugged into an available 120V outlet. Once both devices are powered on, the operator/programmer starts positioning the collaborative robot for the work material to be plasma cut. The first positions that the operator/programmer will teach are clearance AirMove's to position the robot in preparation for the cutting. The primary means of moving the collaborative robot and the cutting torch to the work material is via the programming button that releases the robot into a hand-guided jogging fashion where the operator/programming can push/pull the robot into the appropriate position. When the operator/programmer starts positioning the collaborative robot, he/she ensures they have a cutting or assembly print that will be used to identify shape and location of the cutting to be performed on the work material. If the desired work material will vary in positional location or the collaborative robot is moved to the work material, tactile searching/sensing is needed to ensure the trajectory of the collaborative robot is properly placed in the joint considering this variation. If one of these conditions exists, the operator/programmer plans out the searching scheme and where the offsets will be needed for the cutting operation that will be performed on the work material. If searches are needed, the operator/programmer zeros out these searches treating this part as the baseline part for correlation of searches to all subsequent cut templates. Once the operator/programmer has added in searches and appropriate offset activation, the appropriate cut templates can be added. Each of these cuts may be a shape cut such as a slot, square, rectangle, circle, etc. or a free multisegmented path cut based on the cutting or assembly print. These various types of cuts will be added using the build in programming tools for each particular type of cut that is added.

The cutting system includes a shape library that enables the operator/programmer to precisely teach one of the stored shape cuts with imputed parameters such as width, length, and radius. Once the cuts have been added to the program, the operator/programmer chooses the required cutting process. If the appropriate cutting process is not in the system, the process will be developed using an existing set of data that is adjusted by slowing down or speeding up while adjusting amperage based on the thickness. This process of adding searches, if needed, and cut templates is repeated for all necessary cuts across the work material to be cut.

Between each of these sets of searches and cut templates, any necessary AirMove's will be added for clearance or conduit bundle cable management. Once all necessary moves have been added to the collaborative robot, the operator/programmer saves the program in the robot for future repetitive use. In either case where the work material was brought to the collaborative robot or the robot was taken to the work material, the position of the robot relative to the work material must be recorded or outlined on the floor.

Figure 2:
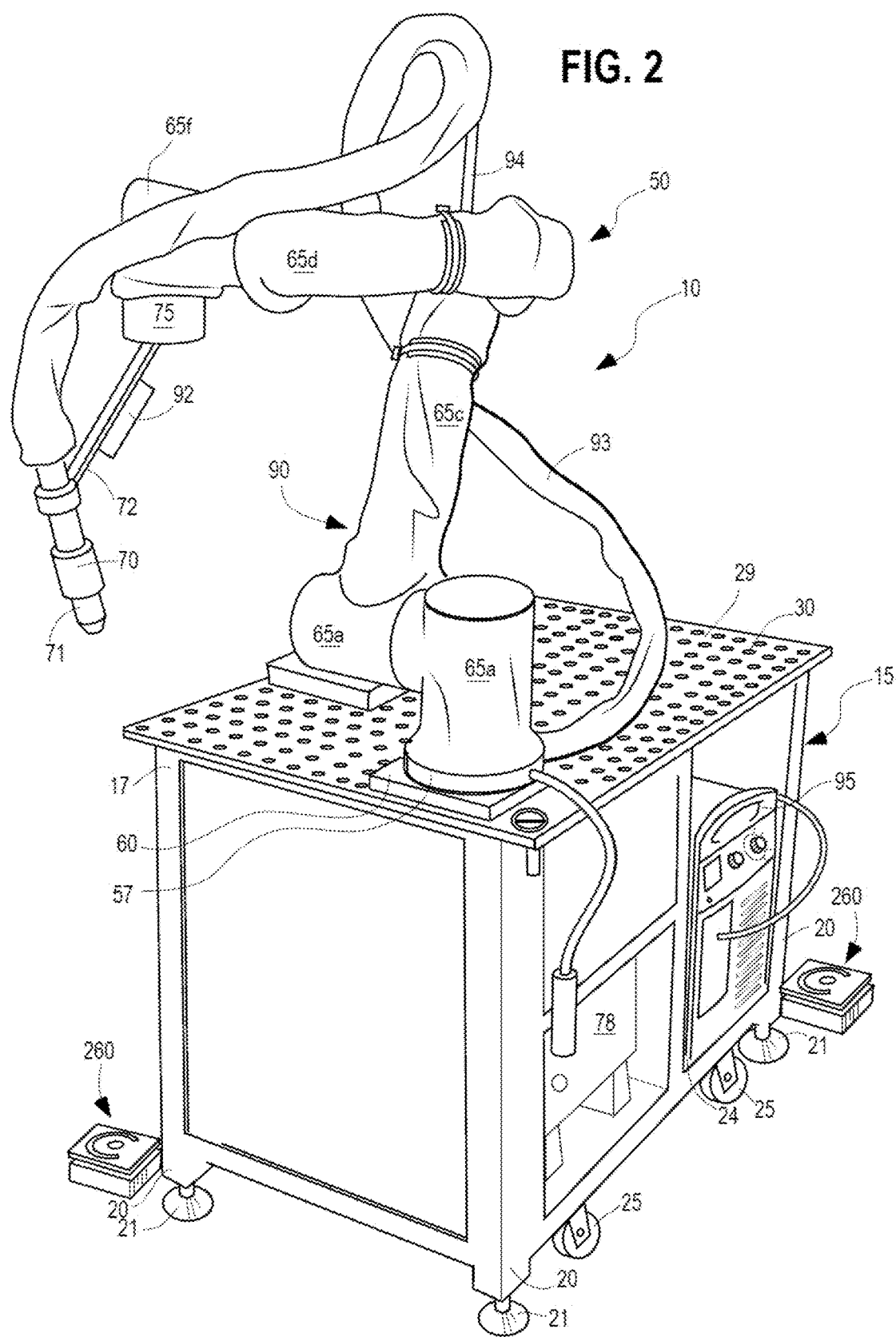
FIG. 2 is a rear top perspective view of the collaborative robot cutting system of FIG. 1 in accordance with an embodiment of the present invention.

Referring initially to FIGS. 1 and 2, an exemplary collaborative robot cutting system, referred to hereinafter as the cutting system for purposes of brevity, is shown generally at the numeral 10. The cutting system includes a mobile worktable, base or cart 15, as the terms may be used interchangeably herein, having a frame 17, a plurality of supporting legs 20, each including a levelling device or foot 21 attached thereto, a storage area or platform 24 having wheels or casters 25 mounted to a bottom surface 27 thereof (FIG. 3), and a gridded upper work surface or table 29. The upper work surface includes a plurality of apertures 30 formed therein, each of the apertures being adapted to releasably receive a clamp or other securement device for holding a workpiece, fixture or assembly in a fixed position during the performance of a cutting sequence using the cutting system.

The cutting system 10 further includes a collaborative robot system 50 (known in the art as a cobot), such as a Universal Robots™ UR10e collaborative industrial robot. However, it is to be understood that collaborative robot systems either specifically designed and built for individual applications or other generally commercially available collaborative robot systems may also be used without departing from the scope of the present invention. The collaborative robot system comprises a robot arm 55 operatively connected to a base 57, which, in turn, is mounted on an electrically isolating pad 60 secured by suitable fasteners 62 to the upper work surface 29. As best seen in FIG. 2, the robot arm includes a plurality of arm segments 65a-65f sequentially pivotally and/or rotatably interconnected to one another and structured and arranged to have a reach length or distance which depends upon the size of the robot arm selected for use in the system 50 and the lengths of its individual segments. A safety feature (not shown) is built into the control system and the robot arm and is structured and arranged to interrupt movement of the arm, should it come in contact with the operator or another object. A cutting implement or torch 70 is secured via an attachment 72 to a distal end 75 of the robot arm, the implement being universally positionable and translatable along a preselected cut path in response to instructions from a robot controller 78, teach pendant 80 and application programming interface (API) display 85. In the embodiment of FIGS. 1-2, by way of example and not of limitation, the implement 70 is depicted in the form of a cutting torch and cutting nozzle 71 representative of the type used in plasma cutting processes; however, it is to be understood that the system of the present invention may be used with any cutting process without departing from the scope of the present invention. The members of the collaborative robot system 50 are covered by a protective material or shield wrap 90 to protect the elements thereof from spatter generated by cutting operations.

A programming or hand-guided jog button 92 is secured to the attachment 72 and is operatively connected to the robot controller 78 and teach pendant 80 and, as will be described in greater detail below, is adapted to allow an operator to set up and program the cutting system in an intuitive and graphical manner. Compressed air and cutting consumables such as cutting gas are delivered from a central gas supply system or from individual gas cylinders along with electrical power cables via a torch bundle 93 supported by support arm or bracket 94 secured to the robot arm to the cutting nozzle 71, as is known in the art. Power is provided to the cutting implement via power supply 95, and the power supply, robot controller, teach pendant, and any ancillary power tools an operator may need all may be operatively connected to single phase power, for example, 120V power for the collaborative robot system and 240V power for the power supply. Optionally, the power supply may be connected to 208V, 480V or 575V three phase power.

The availability of conventional shop power combined with the portability of the worktable contribute to the overall flexibility and adaptability of the cutting system. It can be brought to the location of the work material and set up anywhere in a shop or in the field quickly with little lead time. The cutting system 10 in the embodiment of FIGS. 1-3 mounted on the worktable occupies a small area having a full system footprint of approximately three (3) feet wide and six (6) feet deep, and does not require a large investment in utilities, dedicated factory space, safety guards and materials handling equipment. The cutting system of the present invention is particularly adaptable for high mix, low production small or medium-sized piece parts such as brackets, tubes, handles, and the like, as shown in FIGS. 11-15.

Referring now to FIGS. 4-8, the elements of a collaborative robot cutting system 100 having a selectively positionable extended support member 110 is illustrated in accordance with an embodiment. The extended support member is in the form of a selectively positionable cantilever beam 110 having a proximal end 112 and a distal end 114 rotatably operatively connected to an upper work surface or table 129. Similar in construction and operation to the embodiment of FIGS. 1-3, cutting system 100 includes an extended worktable or mobile cart 115 having an extended size of approximately six (6) feet wide and six (8) feet deep. The worktable or mobile cart includes a frame 117, a plurality of supporting legs 120, each including a levelling device or foot 121 attached thereto, a storage area or platform 124 having wheels or casters 125 mounted to a bottom surface 127 thereof.

The collaborative robot cutting system 100 is designed to process larger work materials and parts by augmenting the reach of the cobot 50 by mounting it on the distal end 114 of the cantilever beam 110. The augmented reach of the system is further enhanced via a pivot connection or mount shown generally at 130 which is adapted to permit selective rotatable positioning of the cantilever beam and cobot cutting system over extended radial points above large work material or structures. The pivot connection includes a mounting plate 131 secured to the distal end of the cantilever beam and rotatable secured to a bearing shaft or post 132 operatively connected to the upper work surface or table 129. Cable guide 135 (FIG. 8) is secured to a mounting bracket 137 operatively connected to a bottom surface 140 of the work surface or table and adapted to support the torch bundle 93 and electrical power cables as the cantilever beam rotates about pivot connection 130. To achieve consistency and repeatability in positioning the cobot, a retractable pin mechanism 145 including a pin 147 and actuating handle 149 which is urged by a suitable biasing mechanism, by way of example and not of limitation a spring or a hydraulically actuated piston, into releasable locking engagement with a preselected one of a plurality of apertures 150 positioned at spaced-apart radial locations on a bottom surface 155 of the mounting plate 131 (FIGS. 9 and 10).

Figure 9:
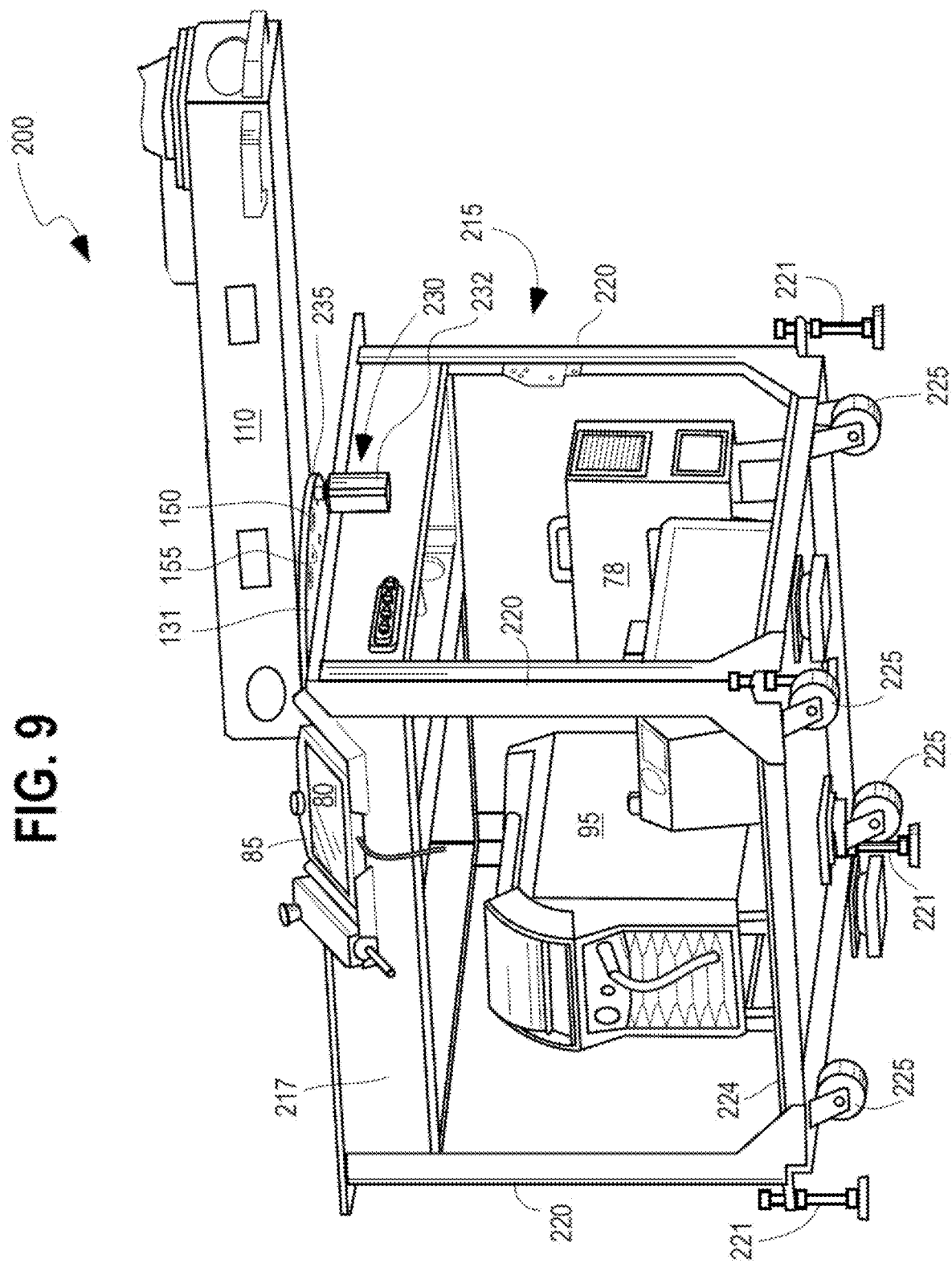
FIG. 9 is a lower left side perspective view a collaborative robot cutting system having a motorized rotation system adapted to rotatably position a selectively positionable extended support member rotatably operatively connected to an upper surface thereof in accordance with an embodiment.
Figure 10:
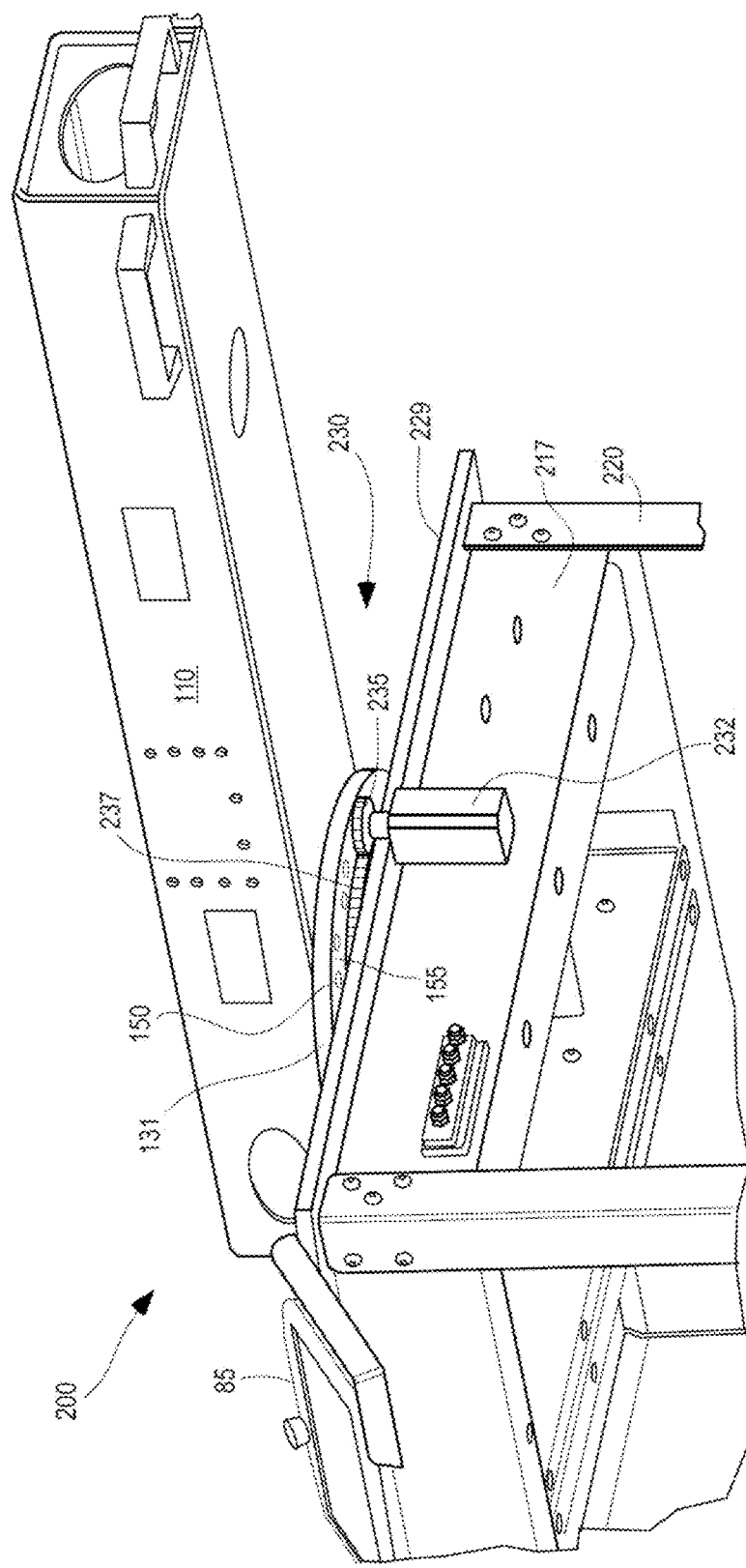
FIG. 10 is a bottom front perspective view of the collaborative robot cutting system of FIG. 9 showing the motorized rotation system enlarged to better illustrate the elements thereof.

Referring now to FIGS. 9 and 10, a collaborative robot cutting system 200 having a selectively positionable extended support member 210 is illustrated in accordance with another embodiment of the present invention. Of similar configuration to that of the embodiment 100 of FIGS. 4-8, cutting system 200 includes a worktable or mobile cart 215. The worktable or mobile cart includes a frame 217, a plurality of supporting legs 220, each including a levelling device or foot 221 attached thereto, a storage area or platform 224 having wheels or casters 225 mounted to a bottom surface 227 thereof, and an upper work surface or table 229. In contrast to the selective rotatable positioning of the cantilever beam 110 in the embodiment of FIGS. 4-8 which is performed manually by an operator, the cantilever beam in the embodiment of FIGS. 9 and 10 is selectively positioned by a slewing ring-pinion gear mechanism 230 activated by a servo motor 232 mounted on the frame 217. A pinion gear 235 is operatively connected to the servo motor and adapted to rotatably engage a slewing ring 237 secured to the bottom surface 155 of the mounting plate 131. The servo motor may be selectively activated to rotate in either direction, thus rotatably urging the cantilever beam and cobot cutting system to a desired radial position in response to rotational forces exerted on the slewing ring by the pinion gear.

In the operation of the collaborative robot cutting system 100, an operator/programmer would select the pin location that centers the cobot over the desired operating space. The operator then programs all necessary cut paths within the selected pin location and titles the program accordingly, by way of example, cutting program at 45 degrees, etc. To prevent errors, the system could optionally have proximity sensors at positions designated by various degrees to tell the system which pin location it is positioned at and to ensure that the cobot executes the correct program for that position. The operator would then move the cantilever beam to another pin location and repeat the procedure above for another degree increment such as 90 degrees. Between each of the steps in the program, a message box could be used to tell the operator which position to move the cantilever beam to before proceeding to the next cutting operation at a new pin location.

In the operation of the collaborative robot cutting system 200 using the slewing ring-pinion gear mechanism 230, the pivot axis is the seventh axis that would be saved with each programmed cobot position. This ensures that the pivot axis rotates to the selected position when the cobot is moving to a global XYZ position. In this case, the programmer would select the degree angle to which the pivot axis is to be rotated prior to programming any cobot positions. Once the pivot axis is in the correct position, the programmer adds all necessary cut paths associated with the pivot axis position and saves them for execution at the specific pivot axis position. Upon completion of the cuts to be made at the specified pivot axis position, the operator repeats the process for another pivot axis position.

To protect an operator using the slewing ring-pinion gear mechanism 230 to position the cantilever beam and cutting system 200, safety scanners would be used to protect the operating space of the combination of the cobot and the pivot axis. When the system is in programming mode or manual mode, the safety scanners would not be functioning. When the system is in operating mode, the scanners would be active and would stop the system if someone enters the safeguarded space that is protected by the sensors. As will be described in greater detail below, the system further includes a corner-mounted operator protection safety system 260 (FIGS. 4-5) which detects the presence of an operator, other personnel or a vehicle such as a forklift in preselected safety zones or non-visible safety barriers Referring now to FIG. 5, the elements of the corner-mounted operator protection safety system 260, referred to hereinafter as "the LIDAR safety system" or alternatively, "the safety system", as appropriate in the context is shown in greater detail. LIDAR is an acronym for light detection and ranging or, alternatively, laser imaging, detection, and ranging, a system which uses ultraviolet (UV), visible or near infrared (NIR) light to detect objects and to determine ranges or distances from the emitter/detector to the object. The LIDAR system of the corner-mounted operator protection safety system 260 of the collaborative robot cutting system of the instant invention is used to detect the presence of an operator, other personnel or a vehicle such as a forklift in preselected safety zones or non-visible safety barriers 263, 265 illustrated in FIG. 6 surrounding the collaborative robot cutting system 200. These safety zones or barriers are shown in FIG. 6 and are generated by the LIDAR scan projected out by the system. When an object is detected in one of the zones, the operating speed of the robot system is reduced for safety purposes or the robot system is stopped if used with the motorized rotation system. Coupled with the built-in safety system of the robot arm, which stops its movement when the arm contacts an object, the system possesses dual chain safety feature redundancy. This feature also enhances production rates, inasmuch as the system may be operated confidently at higher speeds under normal conditions knowing that if an unsafe condition is detected, the system will respond proactively to protect the operator and other personnel in the area.

Figure 5:
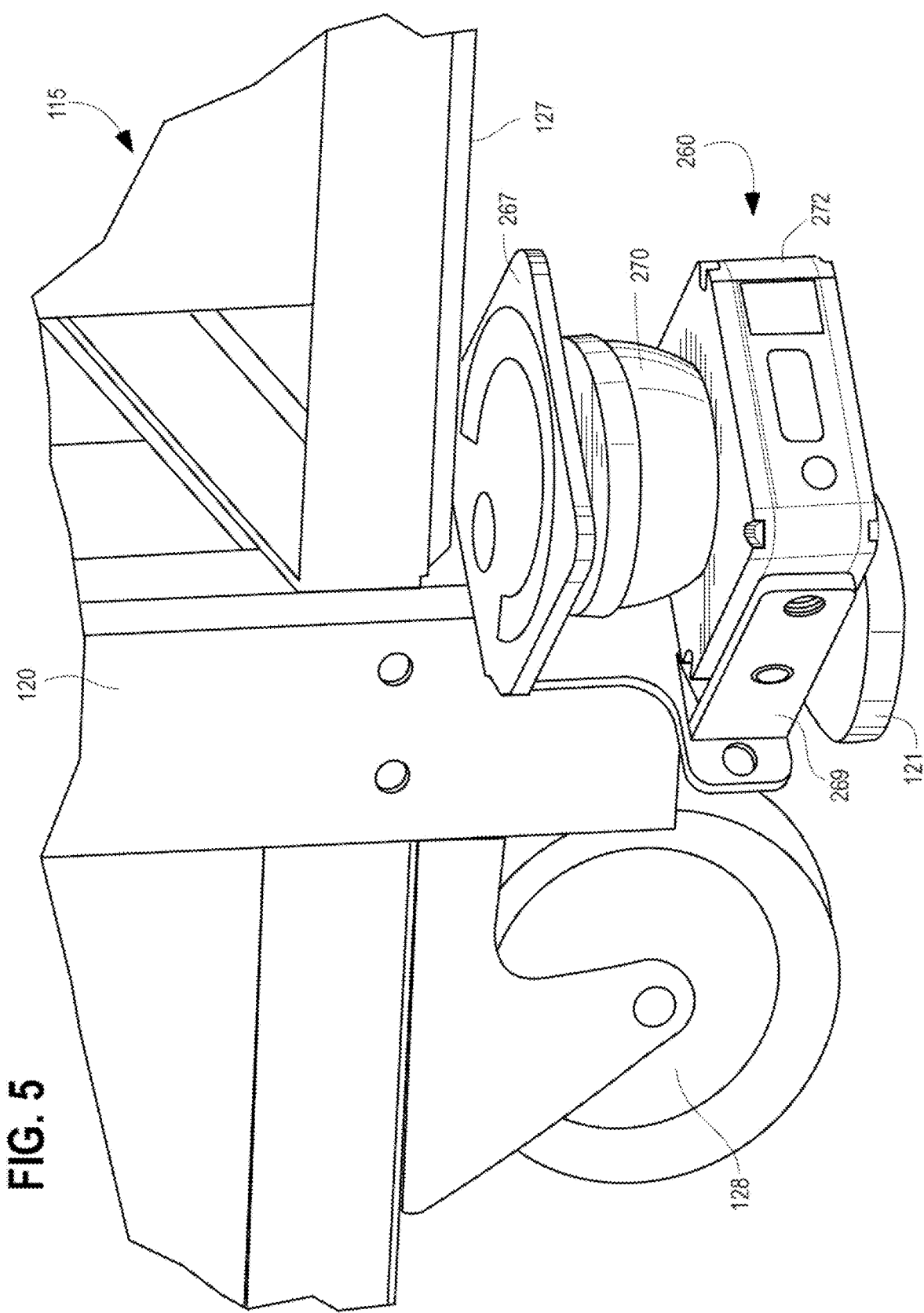
FIG. 5 is an enlarged perspective view of an element of the corner-mounted operator protection safety system of the collaborative robot cutting system of FIG. 4.
Figure 6:
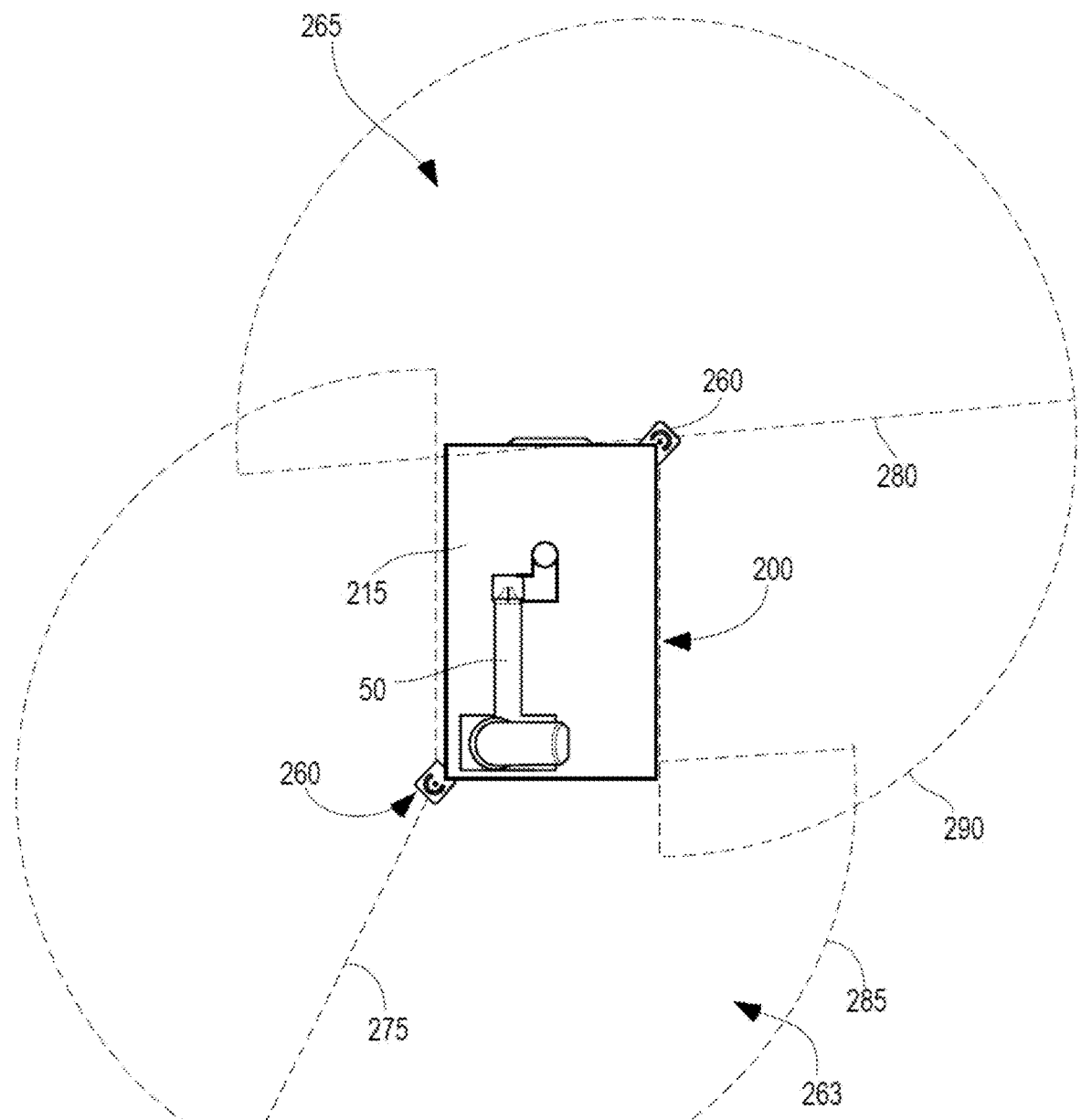
FIG. 6 is a top plan view of the collaborative robot cutting system of FIG. 4 illustrating the safety sensing areas of the corner-mounted operator protection safety system.

As illustrated in FIG. 5, the LIDAR safety system is adjustably and rotatably secured to the bottom surface 127 of the mobile cart 115 by brackets 267 and 269. The operating and control components of the system are contained within cylindrical housing 270 and in projector housing 272 which are adjustably positionable to control the radii 275, 280 and the corresponding circumference ranges 285, 290 of the safety zones 263, 265 generated by the LIDAR safety system scan, respectively.

Figure 6A:
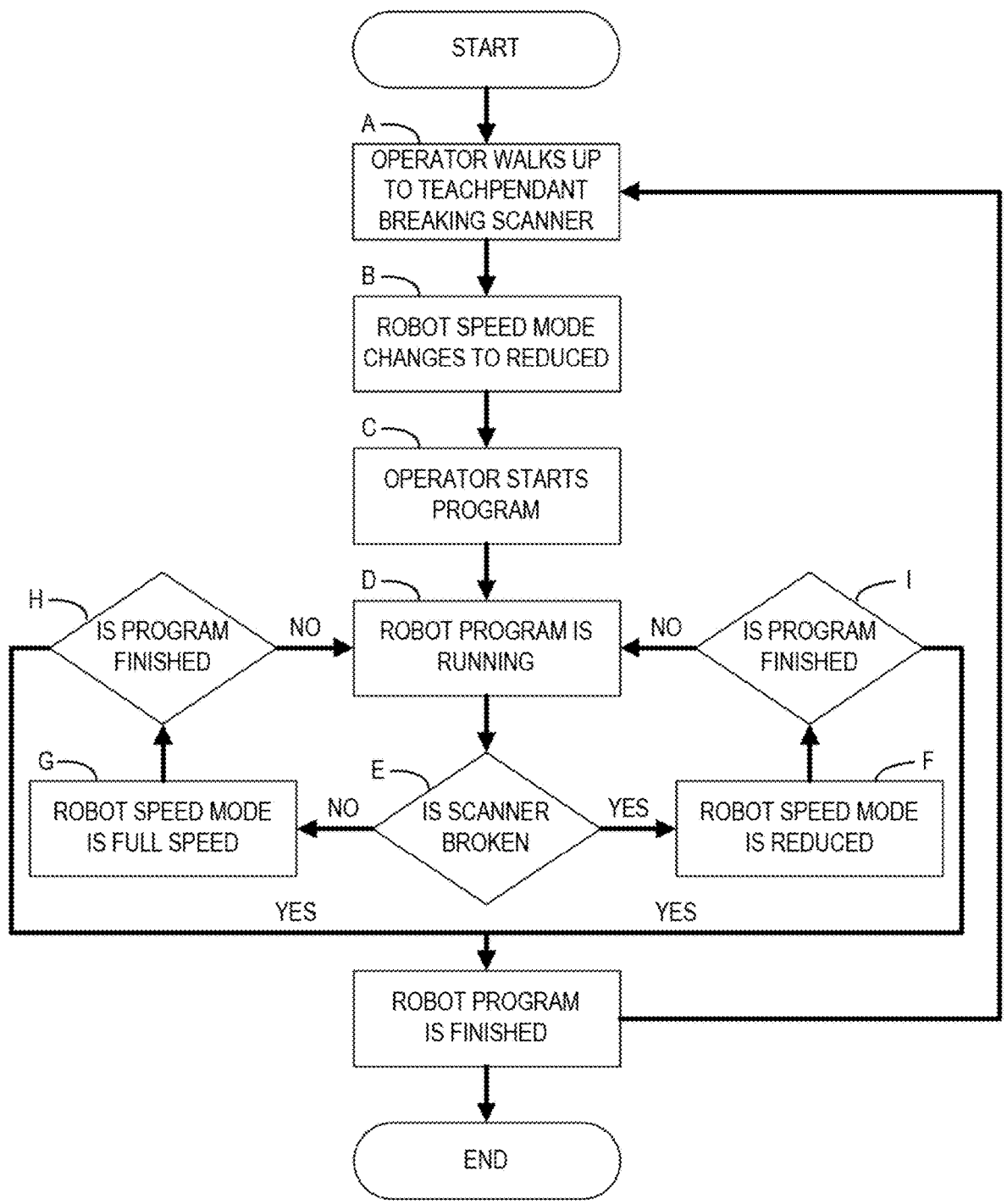
FIG. 6A is a flow diagram of the operation of the safety sensing areas of the corner-mounted operator protection safety system of the collaborative robot cutting system of FIGS. 4-6.

The operational flow chart of the LIDAR safety system is presented in FIG. 6A. When the collaborative robot cutting system has been programmed and set up for a particular job and has completed the programmed cutting tasks or if the system is sitting idle, if an operator walks up to the system, he or she will enter one or both of the safety zones 263, 265 thereby breaking the non-visible safety barrier. In response, the robot speed mode is adjusted downward at step B, and the operating speed is reduced to a preselected safe level but is not shut down. At step C, the operator, who is now within the safety zones, may safely and confidently perform programming operations, unload work materials already cut, load and adjust new work materials for the next cutting cycle, and perform other tasks associated with operating the cobot 50. The operator then selects the program to execute with the new work materials and presses the start button on the robot either via the pendant or operator panel. The program starts and the operator walks out of the non-visible safety barrier. The robot then speeds up to the allowable maximum speed while continuing the current program it is executing. At step D, the LIDAR safety system continually checks to determine if the robot program is running and if the scan is interrupted at step E, which would indicate that the operator has reentered the safety zones. If the scanner indicates that the operator is still in the safety zones, the robot operating speed is maintained at a reduced speed level, step F. If the scanner is uninterrupted, which indicates that the operator has completed his or her tasks within the safety zone and moved out of them, the system returns the robot operating speed to the preselected full operating speed for the task being performed at step G. The system continuously checks for any breakage of the non-visible safety barrier or obstacle that would slow the robot operating speed down, step E, or completion of the program at steps H and I, thereby providing closed loop feedback to the control system of the status of the robot program. If the system detects that the program is finished at step J, the operation is complete and the operator may approach the mobile cart 215 to perform a new setup, reprogram the robot or to execute other required tasks. The main usefulness for the safety system is speeding up all the "non-process" moves to reduce the cycle time of the system to the most efficient cycle time possible with any given job.

Figure 4:
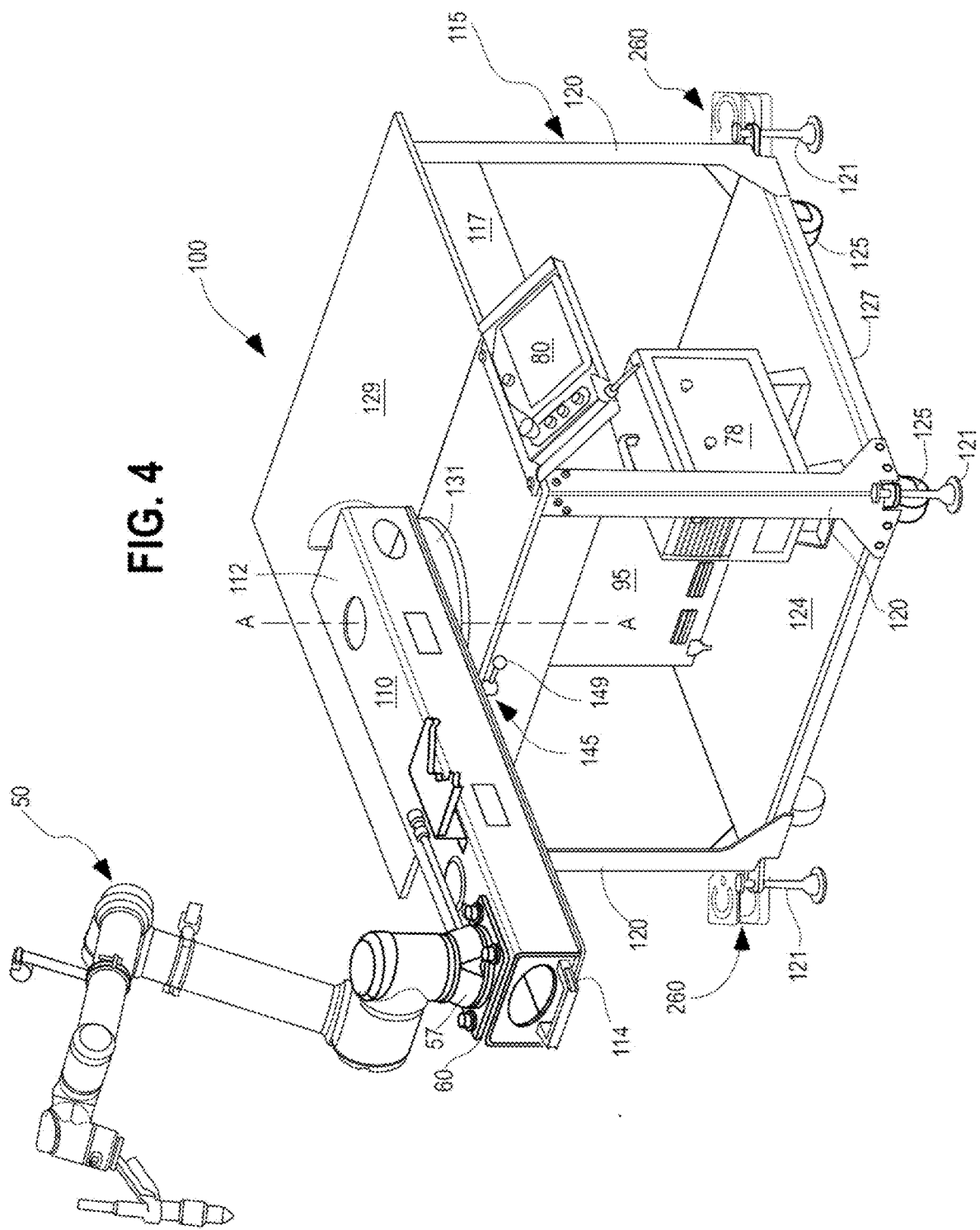
FIG. 4 is an oblique top front perspective view of a collaborative robot cutting system including a selectively positionable extended support member operatively rotatably connected to an extended upper surface thereof having a mobile base including a corner-mounted operator protection safety system in accordance with an embodiment.
Figure 6B:
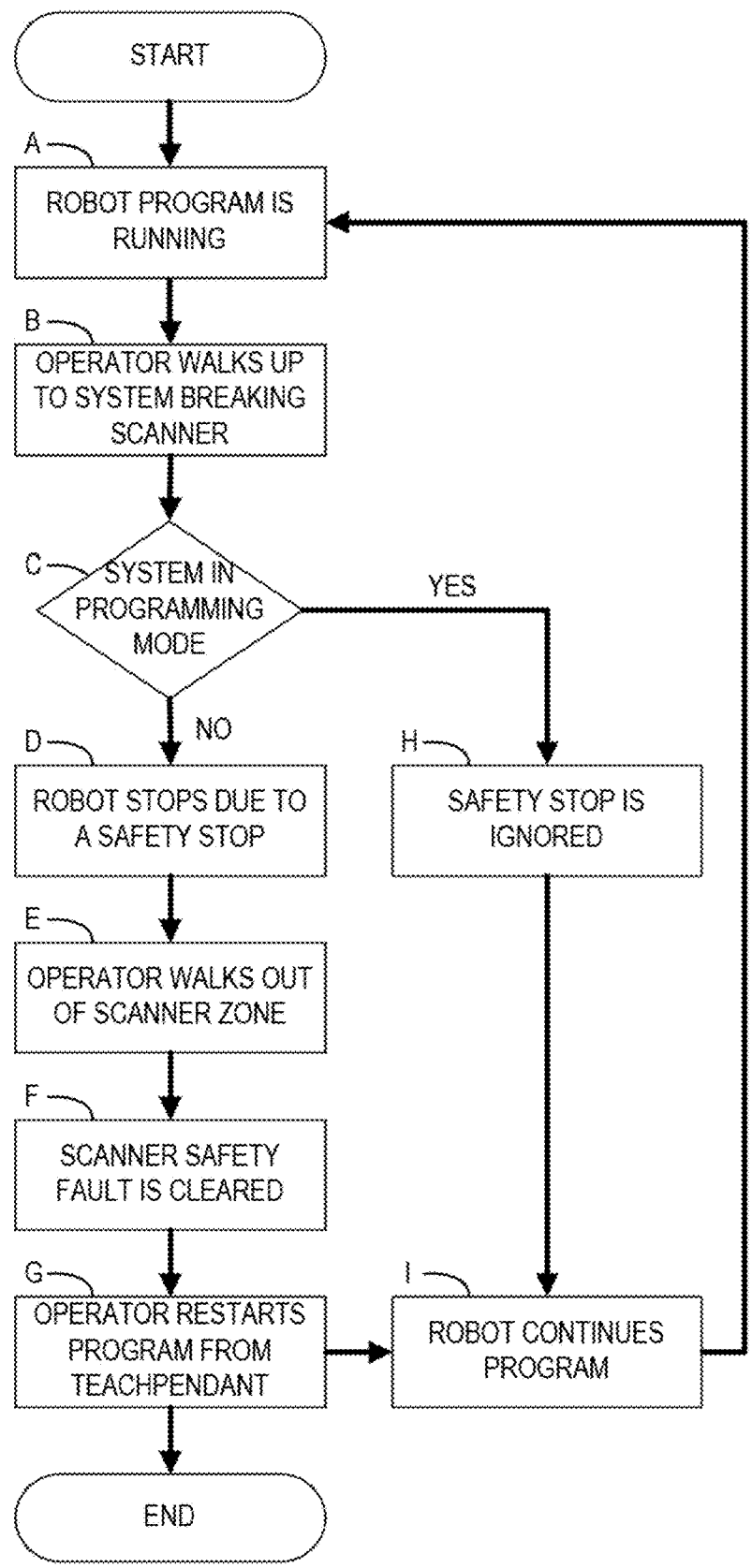
FIG. 6B is a flow diagram of the operation of the safety sensing areas of the corner-mounted operator protection safety system of the collaborative robot cutting system when used in conjunction with the motorized rotation system of FIGS. 9-10.
Figure 7:
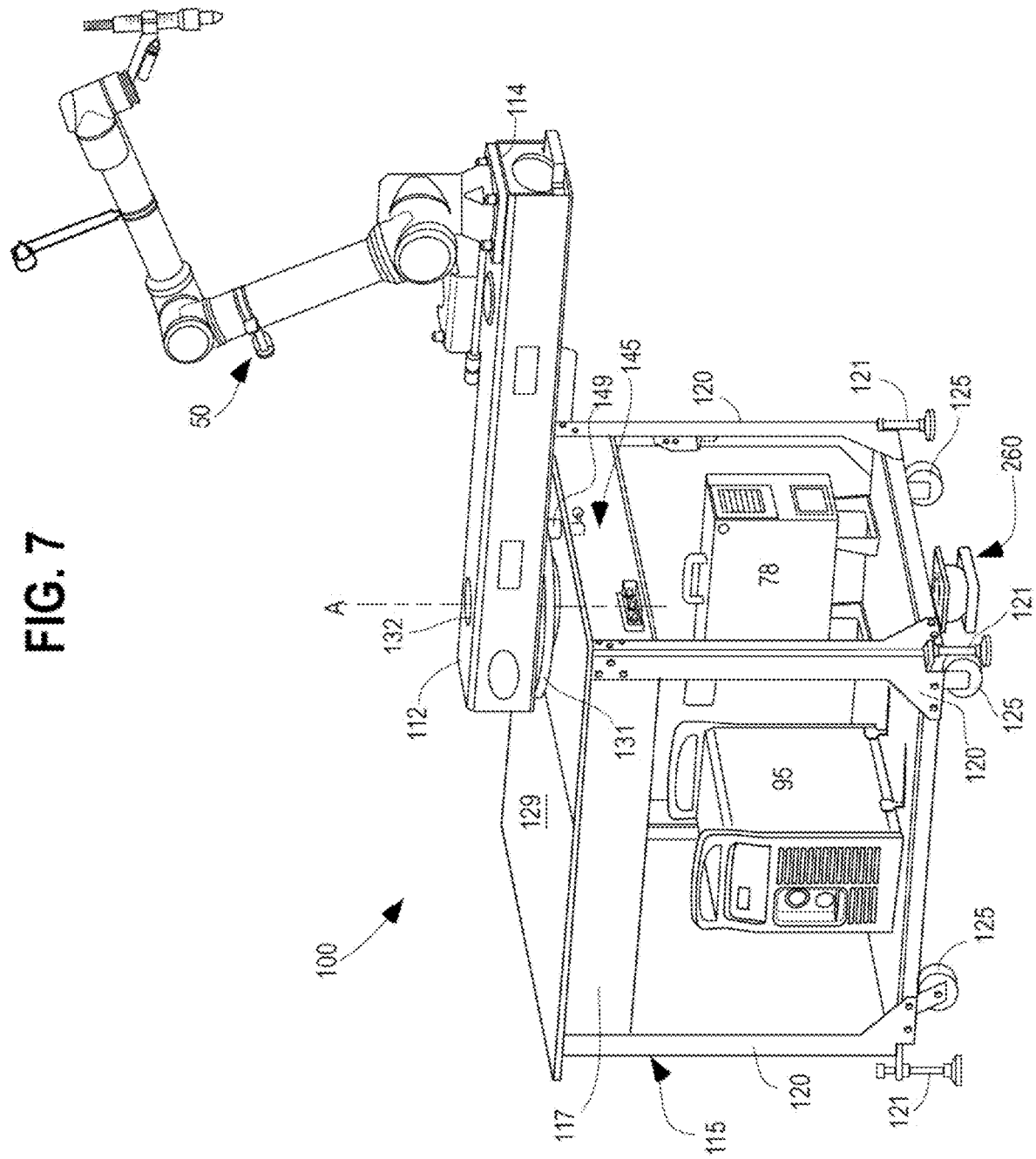
FIG. 7 is a left side perspective view of the collaborative robot cutting system shown in FIG. 4.
Figure 8:
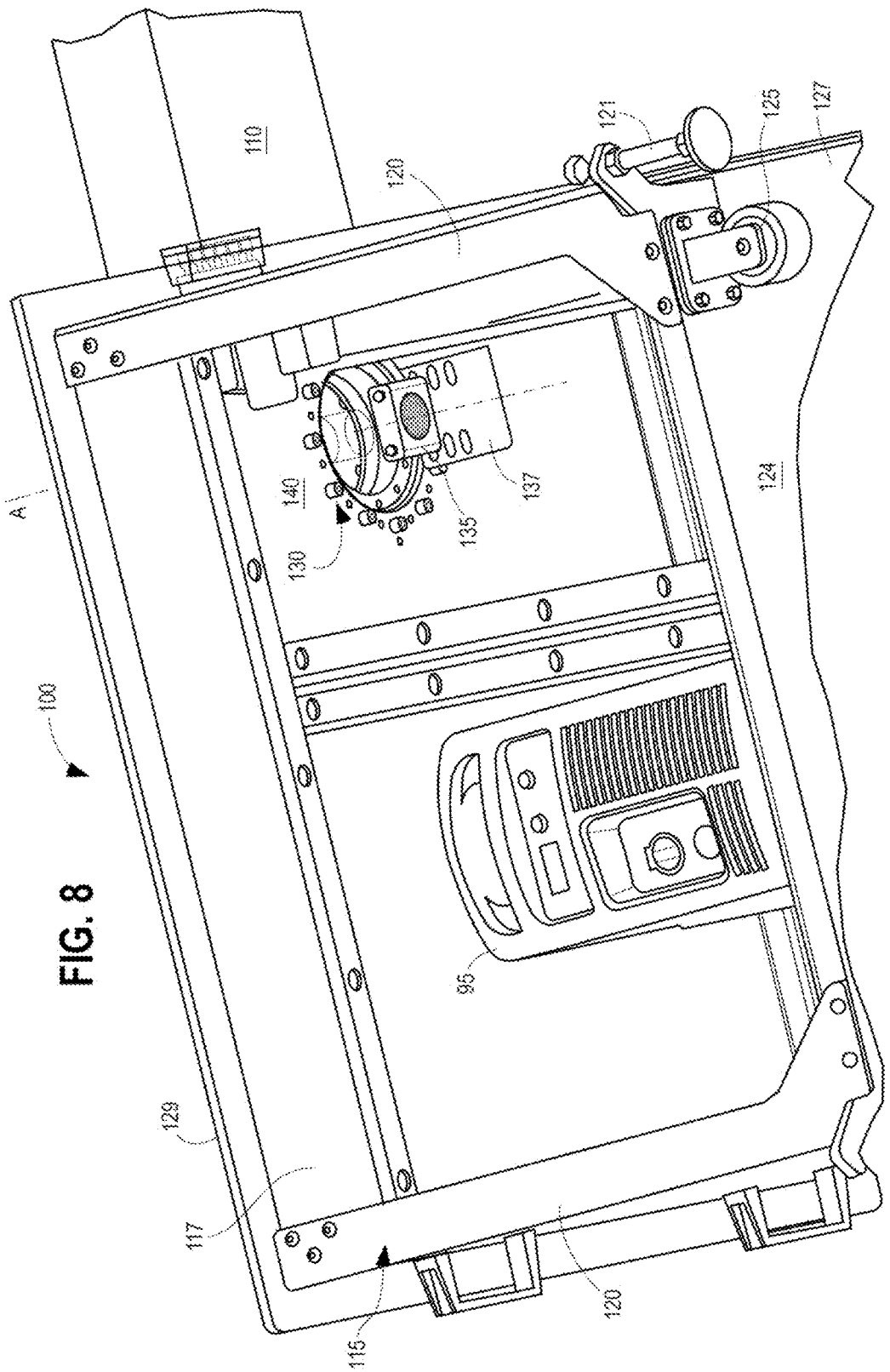
FIG. 8 is a left bottom perspective view of the collaborative robot cutting system of FIGS. 4 and 7.

The operational flow chart of the LIDAR safety system when used in conjunction with the motorized rotation system is presented in FIG. 6B. When the collaborative robot cutting system has been programmed and set up for a particular job and is now running the program, step A, the operator walks up to the system entering one or both of the safety zones 263, 265 thereby breaking the non-visible safety barrier, step B. At step C, the safety system checks if the robot is in programming mode and if system is not in programming mode, the robot stops due to a safety stop, step D. To clear this safety fault, step E, the operator walk out of the safety zones 263, 265 and the LIDAR safety system fault is cleared, step F. Once the fault is cleared by exiting the safety zones, the operator restarts the program from the teach pendant 80. If the system was in programming mode, step C, the safety stop is ignored, step H, and robot continues the program, Step I. The main usefulness for the safety system is protecting the operator from the pinch points that are created between the extended support member 110 and mobile cart 115 as illustrated in FIG. 4.

Figure 16:
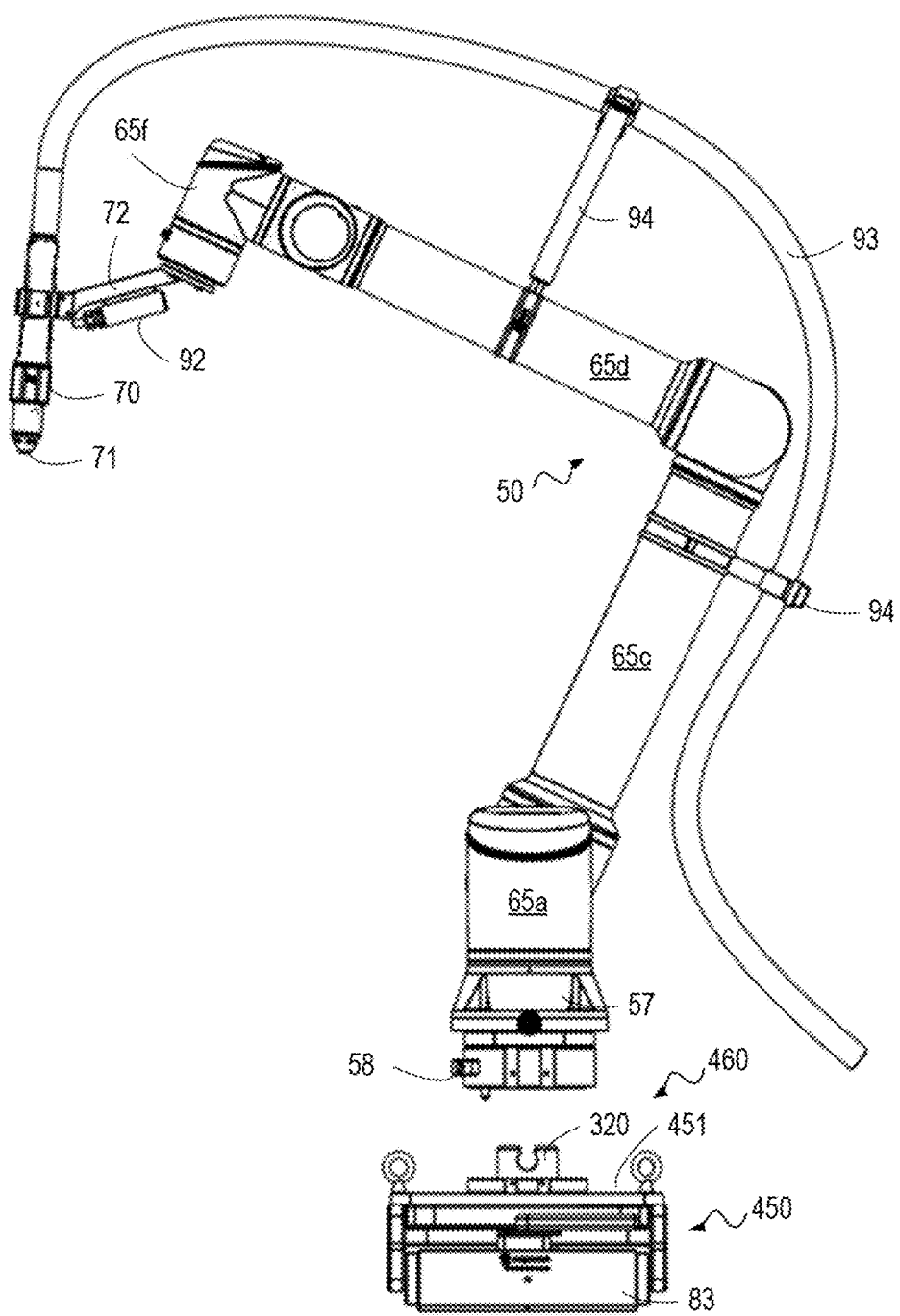
FIG. 16 is a side elevation view of a collaborative robot arm positioned for attachment to a magnetic locking base in accordance with an embodiment.
Figure 17:
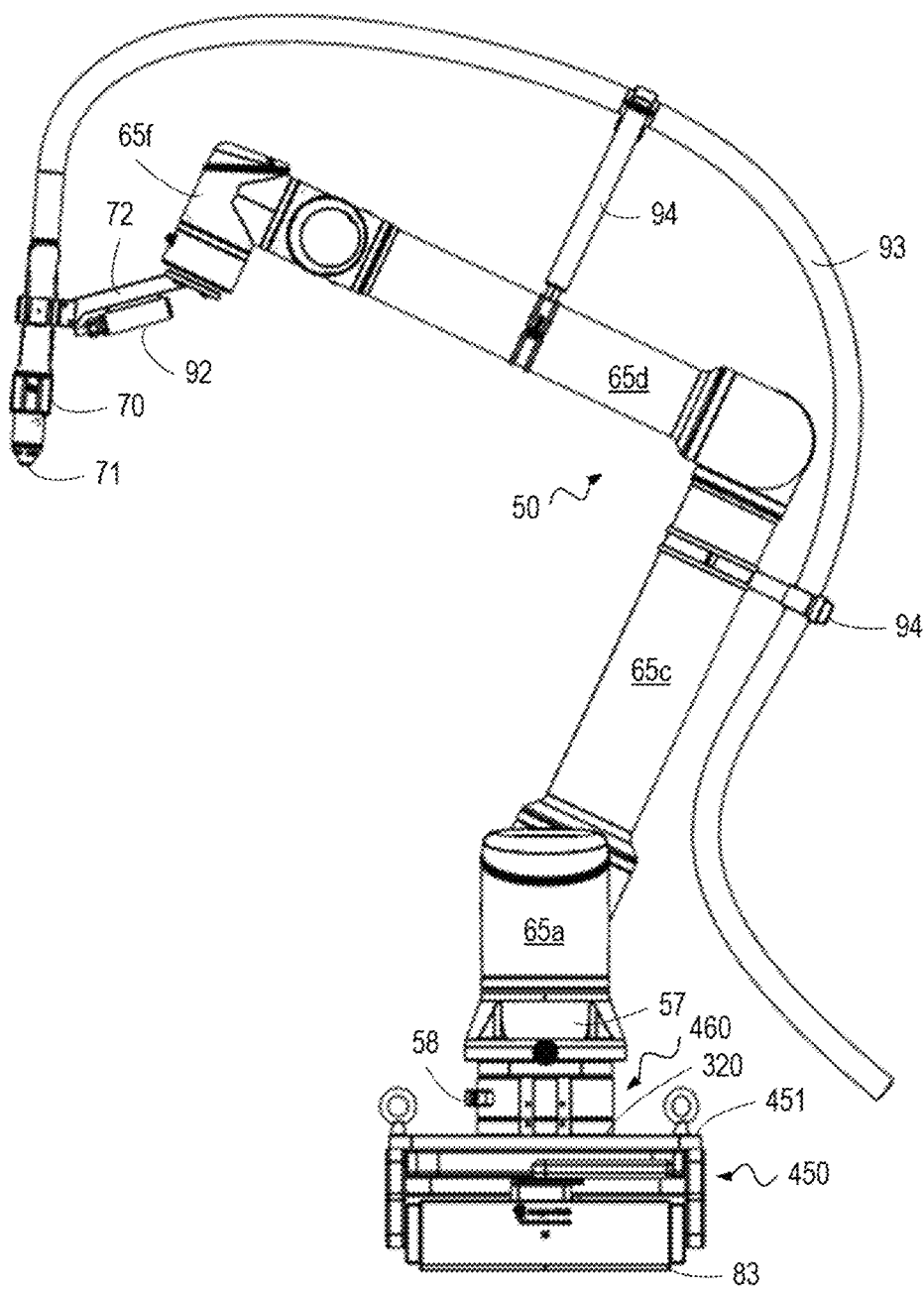
FIG. 17 is a side elevation view of the robot arm and mechanical locking base of FIG. 16 illustrating the robot arm mounted on the magnetic mounting base.
Figure 18:
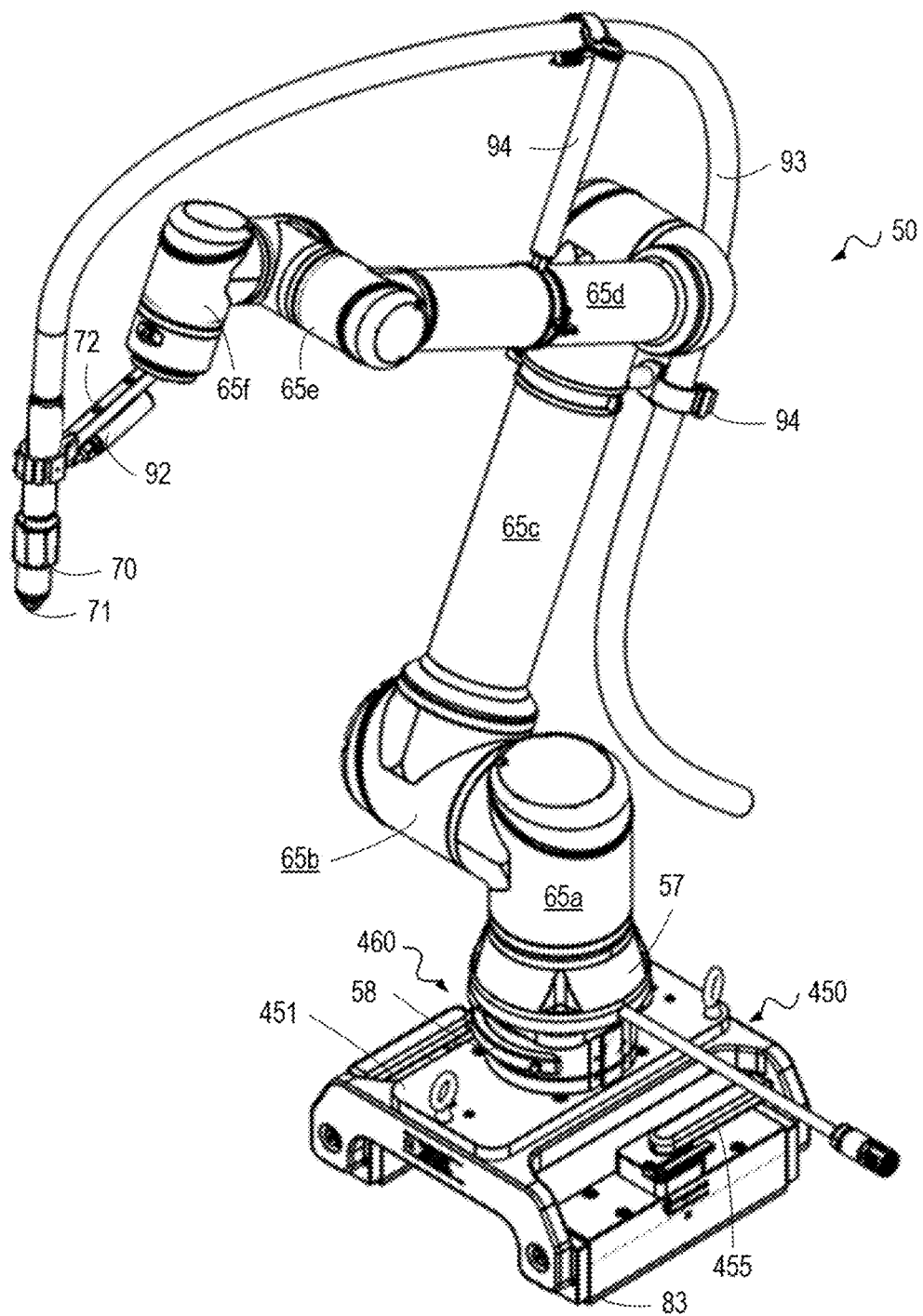
FIG. 18 is a perspective view of the robot arm and magnetic mounting base of the embodiment of FIG. 17 enlarged to more clearly illustrate the elements thereof.

Referring now to FIGS. 16, 17, and 16, a collaborative robot cutting system 50 is shown mounted to a quick release cam lock 460; such a MGW GRIP connector or a SWS GRIP Connector manufactured by GRIP GmbH, Dortmund, Germany; as well as a magnetic base 450 such a Magswitch UR 10 isolated cobot magnetic base manufactured by Magswitch Technology, Lafayette, Colo. The magnetic base is releasably positioned at any location suitable for the work material to be cut either on the material or on the worktable adjacent to the material, and the collaborative robot cutting system 50 is positioned thereon. The magnetic base is releasably secured via activation lever 455 which moves magnets positioned in the base close to the material to be cut, thereby creating sufficient securing forces to maintain the collaborative robot cutting system in position. The base 57 of the collaborative robot cutting system 50 is adapted to fit over a cylindrical cam locking attachment member located on a top surface 451 of the magnetic base, and the collaborative robot cutting system 50 is releasably secured thereto via activation lever 58 which moves a cam lock positioned in the base from the released position into the locked position, thereby creating sufficient securing forces to maintain the collaborative robot cutting system in position. After cutting operations have been completed, the collaborative robot cutting system 50 may be released by moving the activation lever in the opposite direction, and the collaborative robot cutting system may be repositioned at another selected location on the worktable.

Figure 3:
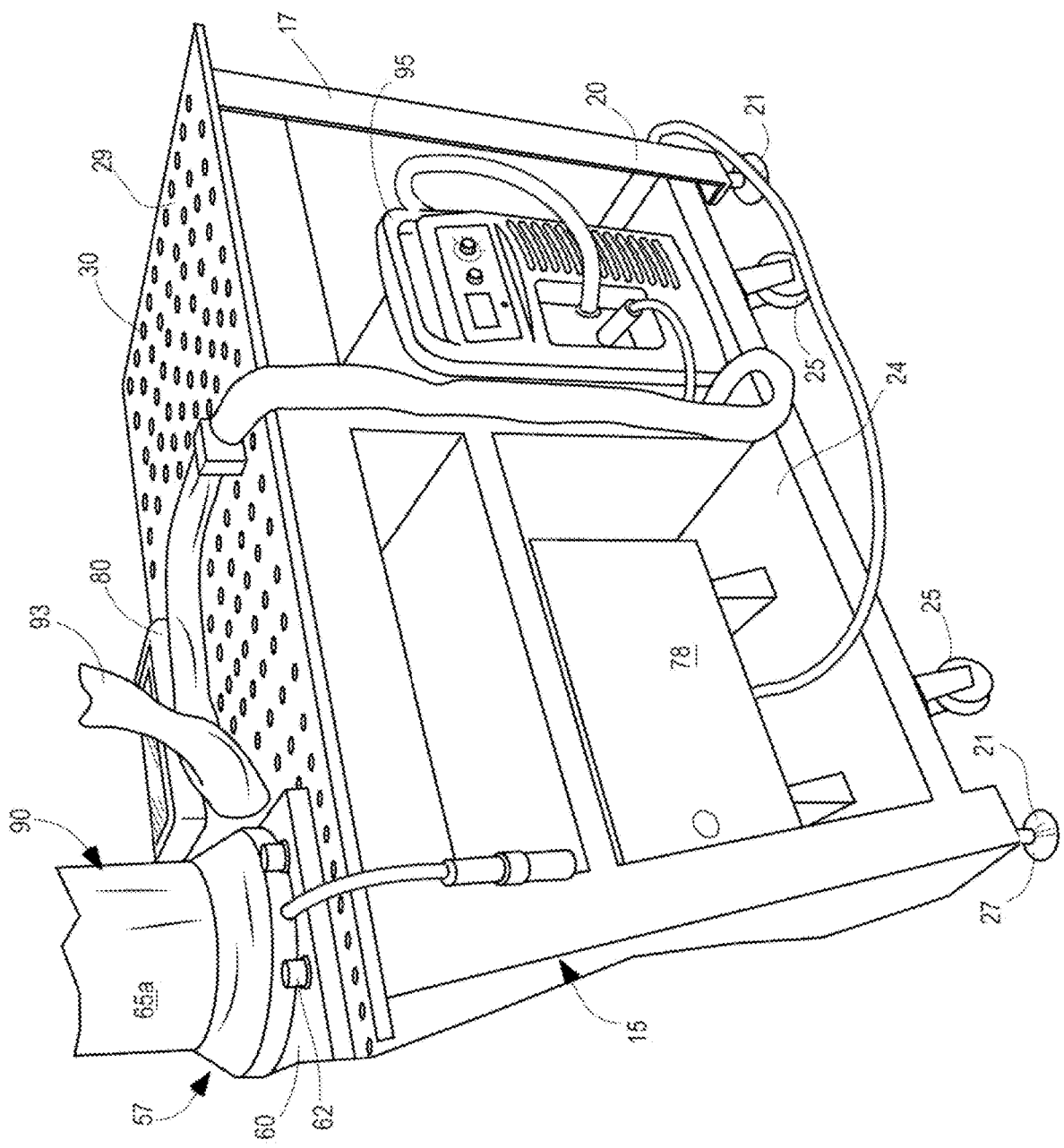
FIG. 3 is a rear perspective view of the elements of the collaborative robot cutting system shown in FIGS. 1 and 2 illustrating the components thereof in greater detail.

The cutting systems 100 and 200 both include a collaborative robot system or cobot 50 as shown in FIGS. 1-3 and described in detail above. For purposes of clarity and simplicity, the same robot system component numeric identifiers are also used in the embodiment of FIGS. 4-7. Collaborative robot systems either specifically designed and built for individual applications or other generally commercially available collaborative robot systems may also be used in the embodiments of FIGS. 4-7 without departing from the scope of the present invention.

The embodiments depicted in FIGS. 1-10 further illustrate the flexibility and adaptability of the cutting system 10 of the present invention, inasmuch as the portability of the system coupled with the reach distance or length of the robot arm allows the system to be used to perform cutting operations on assemblies or structures that may be difficult or uneconomical to move or, alternatively which may be permanently fixed to larger structures. For example, storage vessels, petrochemical processing equipment, or large open pit mining shovels may experience structural failures, weld cracking or other problems which may be require field repair by cutting and replacement welding. The entire cutting system including all of the individual components, namely, the worktable, the cutting power supply, robot controller, teach pendant, and cutting gas supply may be positioned as a unit on an elevated platform, scaffolding, a cherry picker (boom lift) or a scissor lift for performing cutting operations in relatively inaccessible locations. Alternatively, the individual components may be positioned separately independently of the worktable, and the mechanically secured base 60 may be replaced by a magnetic base affixed to a sidewall, roof or ceiling portion of a steel structure to perform out of position cutting operations in both indoor manufacturing and field service maintenance applications.

Figure 11:
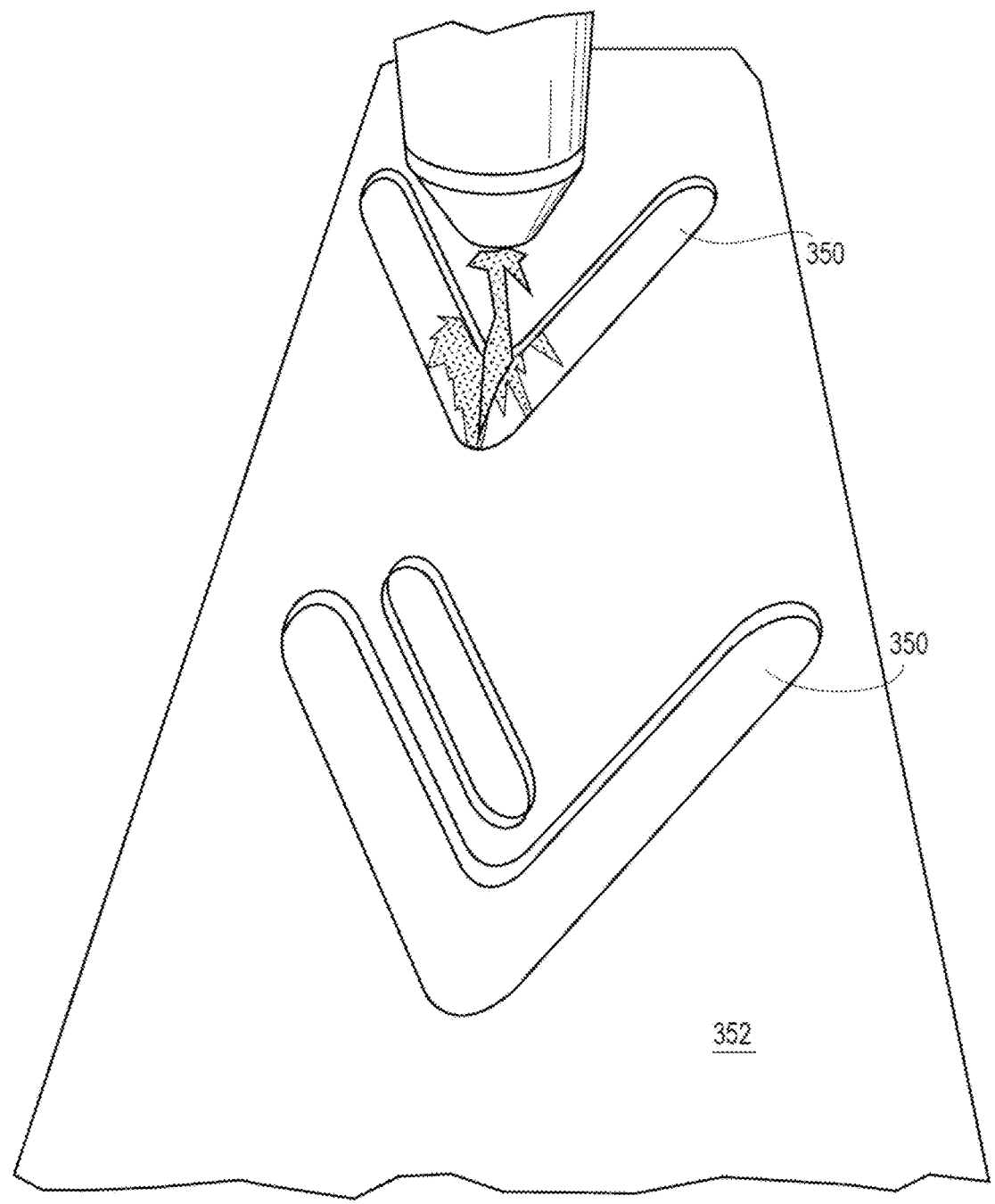
FIG. 11 is a top perspective view of the collaborative robot cutting system of the present invention performing a cutting operation on a side panel of a channel member.
Figure 12:
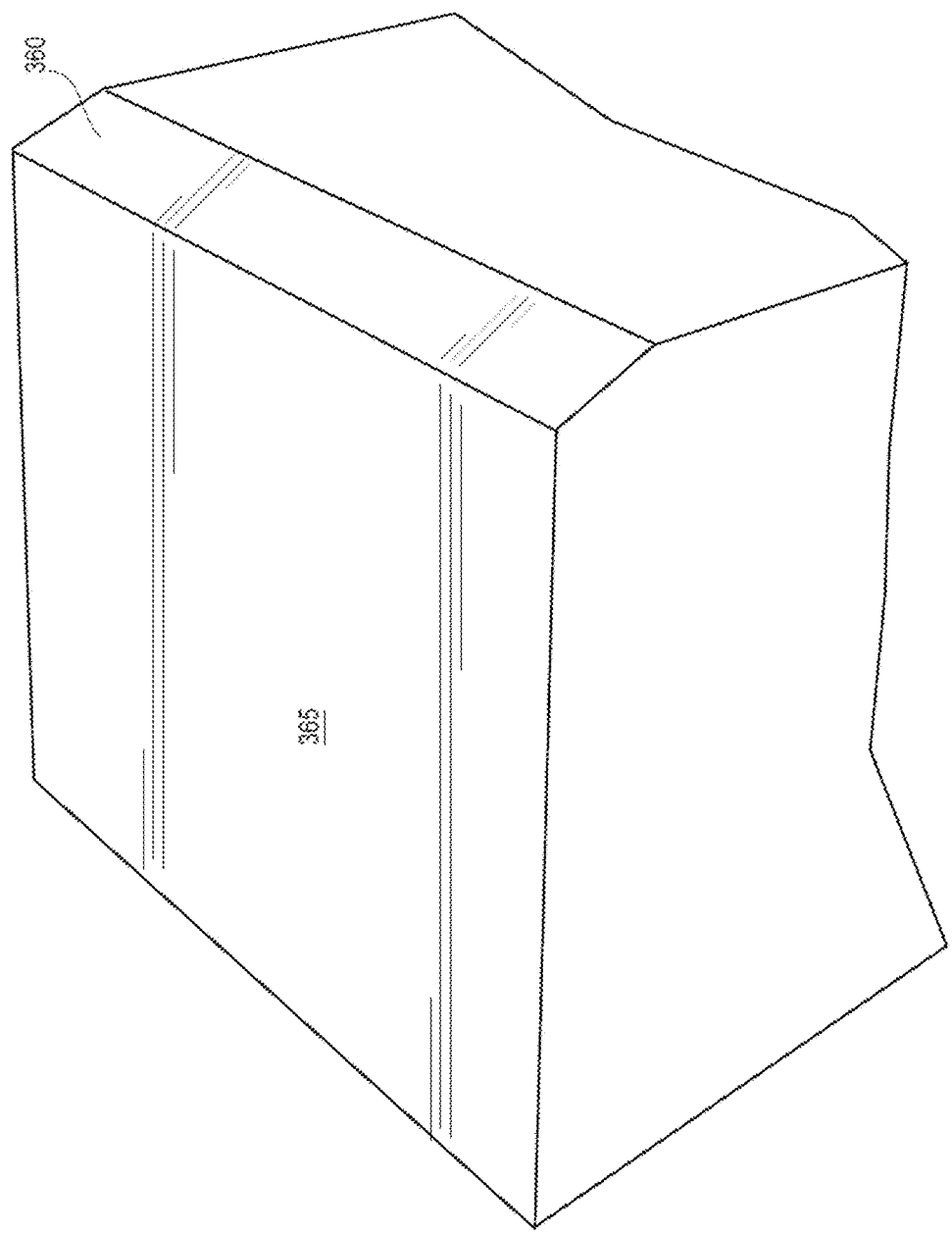
FIG. 12 is a top perspective view of a beveled edge of a steel plate cut by the collaborative robot cutting system of the present invention.
Figure 13:
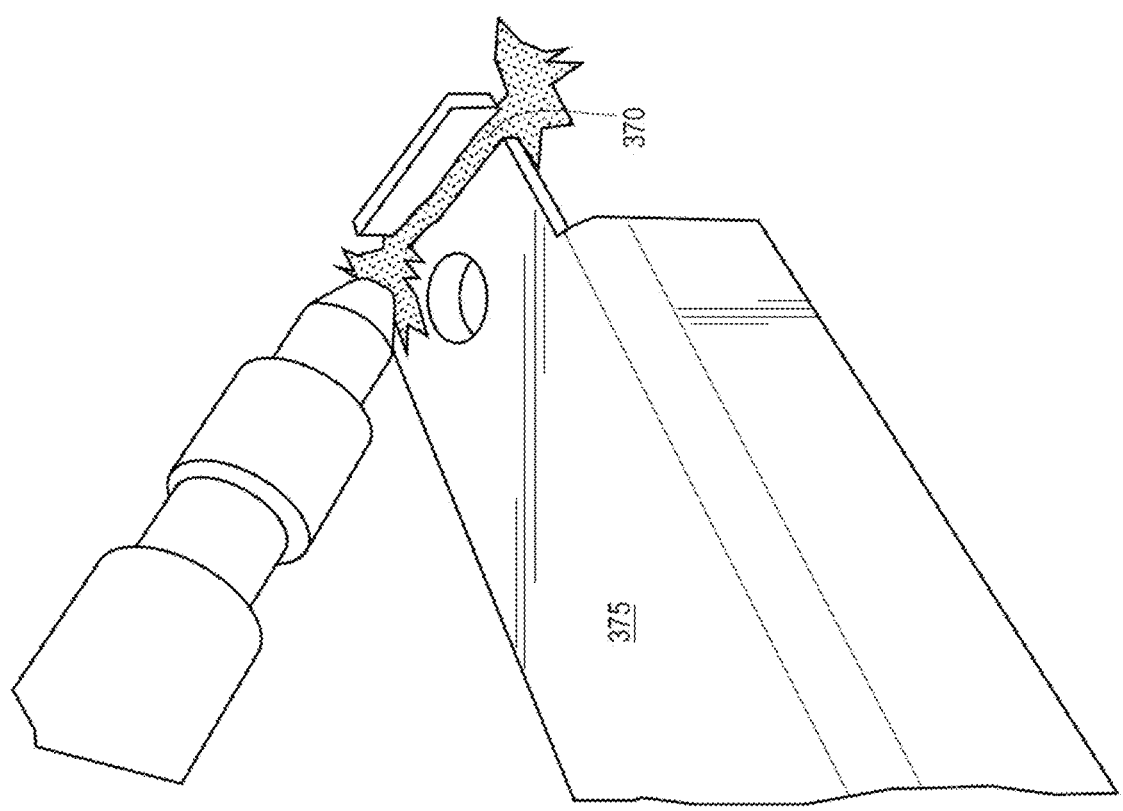
FIG. 13 is a top perspective view of the collaborative robot cutting system of the present invention cutting the beveled edge of FIG. 12.
Figure 14:
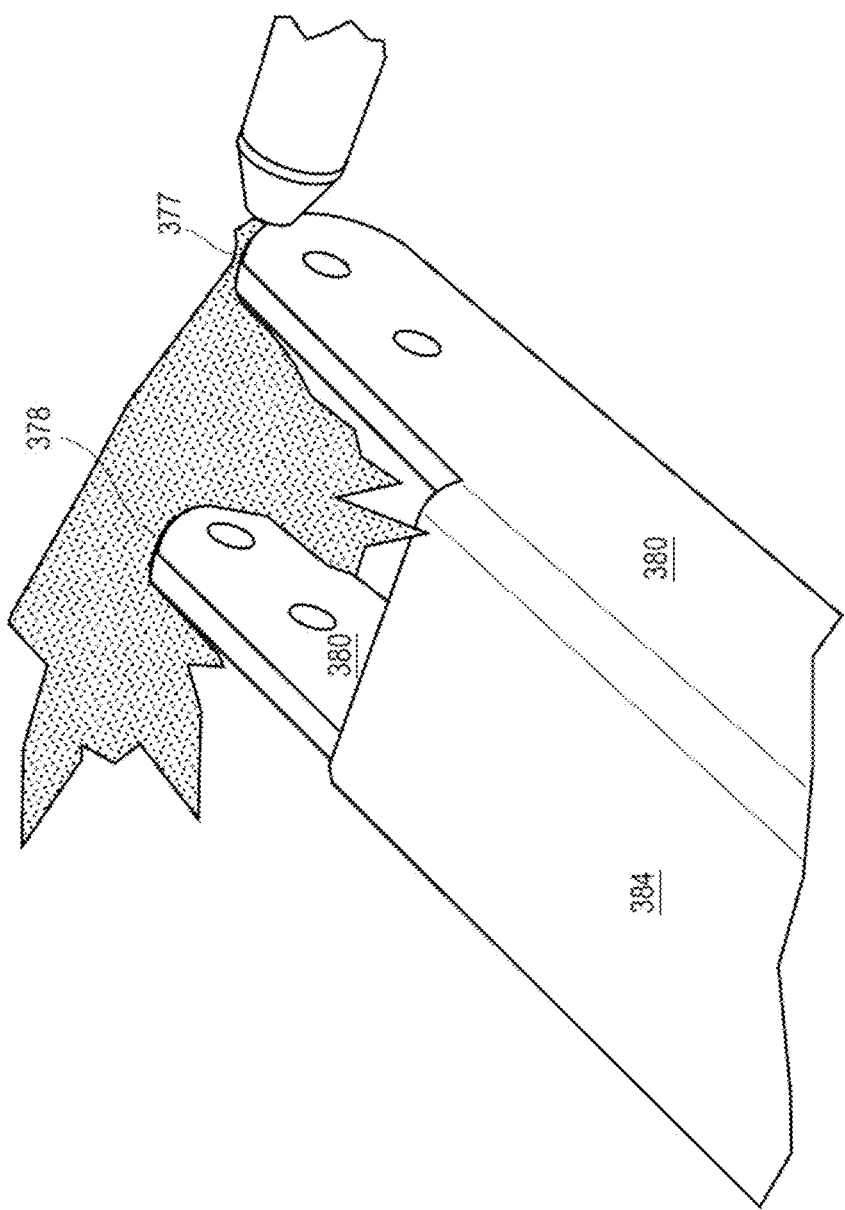
FIG. 14 is a top perspective view of collaborative robot cutting system of the present invention performing a cutting operation on an edge of a channel member.
Figure 15:
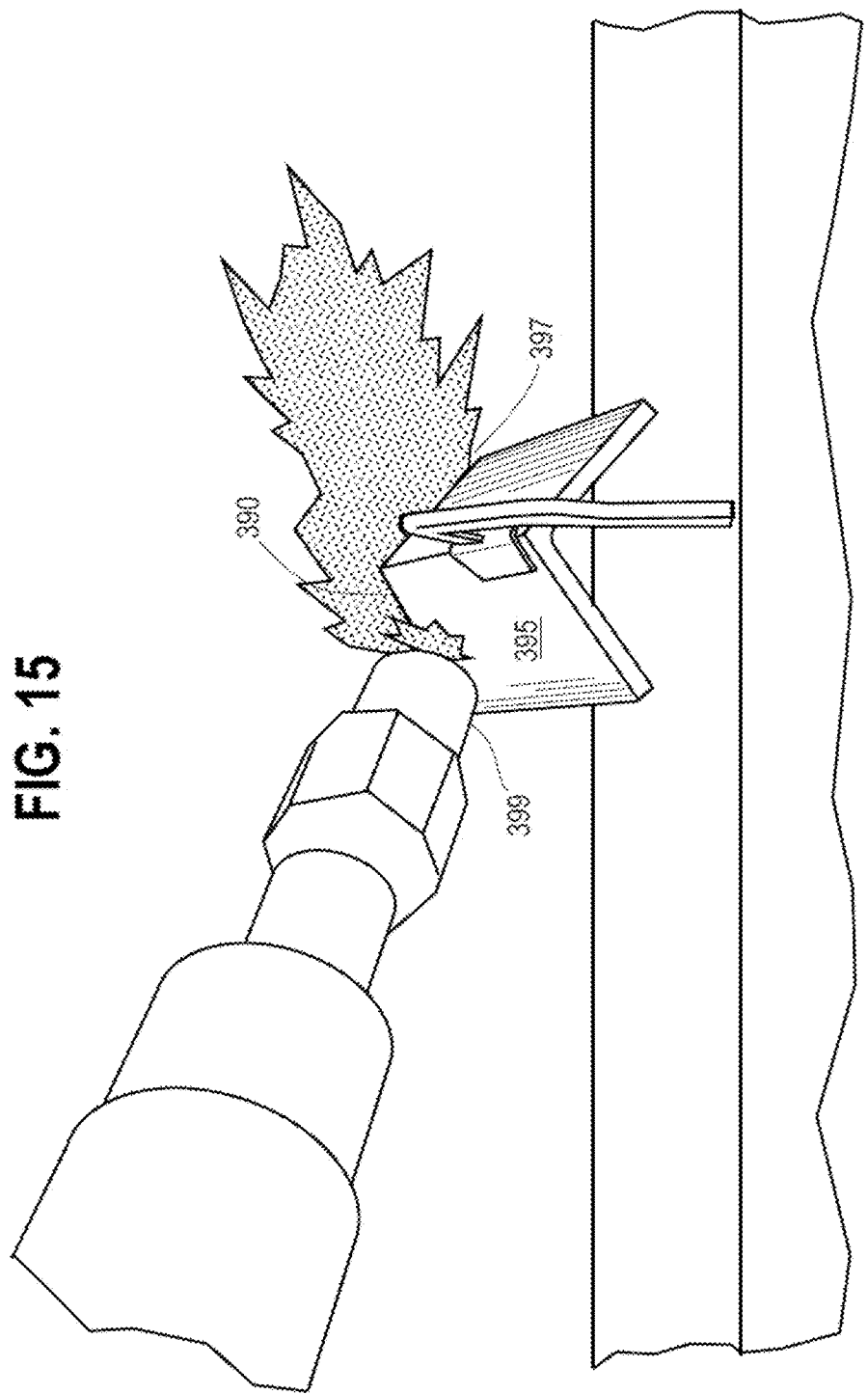
FIG. 15 is a top perspective view of collaborative robot cutting system of the present invention performing a cutting operation on an edge of an angle iron.

In operation, by way of example and not of limitation, the collaborative robot cutting system 10 of the present invention may be used to cut intricate shapes and patterns into work materials such as an advertising logo 350 in a box beam member 352 as shown in FIG. 11. FIG. 12 depicts a beveled edge 360 prepared in anticipation of welding the substrate member 365 to a cooperating adjacent member in a welded assembly. FIG. 13 depicts a beveled edge 370 being cut in a steel plate 375, and FIG. 14 illustrates the preparation of edges 377, 378 in the side members 380 of a square tube assembly 384. Finally, FIG. 15 shows the final segment of a cutting operation performed on an edge 390 of an angle iron 395 which commenced at the right corner 397 of the workpiece and will finish at the left corner 399.

Figure 19:
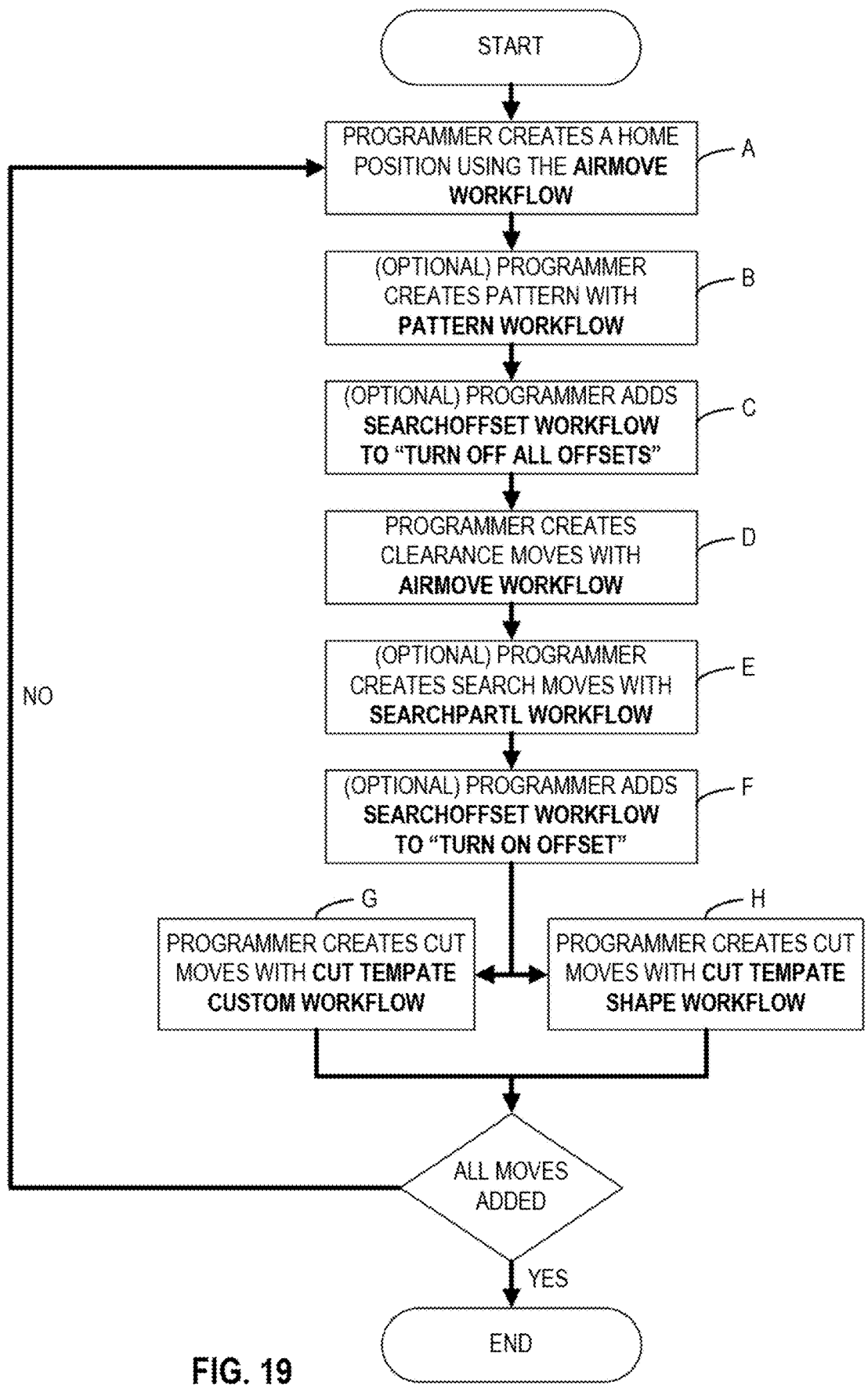
FIG. 19 is a flow diagram depicting the process steps of an exemplary cutting job cycle.

Referring now to FIG. 19, a flow diagram or flow chart presents the process steps of an exemplary cutting job cycle. The novel intuitive and graphical programming features and operational methodology for using the cutting system are described in FIGS. 20-46 via exemplary screen shots of processing steps and commands as they appear in the application programming interface (API) display 85 of the teach pendant 80 and in supplemental flow diagrams associated therewith. These figures are cross referenced where applicable to the flow chart process steps in the description following. Analogous to setting up a route via waypoints between a start point and a destination using a GPS system, the teach pendant is organized in such a way as to permit an operator or programmer, which designations are used interchangeably herein, to program a job without having an extensive educational background or computer programming or coding training or experience.

First, the operator brings the work materials to be cut to the collaborative robot such as where the system 200 of FIG.

9 is advantageously employed for cutting large assemblies. Alternatively, the operator brings the collaborative robot to the work material, as for example, in the situation where cutting must be performed in the field and powers on the cutting power supply and the collaborative robot. The work material aligned in accordance with the prescribed cut specifications set forth in the associated design drawings and specifications and may be tacked, held in a fixture, or otherwise secured in position. At this point and at any point in the setup and cutting process, the operator may select the hand-guided jogging mode as shown in FIGS. 20A and 20B by depressing the programming or hand-guided jog button 92 on the handle of the cutting torch bracket 72. This mode permits free movement and positioning of the robot arm 55 and the torch 70 by the operator. The operator may conveniently engage and disengage the hand-guided jogging mode as needed at any time during the performance of a cut setup and execution procedure. Once the work materials and the robot arm are located relative to one another, the operator may commence the program setup by using the programming button 92 in conjunction with the teach pendant 80 to create a cutting path.

Figure 21:
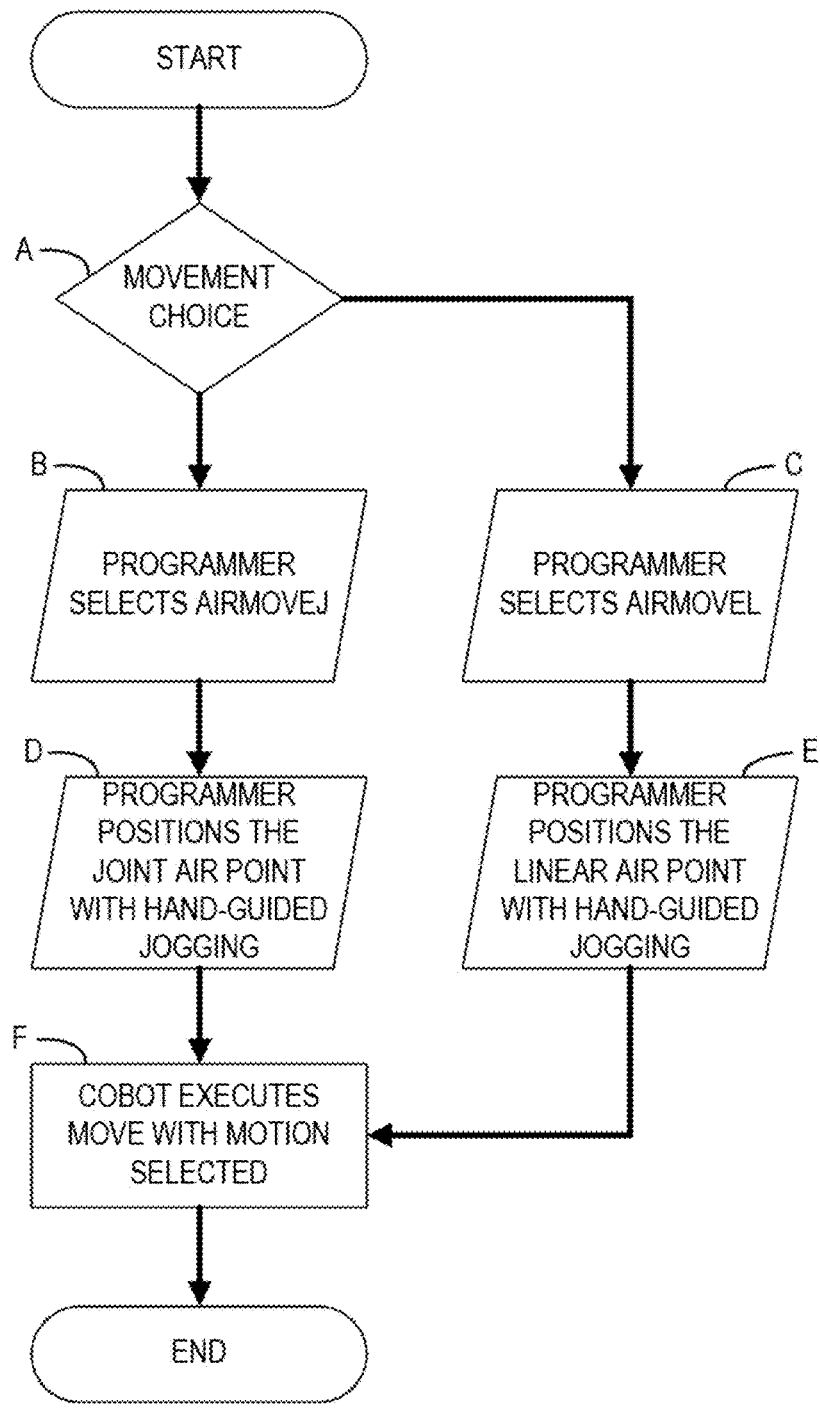
FIG. 21 is a flow diagram of an AirMove workflow.
Figure 22:
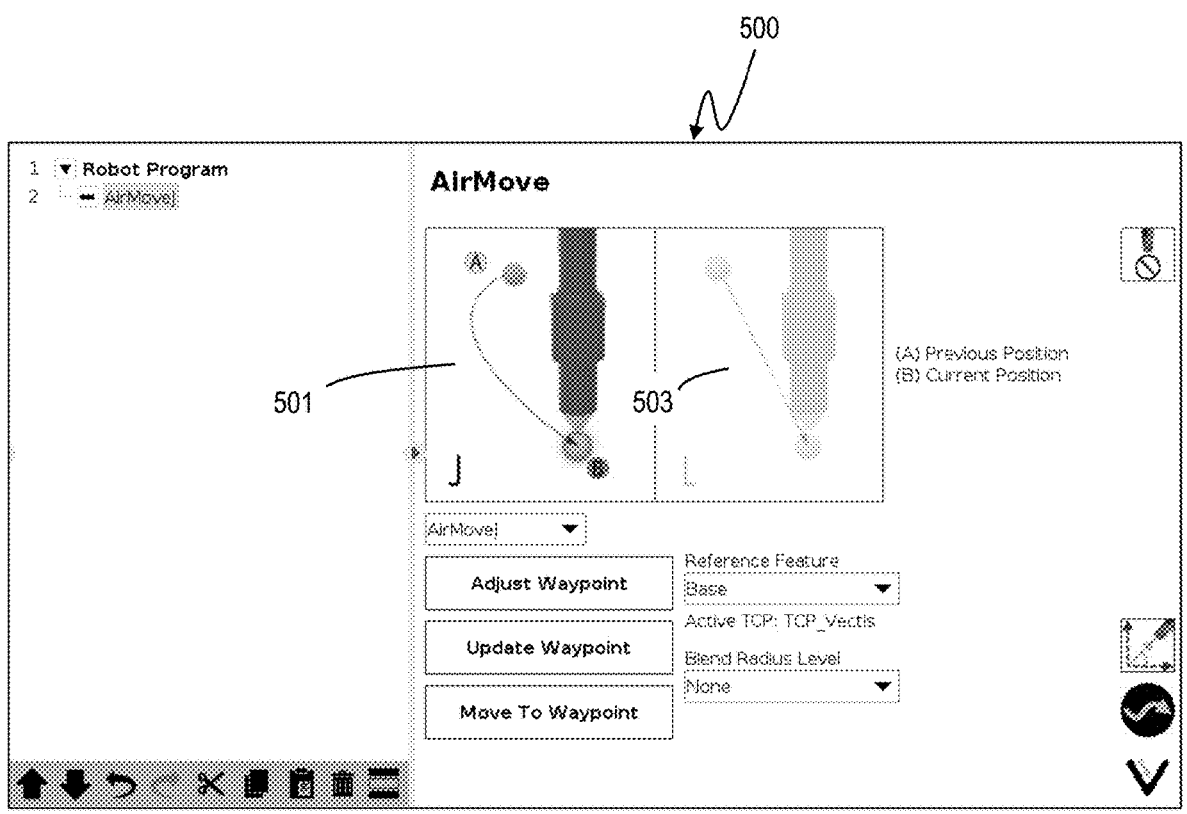
FIG. 22 is a pictorial representation or screen shot of an AirMove workflow defining a curved cut path as displayed on an input screen of a teach pendant.
Figure 23:
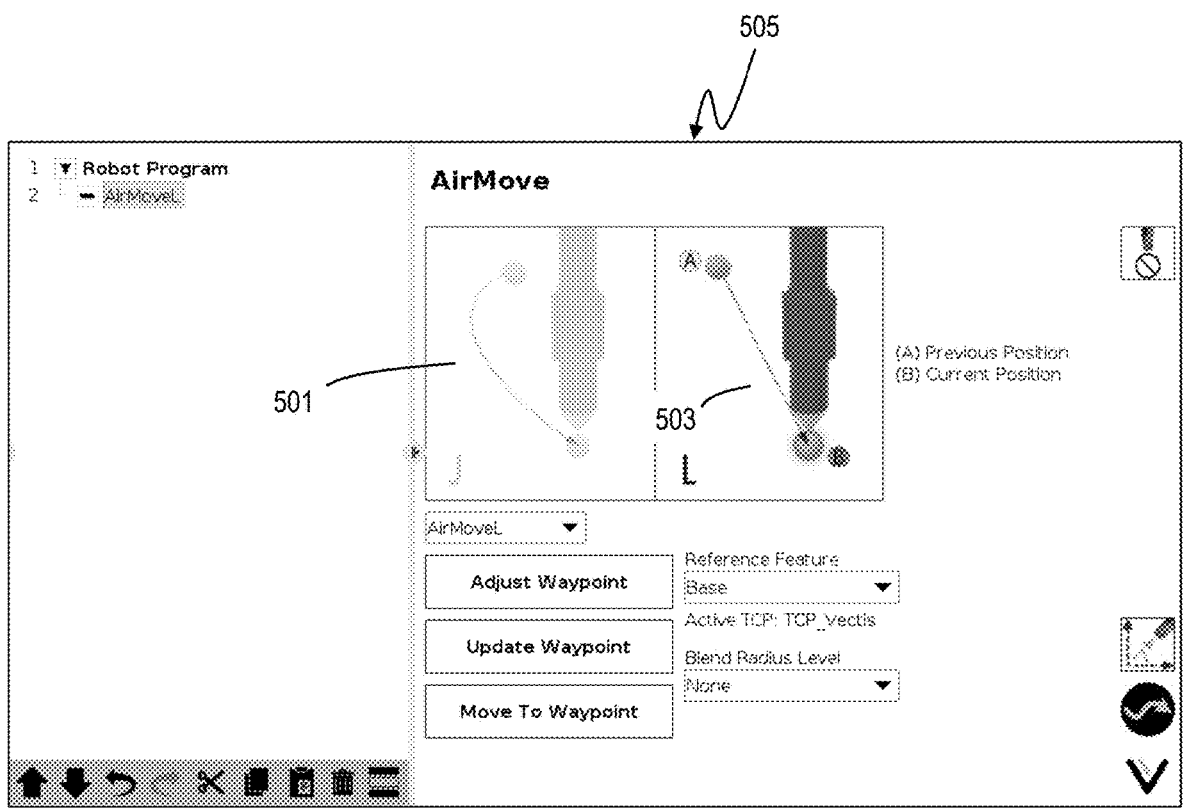
FIG. 23 is a pictorial representation or screen shot of an AirMove workflow defining a linear cut path as displayed on an input screen of a teach pendant.

The operator performs a clearance move of the robot arm 55, designated as an AirMove Workflow in step A, FIG. 19 and creates a home position shown as point A on a curved AirMove screenshot 500 and as point A on a linear AirMove screenshot 505 in FIGS. 22 and 23, respectively, to ensure that the robot arm can start from a home or approach position of a cut path indicated generally at 501 and 503 respectively in each of the pictorial presentations. FIG. 21 presents alternate flow diagrams based upon the operator's selection at step B of AirMoveJ for a curved or circular cut path or choice C of AirMoveL for a linear cut path, choice C. An AirMove is a simple move that positions the arm in the working space of the robot. It can be done via a free joint motion (AirMoveJ) where the robot calculates the most optimal movement or in a linear fashion (AirMoveL) where the robot moves directly to a waypoint in a straight line. In either scenario, the operator positions selected waypoints, also referred to herein as airpoints, by moving the robot arm and torch in the hand-guided jogging mode (either step D or step E in FIG. 21) which the robot saves at step F.

Figure 24:
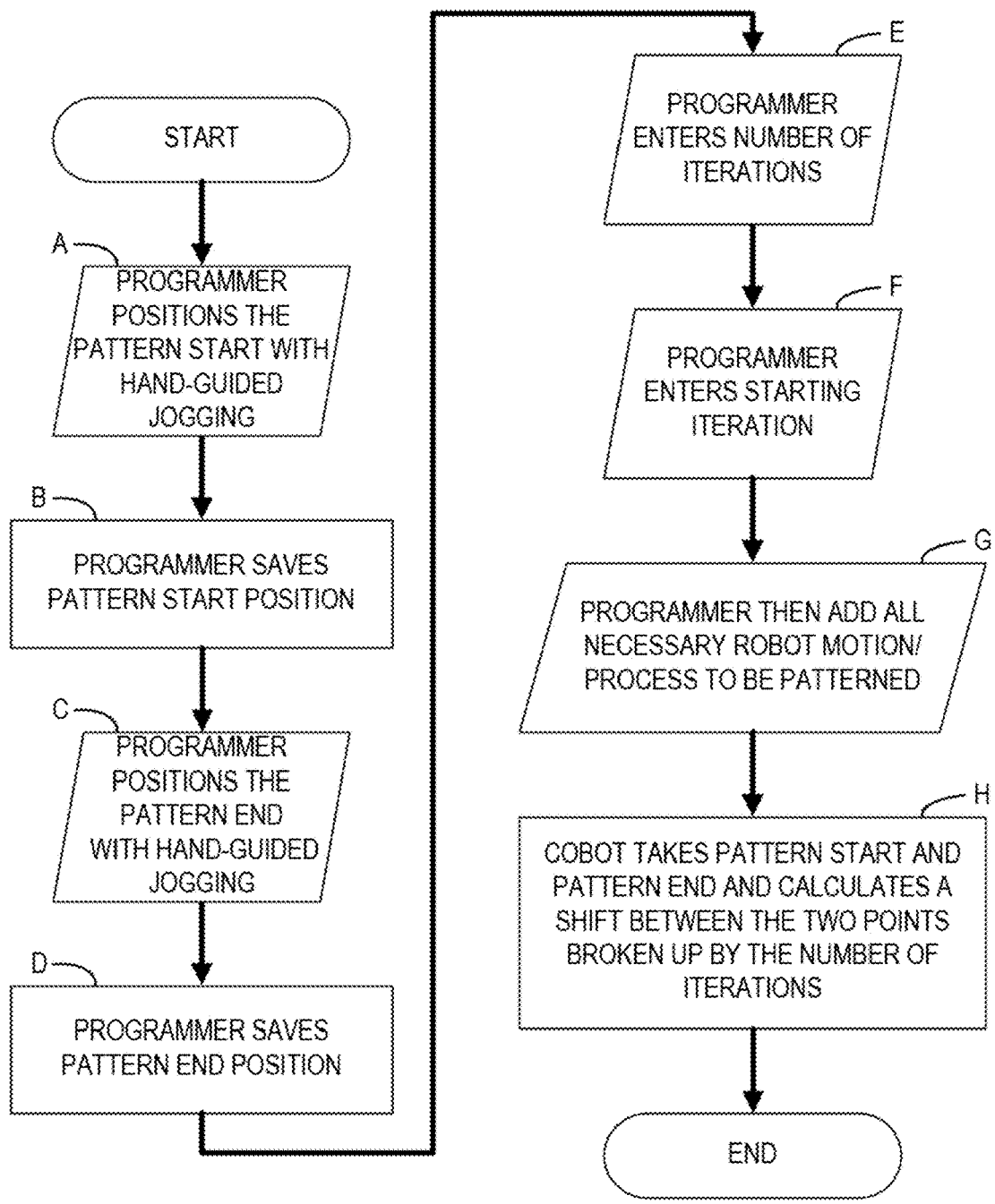
FIG. 24 is a flow diagram of a Pattern workflow.
Figure 25:
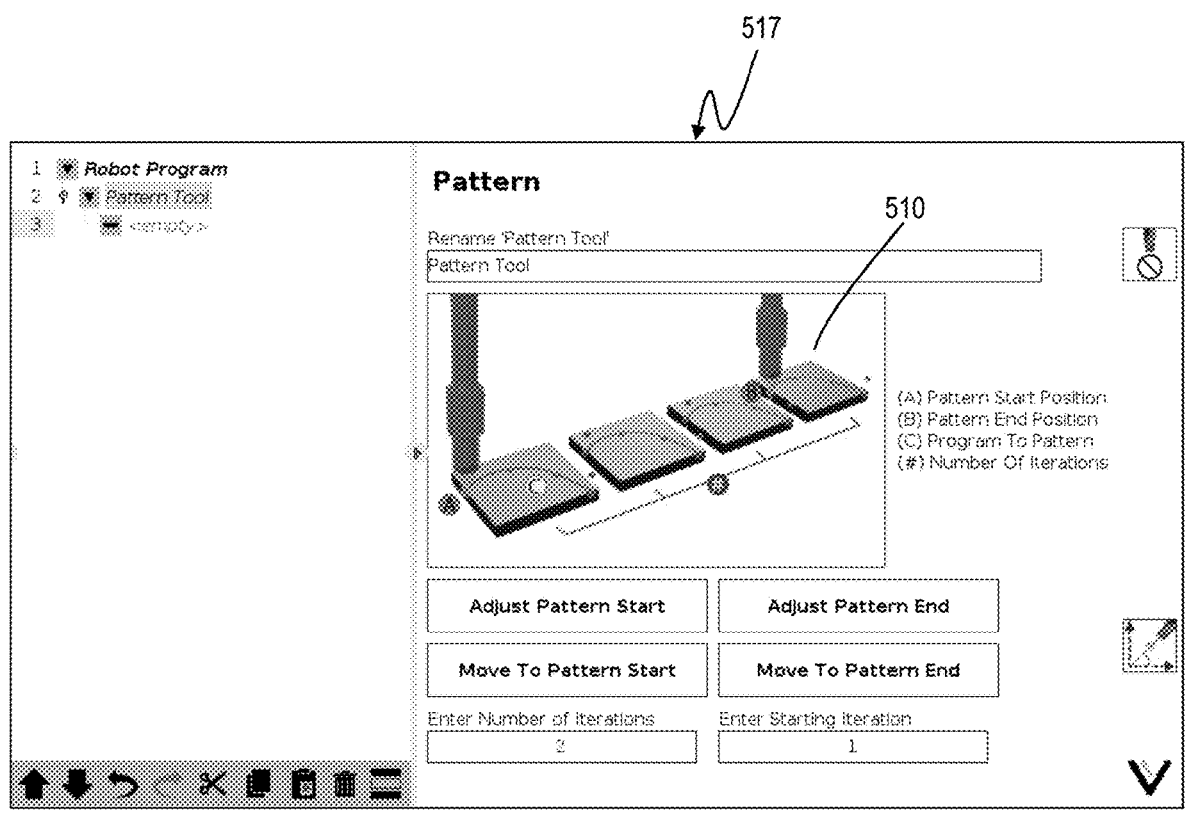
FIG. 25 is a pictorial representation or screen shot of a Pattern Tool defining a non-linear cut path to be repeated as displayed on an input screen of a teach pendant.

Depending upon the configuration of the cut path, the operator may select a Pattern Workflow subroutine at FIG. 19, step B to establish a cut pattern such as pattern 510 of a circular cut path illustrated in the image of a Pattern screen shot 517 in FIG. 25. The steps of a Pattern Workflow 515 are shown in a flow chart presented in FIG. 24. The operator programs a Pattern Start position (point A in FIG. 25) in hand-guided jogging mode, FIG. 24, step A and saves it in the robot program, step B. The operator then enters hand-guided jogging mode and establishes a Pattern End position (point B in FIG. 25) in step C and saves it, step D. The Pattern Workflow subroutine allows the operator to program a repeatable part that is in a straight line for a number of iterations, which allows a complex program in one area of the working space of the robot to be replicated in a straight line for any number of duplicate setups. This is done by programming a Pattern Start position and a Pattern End position and then entering the number of iterations to be executed, FIG. 24, step E and entering the Starting Iteration, FIG. 24, step F.

At FIG. 24, step G, the programmer defines any number of program nodes and essentially "copies, pastes, translates" that set of program nodes and all necessary robot motions along a defined linear "pattern path" for the defined number of iterations. The Pattern Workflow subroutine is used for quick and uncomplicated programming of a fixture nest of identical parts, for copying a feature's cut path to various positions on a part, or for intermittent tacking. However, the feature only works successfully when the parts to be cut and the positioning fixture for the assembly have very consistent locations and spacing. When the robot executes the program that should be patterned, it calculates a linear shift from the Pattern Start point to the Pattern End point and adjusts the program accordingly by calculating a shift between the two points divided by the number of iterations, FIG. 24, step H.

If the work materials are not always in the same position or in a line to use the Pattern Workflow subroutine, at step C, FIG. 19, an operator may use a Search Offset Workflow subroutine which selection allows the operator to manually shift the program in an X, Y, or Z direction by determining and entering required offset values. The relationship between an original part location and an offset part location are shown in screenshot images 515, 520 and 525 in FIGS. 27, 28 and 29, respectively, and the process steps are illustrated in a flowchart presented in FIG. 26.

Figure 26:
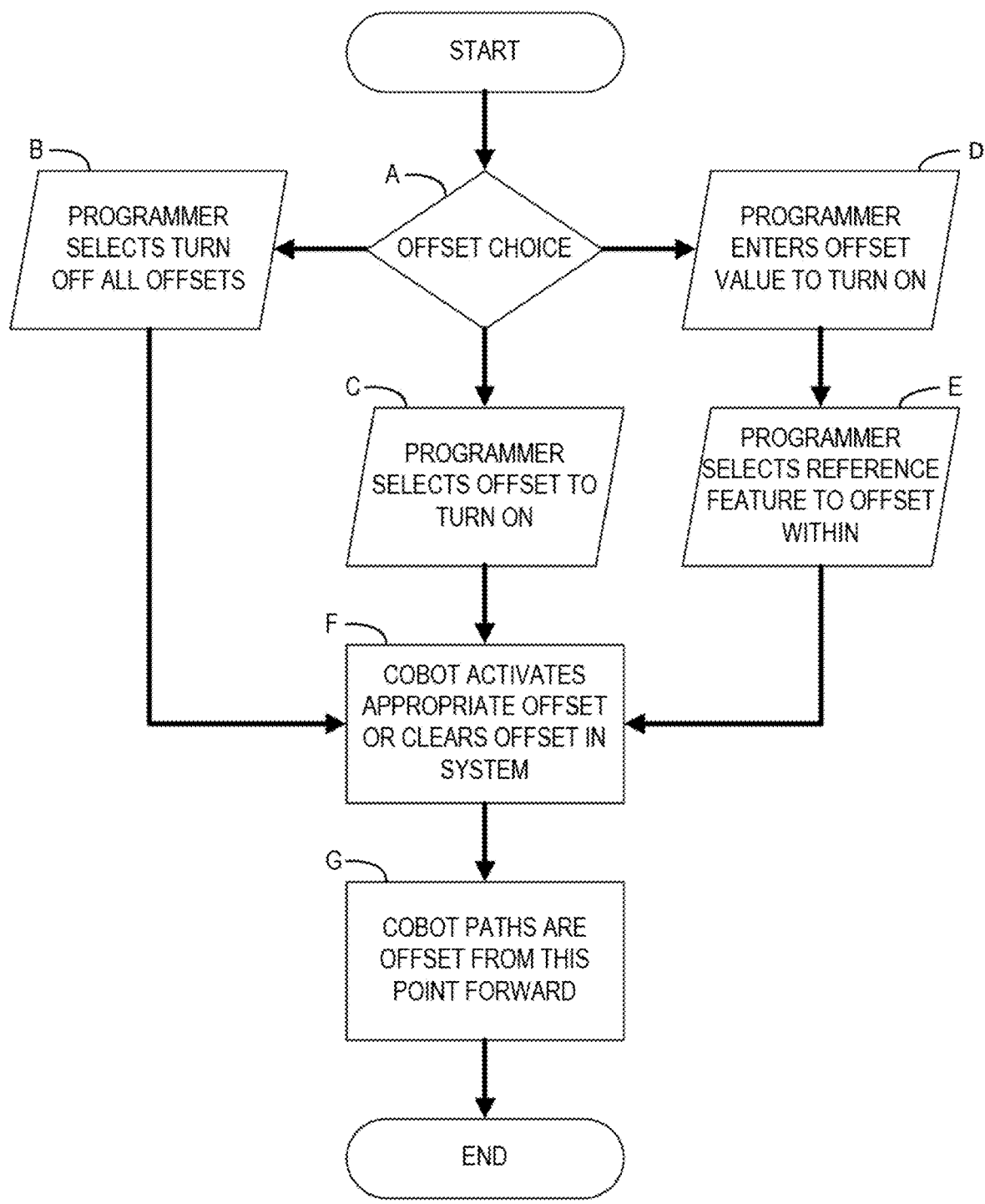
FIG. 26 is a flow diagram of a SearchOffset workflow.
Figure 27:
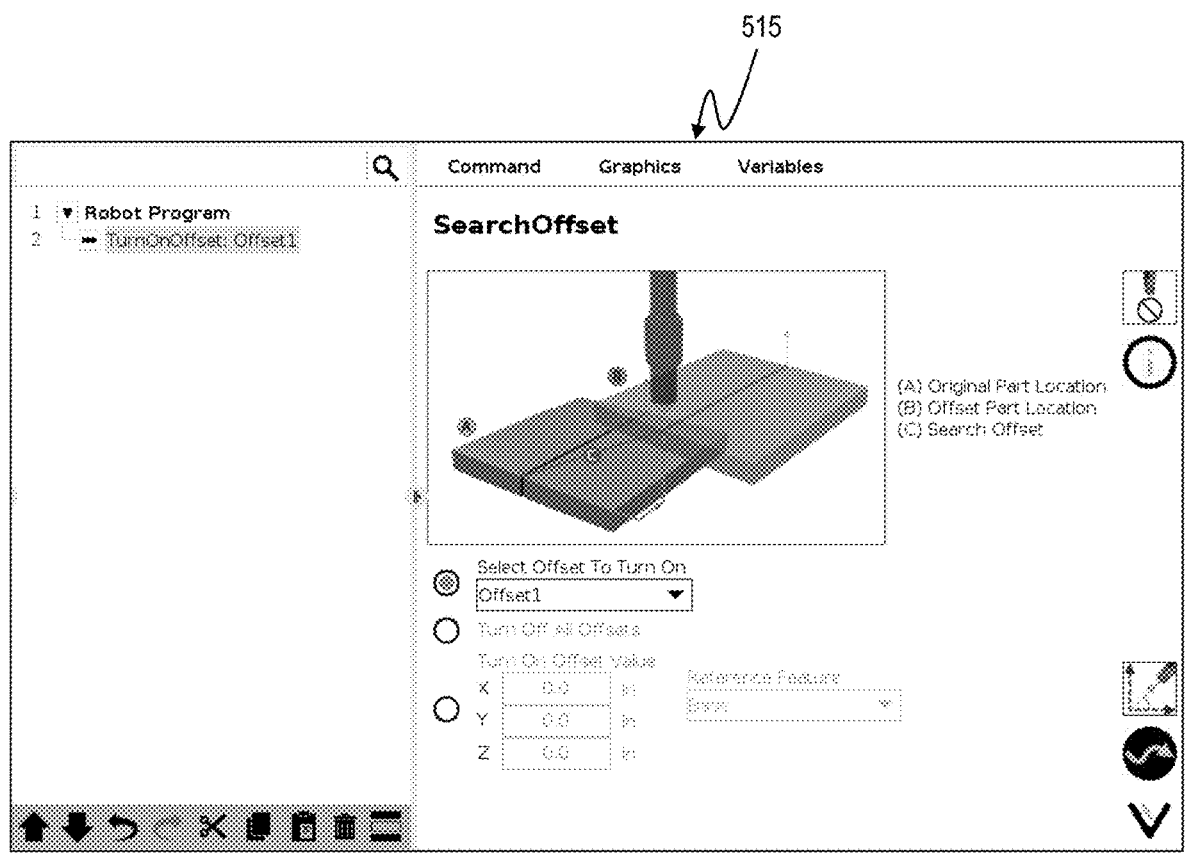
FIG. 27 is a pictorial representation or screen shot of a SearchOffset workflow defining offset values to turn on as displayed on an input screen of a teach pendant.
Figure 28:
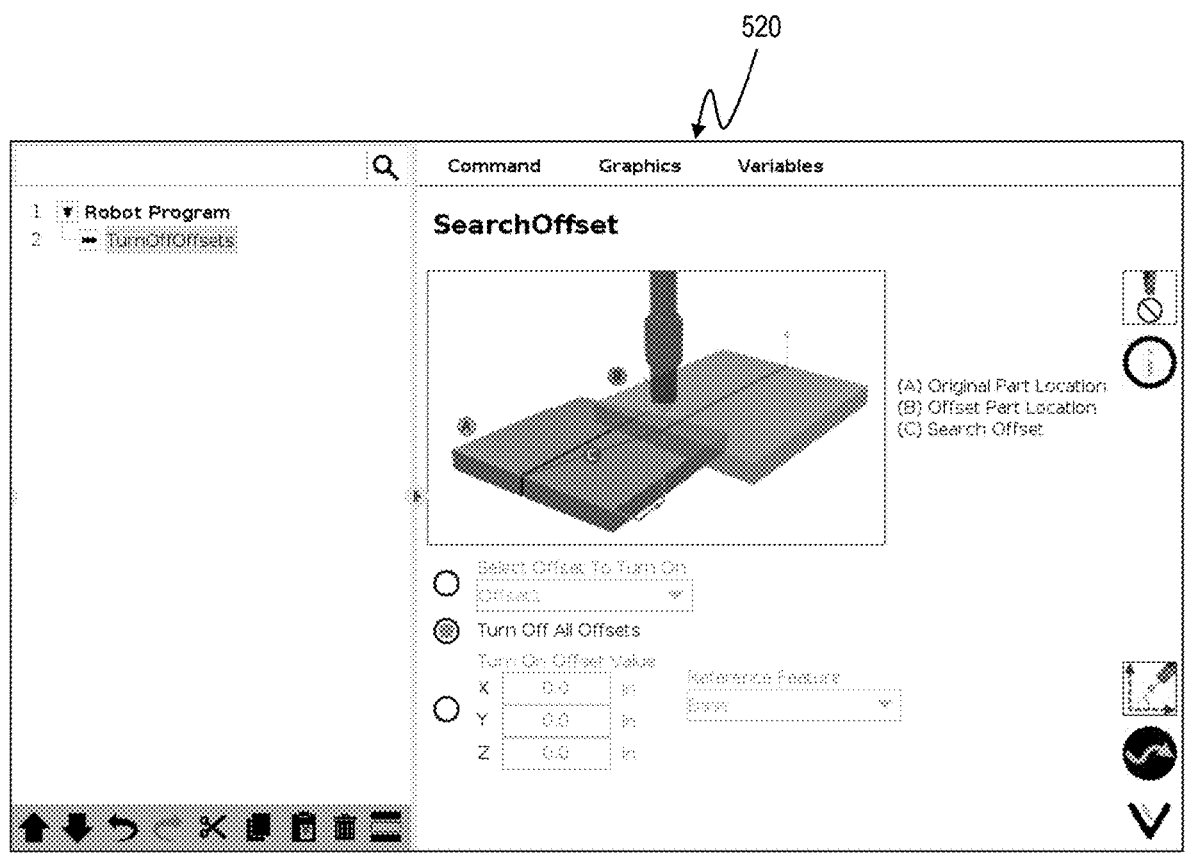
FIG. 28 is a pictorial representation or screen shot of a SearchOffset workflow defining offset values to turn off as displayed on an input screen of a teach pendant.
Figure 29:
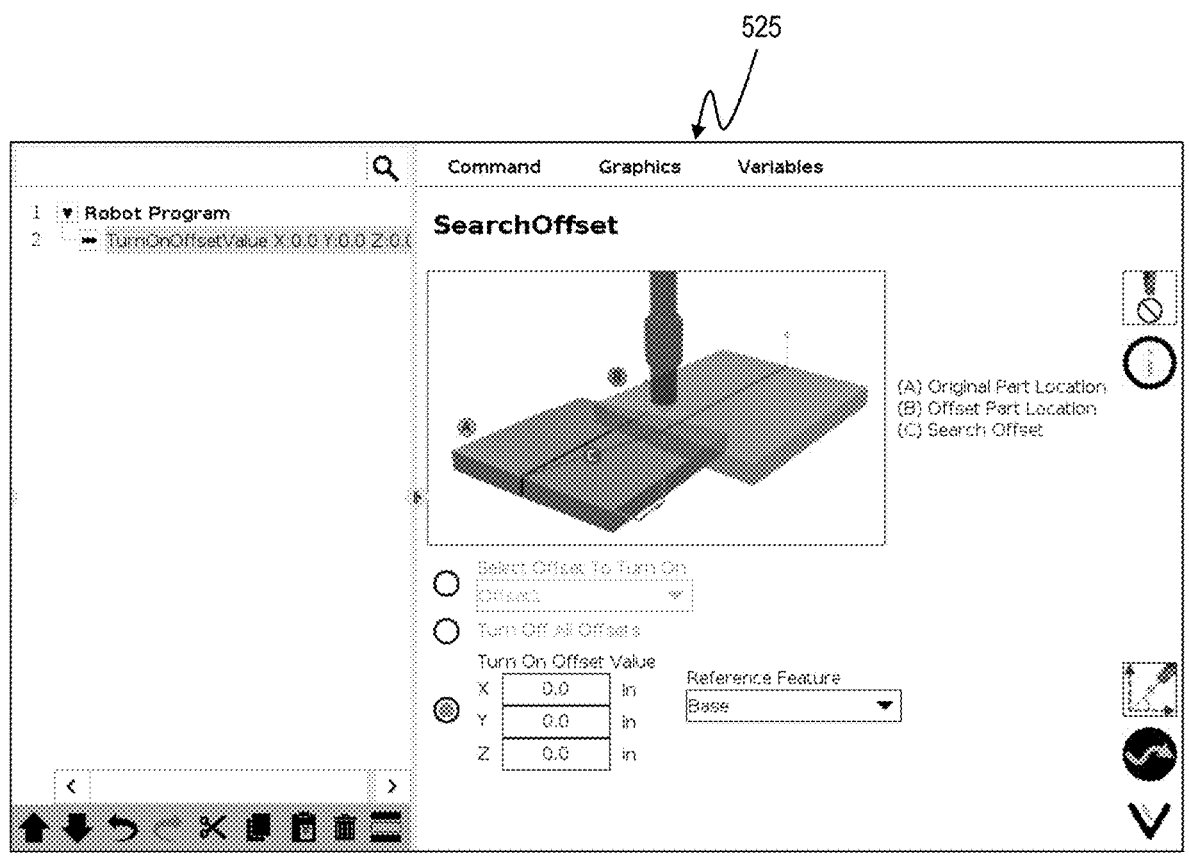
FIG. 29 is a pictorial representation or screen shot of a SearchOffset workflow defining specific offset values to turn on as displayed on an input screen of a teach pendant.

At FIG. 26, step A, the operator selects either to "Turn Off All Offsets", step B; or selects which "Offset to Turn On", step C; or elects to enter an "Offset Value" to manually activate, step D. The reference feature for each offset is selected at step E. The "Turn Off All Offsets" turns off all stored program offsets. The "Select Offset to Turn On" will turn on the offset that is saved for that particular named offset. At step F, the robot either activates the selected offsets or turns off stored offsets in response to the elections made in at the offset choice step, step A. At step G, the path of the collaborative robot during performance of the selected cutting program are offset from this point forward.

Referring now to step E, FIG. 19, if any of the optional steps B and/or C have been selected, the operator again performs a clearance move of the robot arm 55, the AirMove Workflow defined in step A, FIG. 19 to create a home position. The operator may then select a SearchPartL routine at FIG. 19, step E, the features of which are displayed in screenshot image 530 in FIG. 31. The SearchPart program is used to perform a one-dimensional linear search to identify a program displacement that shifts a program in response to detected positional, rotational or distortional inconsistencies in the work material or unrepeatable part configurations. The SearhPart workflow is shown a flowchart presented in FIG. 30.

Figure 30:
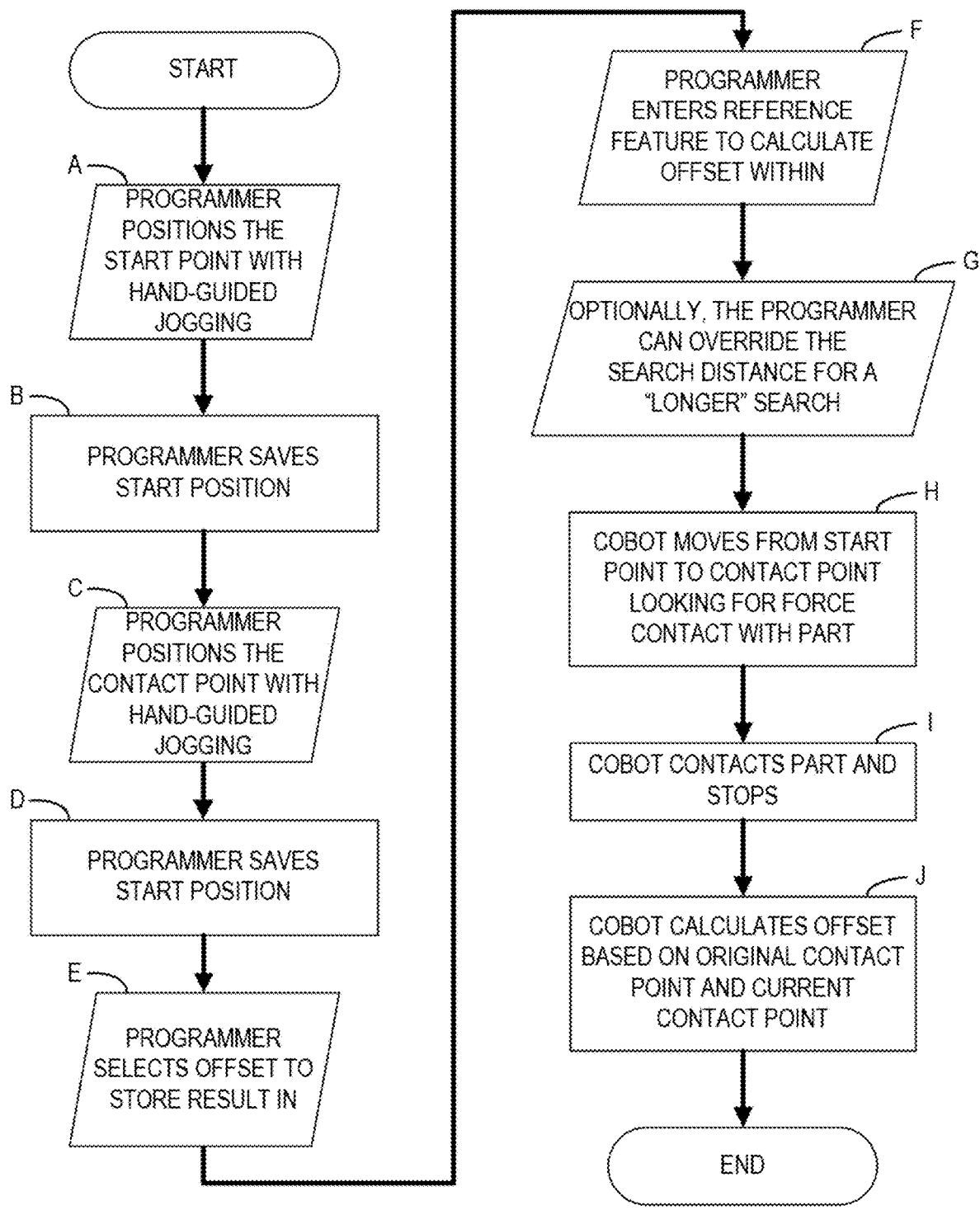
FIG. 30 is a flow diagram of a SearchPart workflow.
Figure 31:
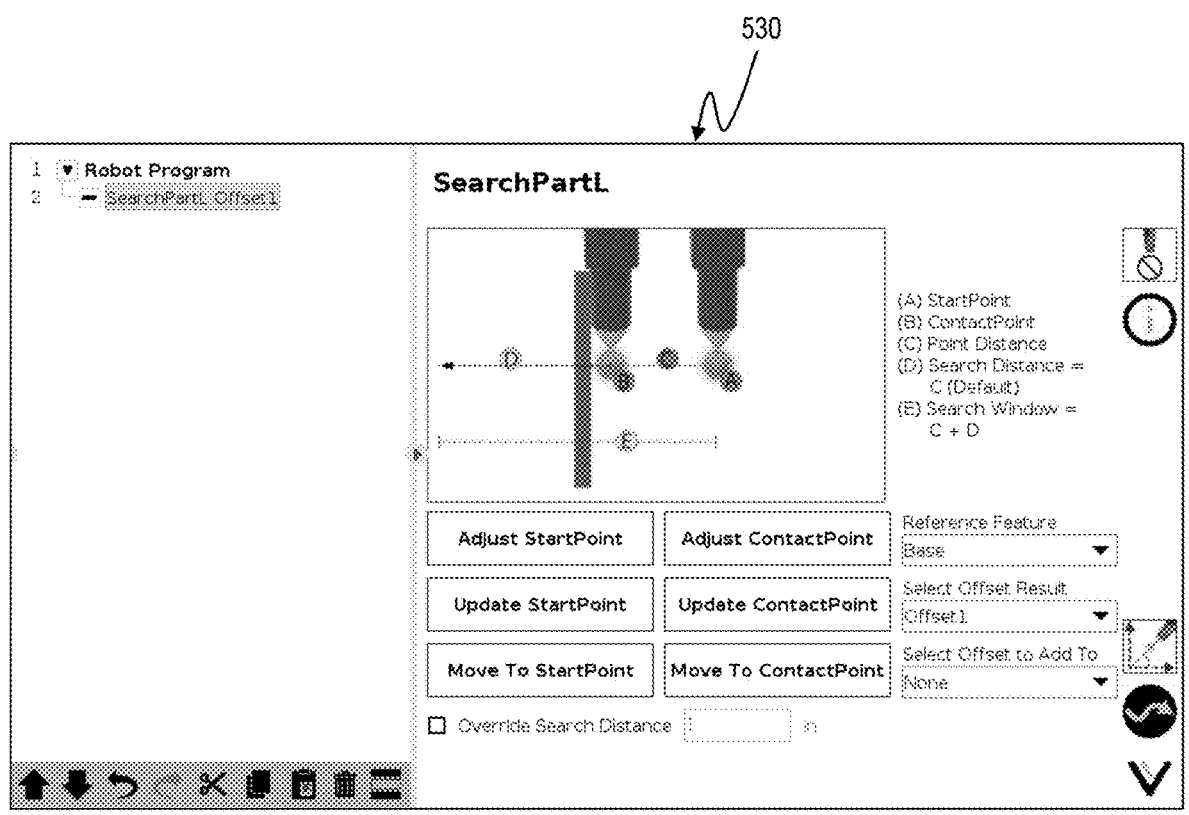
FIG. 31 is a pictorial representation or screen shot of a Search Part workflow illustrating values identified during a search as displayed on an input screen of a teach pendant.

To set up the search, the programmer positions the robot via the hand-guided jogging mode and sets a search start point that is not in contact with the part, FIG. 30, step A and saves it in the robot program, step B. The programmer then positions the contact point in hand-guided jogging mode in contact with the work materials to be cut, step C and saves it as a start point, step D, which essentially zero's out the search which would return an offset of 0, had the search been executed. At step E, the programmer then selects the offset name for storage and retrieval of the resultant offset value in the robot program and enters a reference feature upon which an offset may be calculated, step F. An exemplary search distance is shown as D in the screenshot in FIG. 31. Optionally, at step G, the operator may override the search distance and generate a new, longer search distance if deemed necessary. The robot is then ready to execute the search and does so by moving in the programmed search direction and waiting for force feedback or a signal from the process unit that the part has been contacted, step H. Thereafter, the robot stops/halts its motion, step I. Once this contact has occurred, the new contact point is compared to the old contact point and the offset value is calculated and stored in the offset name in the robot program, step J. Additionally, the programmer can choose an offset to start with and "add to" in order to create a compounded two or three-dimensional search.

Figure 32A:
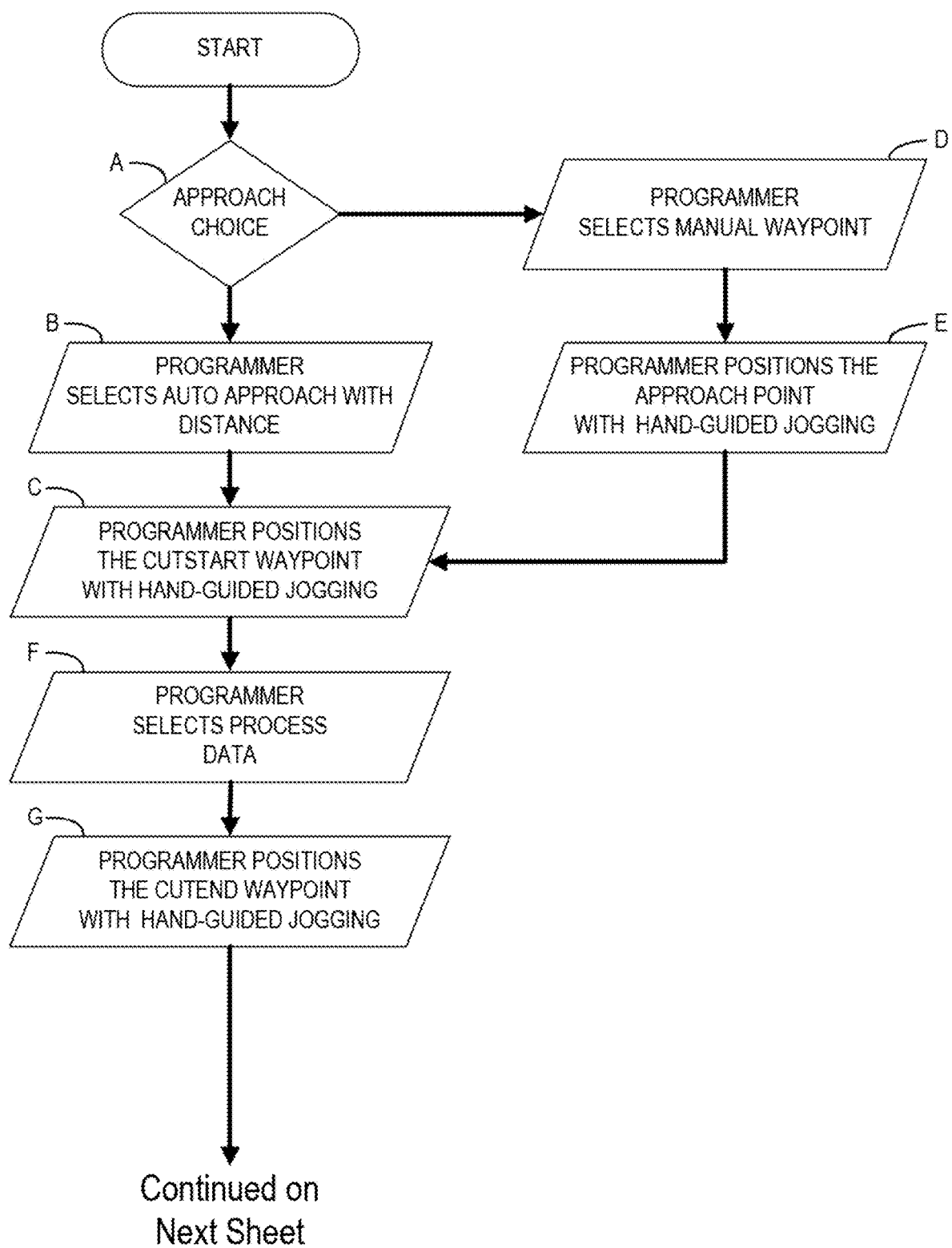
FIG. 32 is a flow diagram of a Cut Template Custom workflow.
Figure 32B:
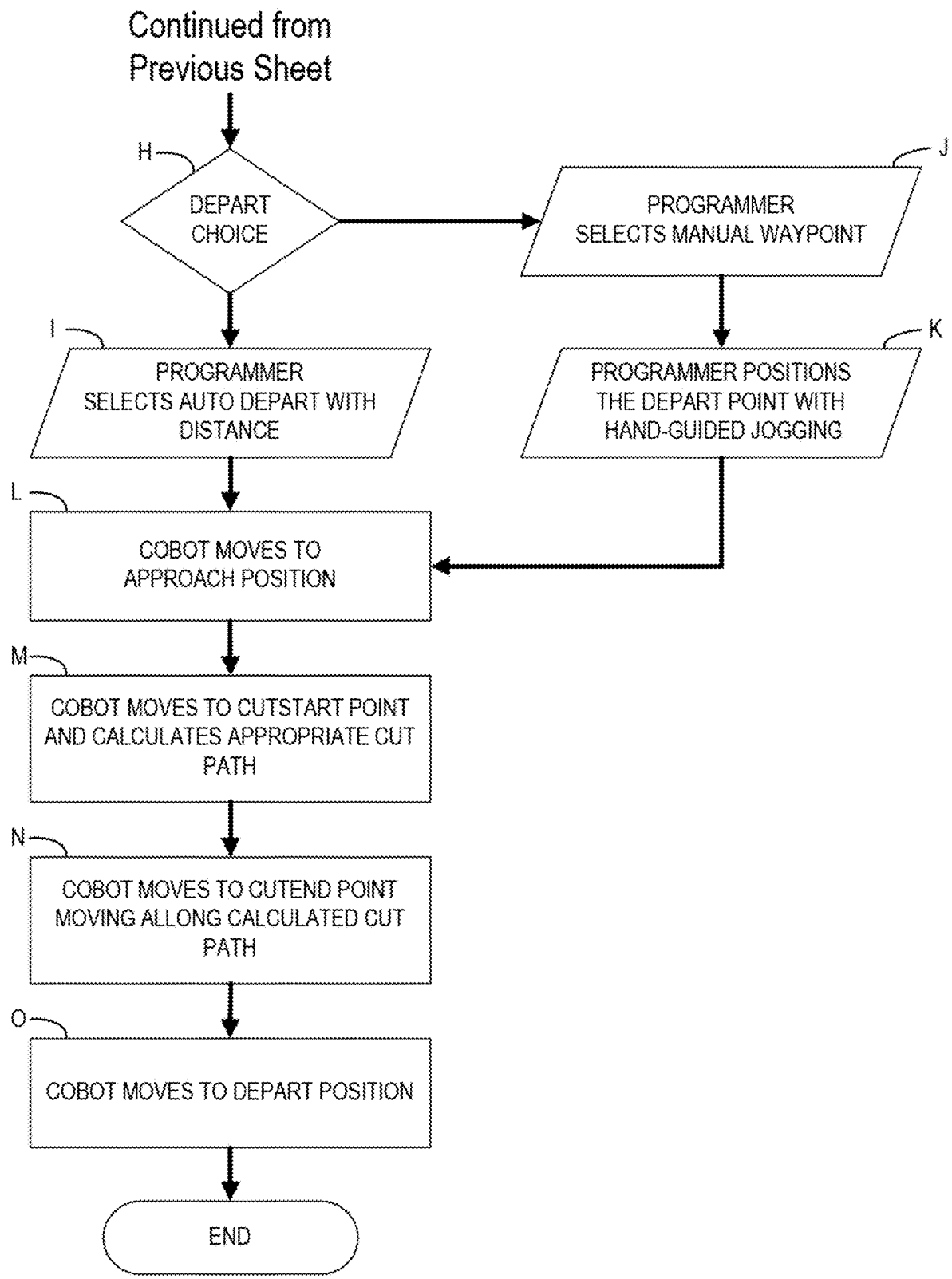
Figure 33:
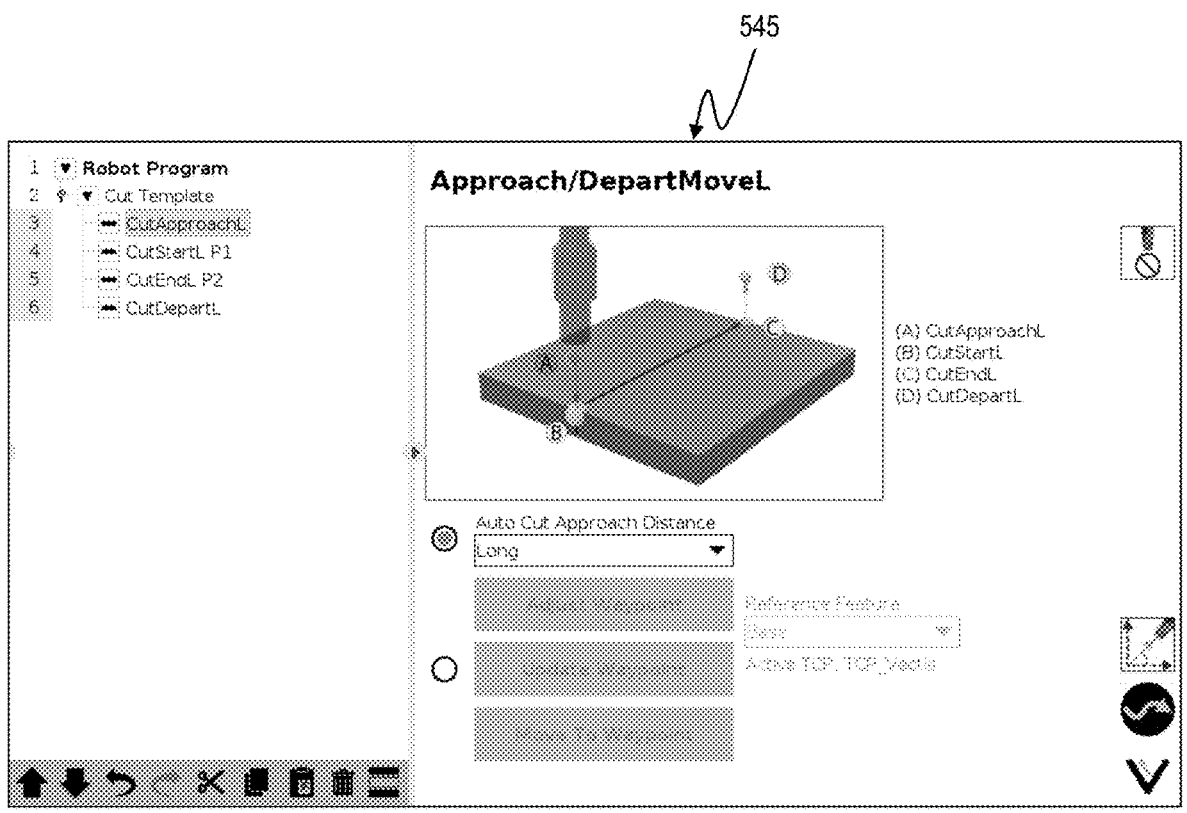
FIG. 33 is a pictorial representation or screen shot of a Cut Template Custom workflow illustrating a cut approach point and distance.
Figure 34:
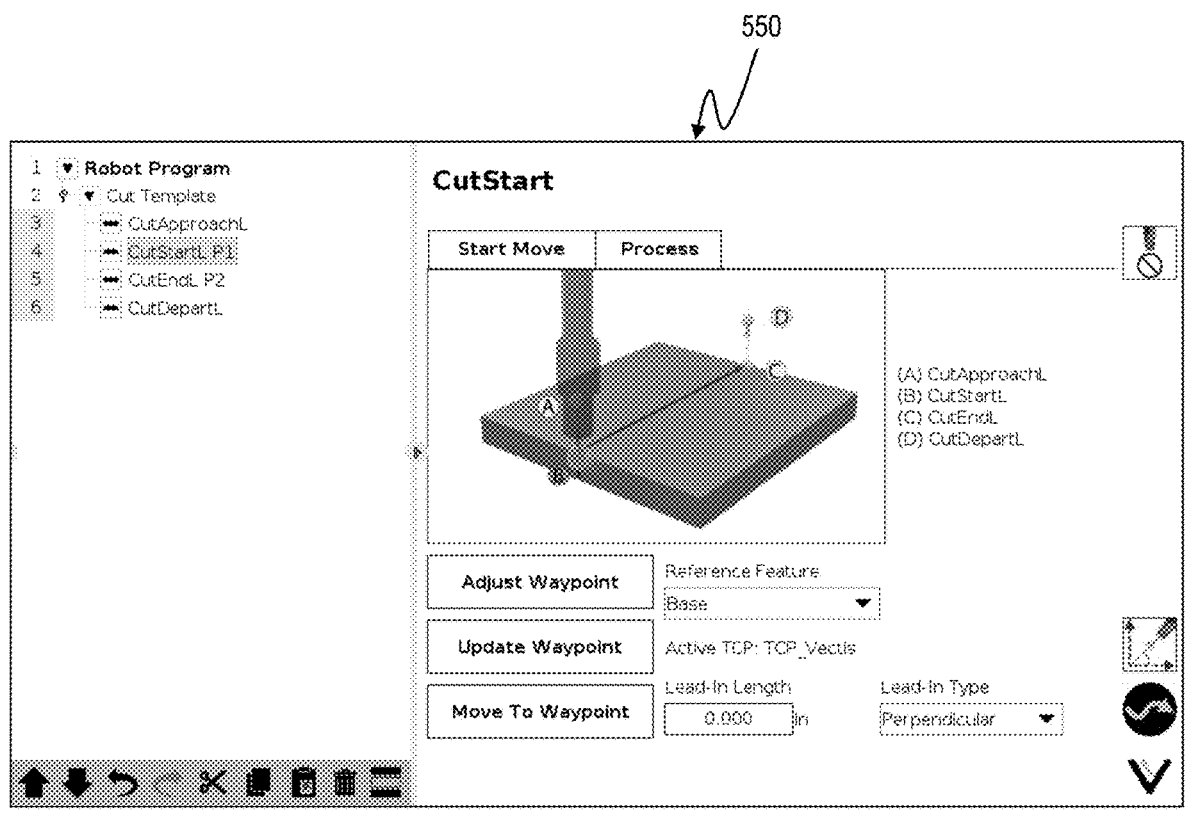
FIG. 34 is a pictorial representation or screen shot of a Cut Template Custom workflow illustrating a cut start point.

Referring again to FIG. 19, depending upon the cut joint configuration required by a given cutting or assembly procedure, at this point in the workflow, an operator has several work paths from which to choose to complete the generation of the cuts specified in the procedure documents. One option designated "Cut Template Workflow Custom" may be selected at step G, FIG. 19. A Cut Template Workflow flow diagram is shown in FIG. 32. The Cut Template gives the programmer the ability to trace out a cut path having a three-dimensional shape with any number of segments both linear and circular. The Cut Template is used to select and assemble an approach point, a cutting start point, any intermediate cutting points, a cutting end point, and a depart point for a cut, thus ensuring that the robot always move back to a clearance point (approach and depart) to prevent crashing of the system into the work materials.

A Cut Template is programmed by first choosing to use an automatically positioned approach point or by selecting the waypoint manually. This step is shown at step A in FIG. 32. If an automatically positioned approach is selected, step B as shown as point A in the Approach screenshot 545 of FIG. 34, in the next step, step C, the operator selects a "CutStart" waypoint in hand-guided jogging mode shown as point B in the CutStart screenshot 550 of FIG. 34 and programs the CutStart position where the arc will be initiated.

Figure 35:
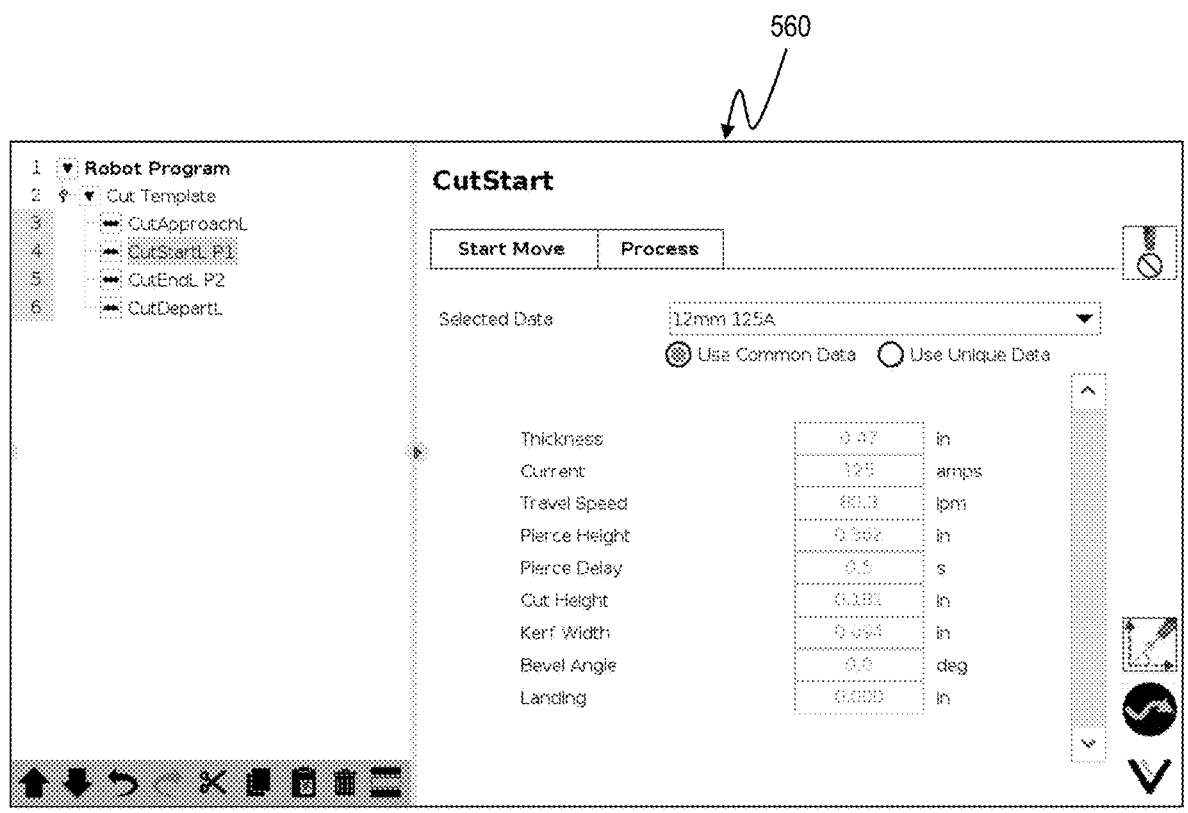
FIG. 35 is a pictorial representation or screen shot of a Cut Template Custom workflow illustrating cut process data.
Figure 36:
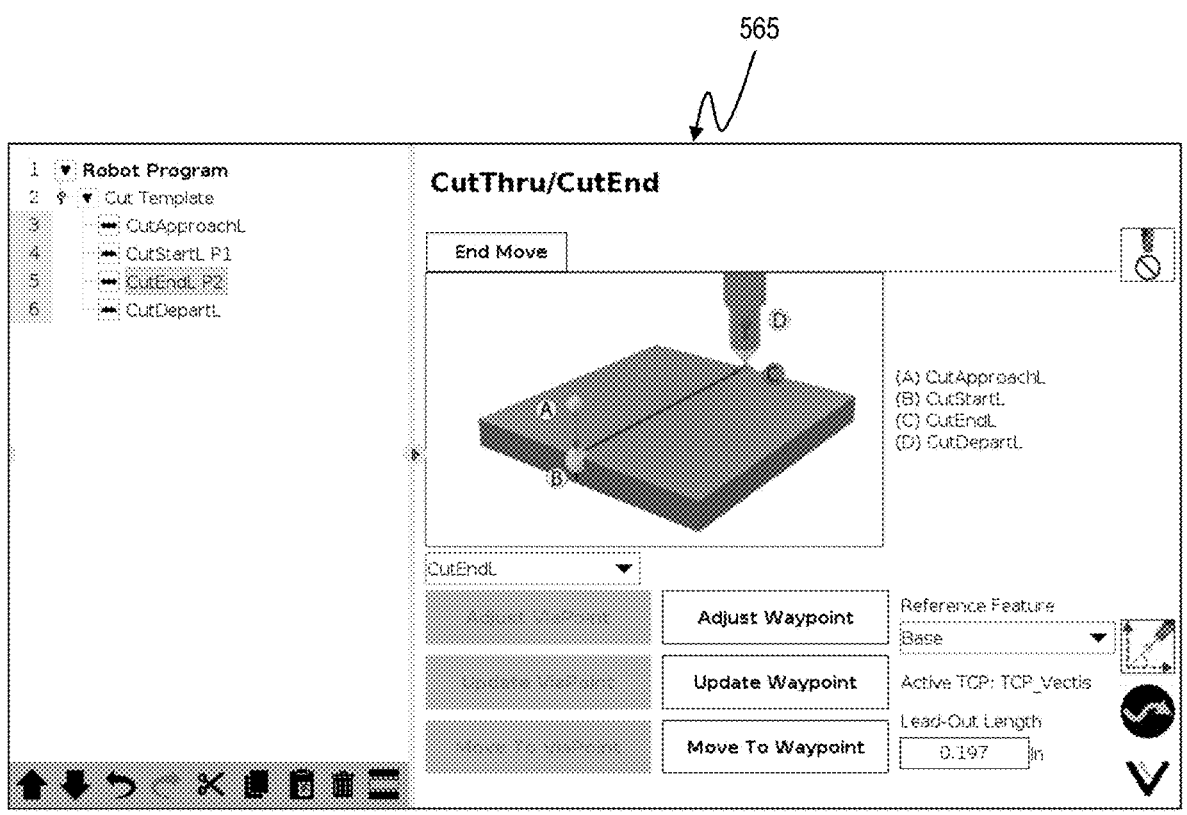
FIG. 36 is a pictorial representation or screen shot of a Cut Template Custom workflow illustrating a cut end point.
Figure 37:
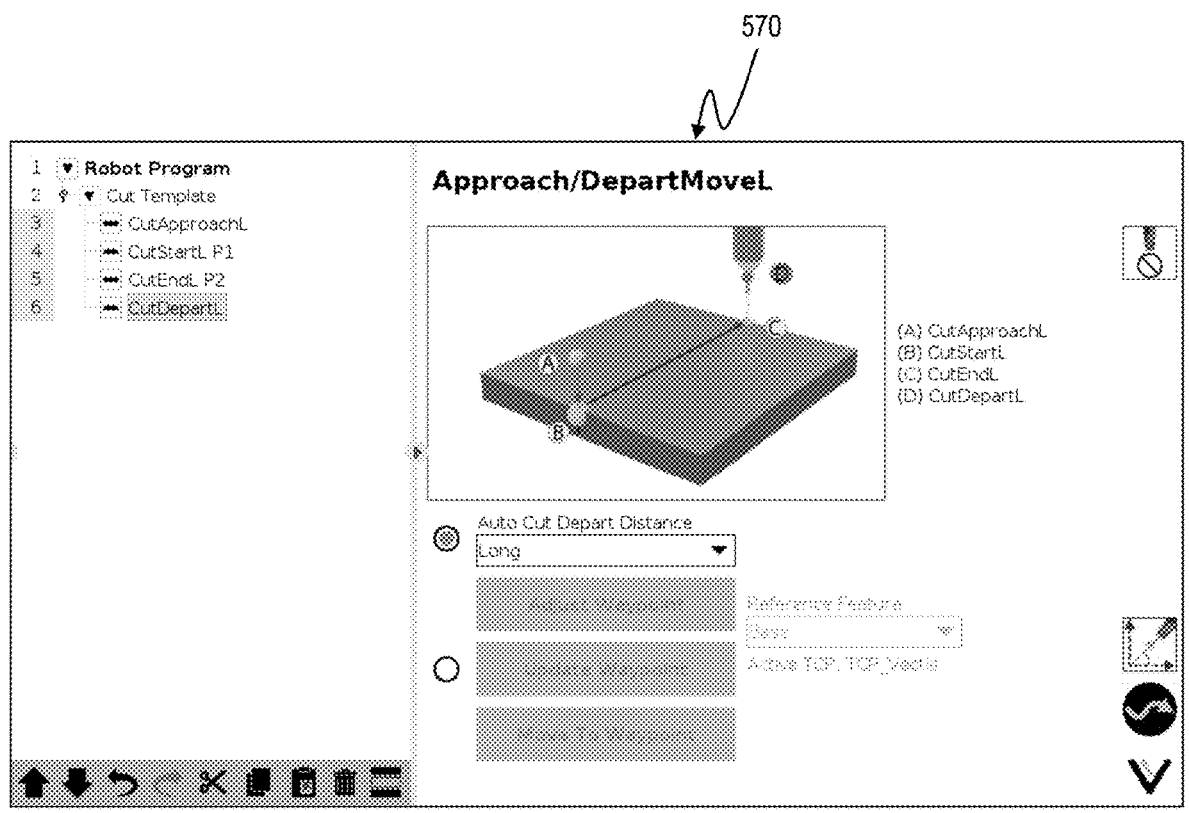
FIG. 37 is a pictorial representation or screen shot of a Cut Template Custom workflow illustrating a cut depart point and distance.

Next, at FIG. 35, steps F and G, the programmer selects the cut process data and adds in all necessary moves to trace out the cut joint to be cut using any combination of linear and circular CutThru's or CutEnd's. These steps are visually shown in screenshots 560 and 565 in FIGS. 35 and 36, respectively. After all the cut points are set at step H, the programmer chooses an automatic depart position, step I as shown as point D in the Depart screenshot 570 of FIG. 37, or selects a manual depart waypoint in hand-guided jogging mode at step J and programs this waypoint manually at step K. Once all the cut path positions are set, the programmer goes back to the CutStart node at step C, chooses the process to be executed while moving along the path from CutStart to CutThru or CutEnd. This process maybe a straight path or one that has an angle relative to the surface normal to create a bevel edge such as edge 360 in FIG. 12. This process might also be changed at a CutThru in order to update the process based a change in joint geometry. When the robot executes this template, the robot will move to the approach position, step L, set up all cutting monitoring and calculate all necessary angled movement, move to the cut start position, and initiate the arc, step M. Once the arc is established, the robot moves with the necessary movement to the CutThru's or CutEnd point, step N. Once the cut is complete, the robot will move to the depart position and continue with any remaining program moves, step O. A CutEnd point is shown as point C in screenshot 565 in FIG. 36 and a depart point is shown as point D in screenshot 570 in FIG. 37.

Figure 38A:
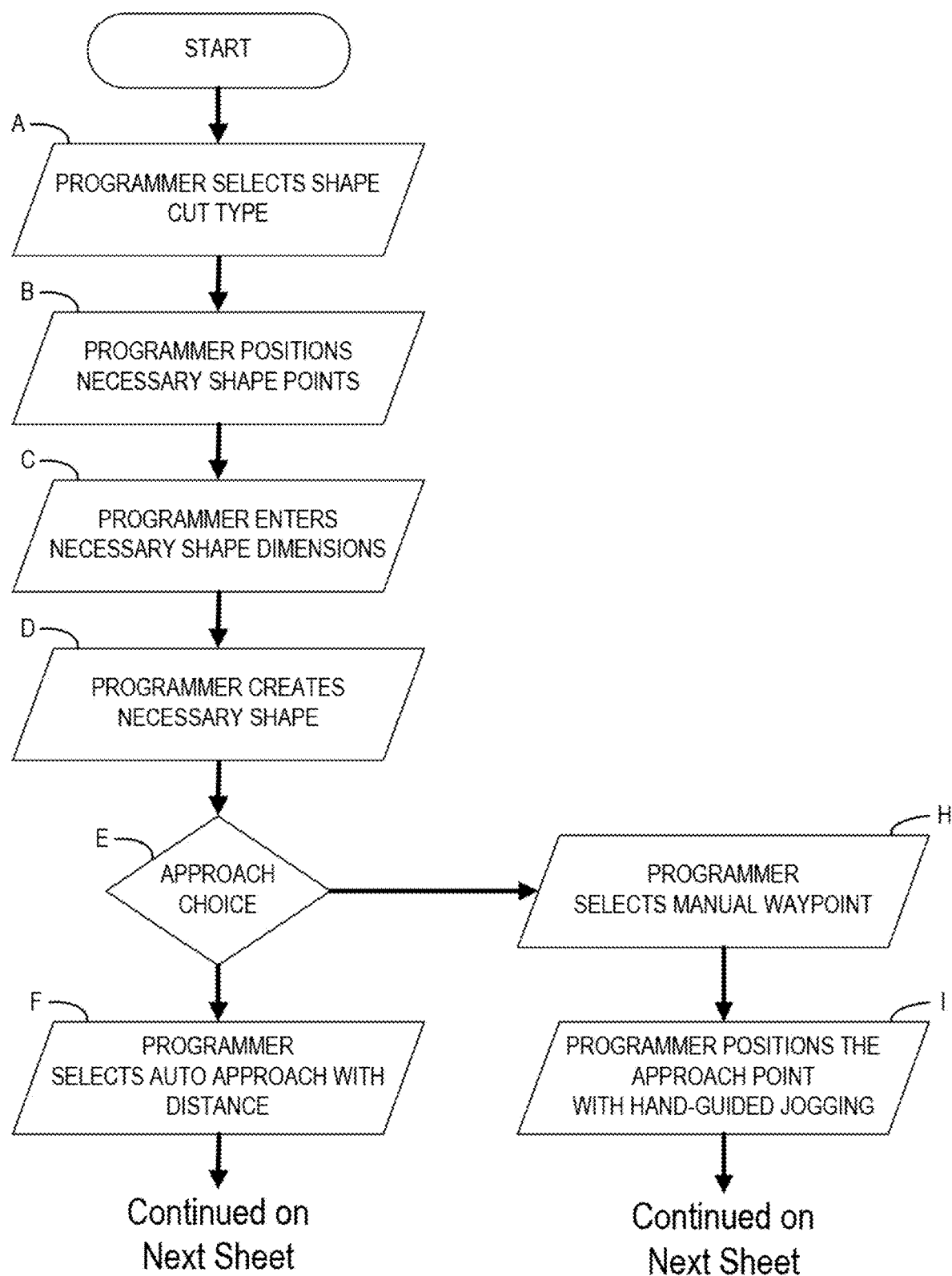
FIG. 38 is a flow diagram of a Cut Template Shape workflow.
Figure 38B:
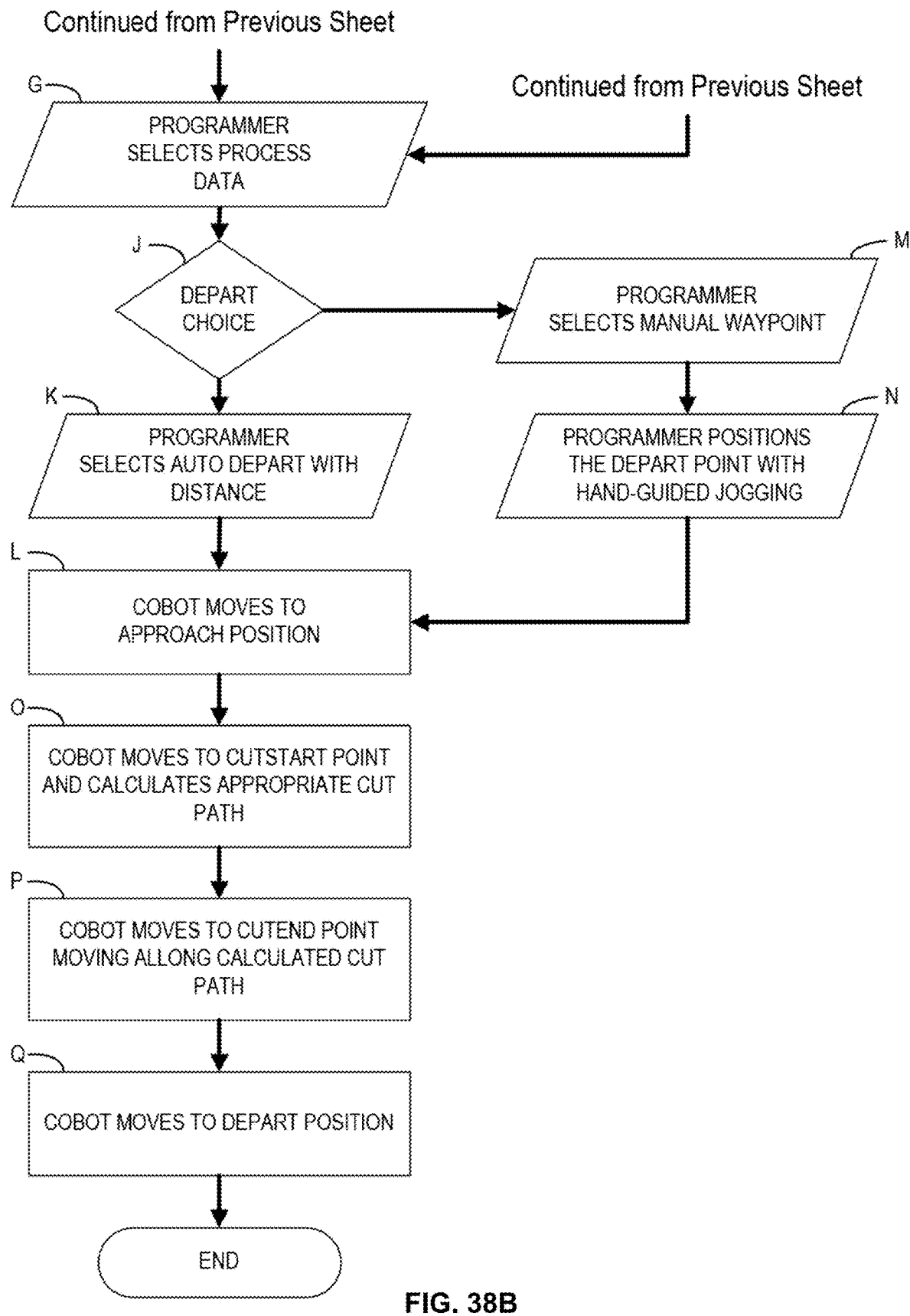
Figure 39:
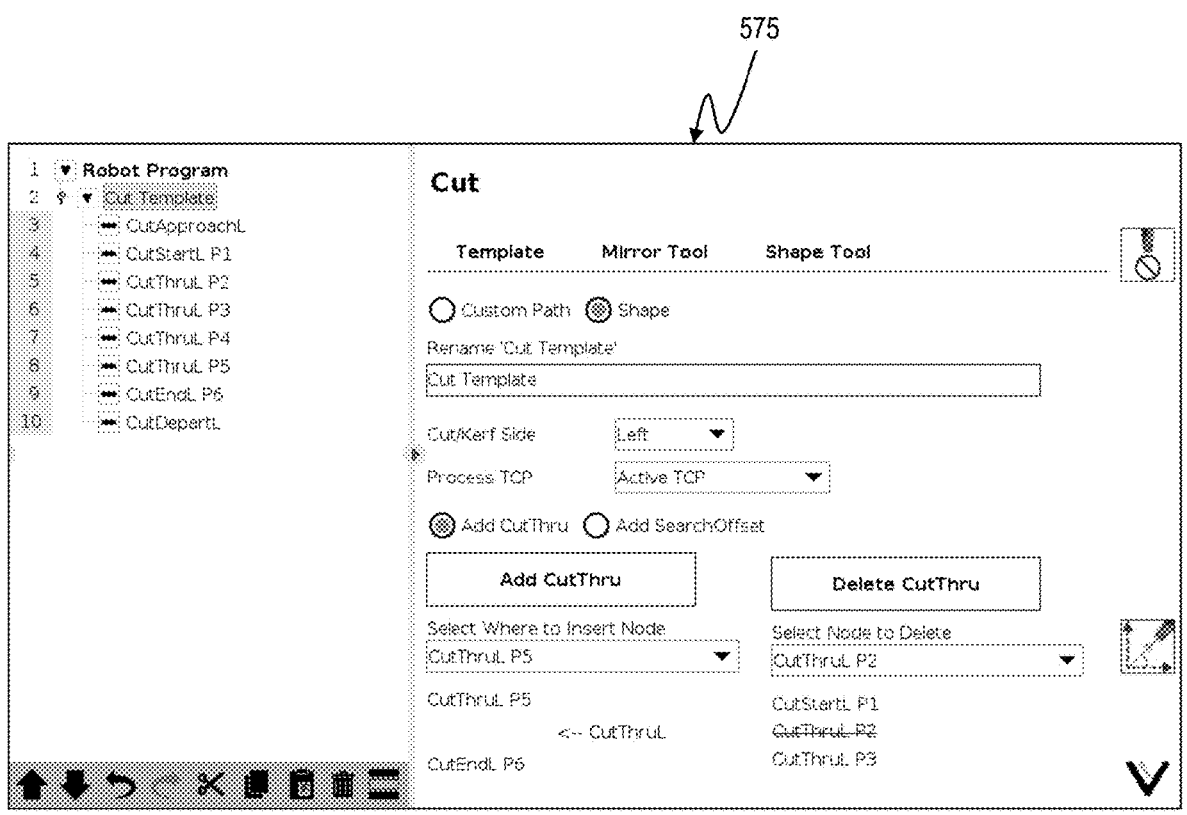
FIG. 39 is a pictorial representation or screen shot of a Cut Template Shape workflow illustrating the shape selection.

Referring again to the cutting workflow flow chart of FIG. 19, an operator may have a cut procedure to execute that requires shape cutting, step H. A cut template shape is exactly the same as a cut template custom except that the cut is programmed using specific shape inputs instead of positioning each cut point manually. A cut template shape workflow flow diagram is shown in FIG. 38.

Beginning at step A, a Cut Template Shape is programmed by first choosing to use a shape cut type instead of a custom segmented cut type. The operator then chooses a shape template from a shape library stored in the control program software. The operator then positions all the necessary positions in Step B, and necessary shape dimensions, Step C, to define the desired shape to cut. The operator then creates the necessary shape in Step D.

Next at step E, the operator chooses to use an automatically positioned approach point of programming or by selecting the waypoint manually, the same manner in which these steps are performed in programming a Cut Template. If an automatically positioned approach is selected, step F, in the next step, step G, the operator selects the process data similar to the Cut Template Custom. He or she selects either an AutoDepart with distance, step J or elects to manually select a depart waypoint, step K. If the manual selection step is chosen, the operator then positions the torch at the depart point manually using the hand-guided jogging mode at step L.

Once these new parameters are added to the cut, the robot is ready to calculate the physical cut shape and execute the cuts. When the robot executes this template, the robot will move to the approach position, step L, and, at step O, will set up all cutting monitoring, calculates all the individual cut segments along the length of the path. The robot then moves to the cut start position and initiates the arc. Once the arc is established, the robot moves with the necessary movement to the end of the individual stitch cut shown at step P. Once the cut is complete, the robot will move to the depart position and continue with any remaining program moves.

Figure 40:
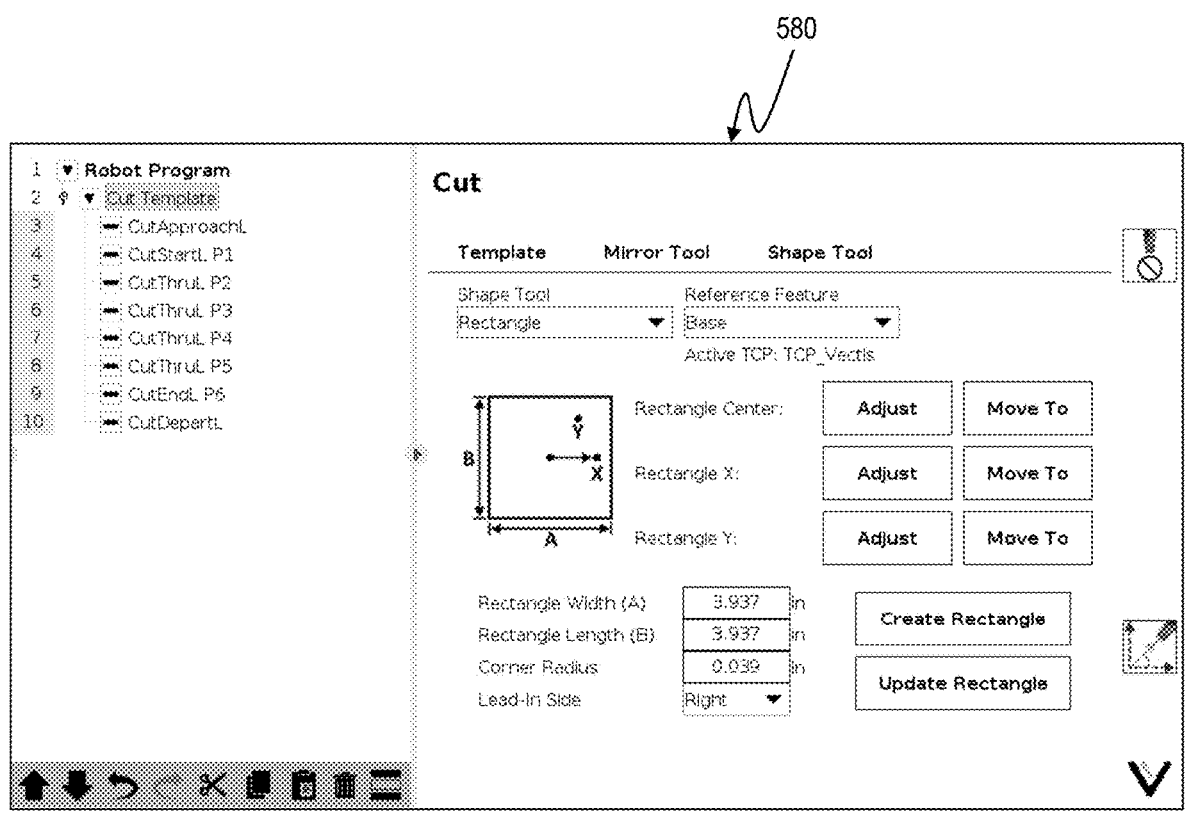
FIG. 40 is a pictorial representation or screen shot of a Cut Template Shape workflow illustrating the shape parameter input.
Figure 41:
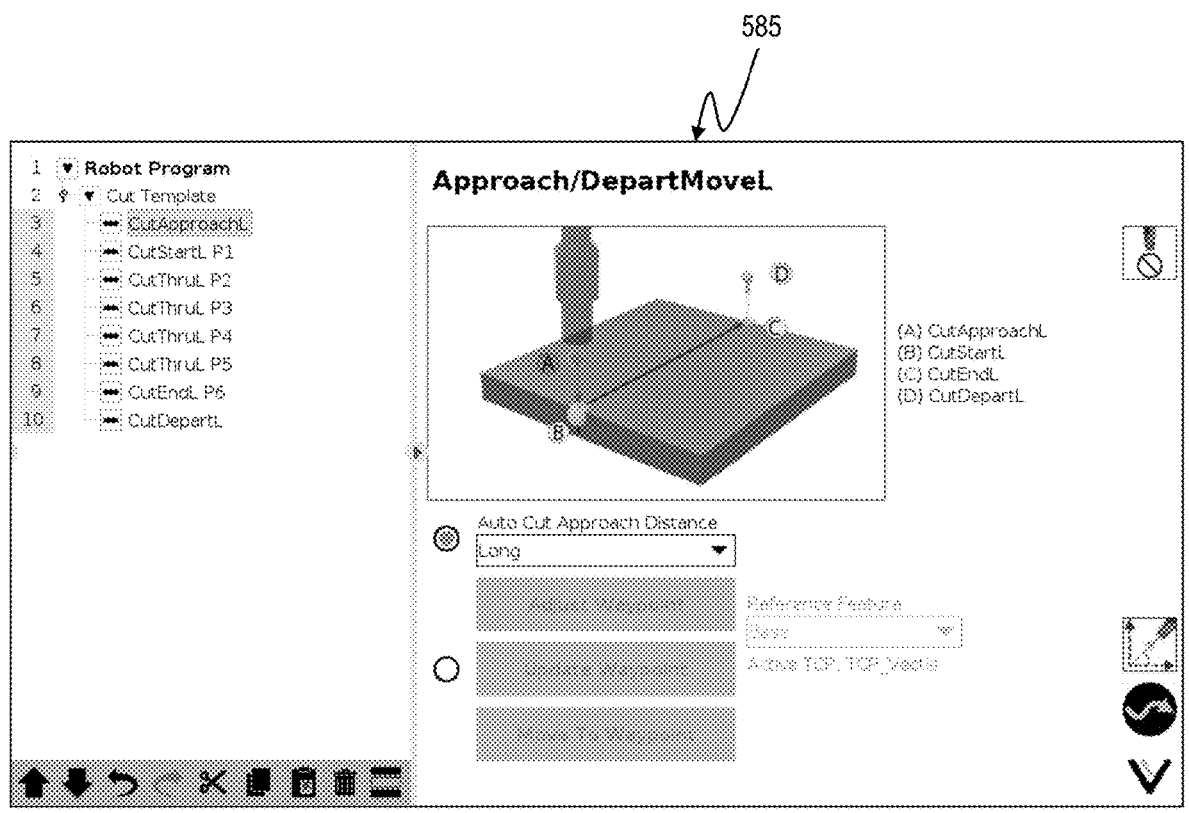
FIG. 41 is a pictorial representation or screen shot of a Cut Template Shape workflow illustrating a cut approach point and distance.
Figure 42:
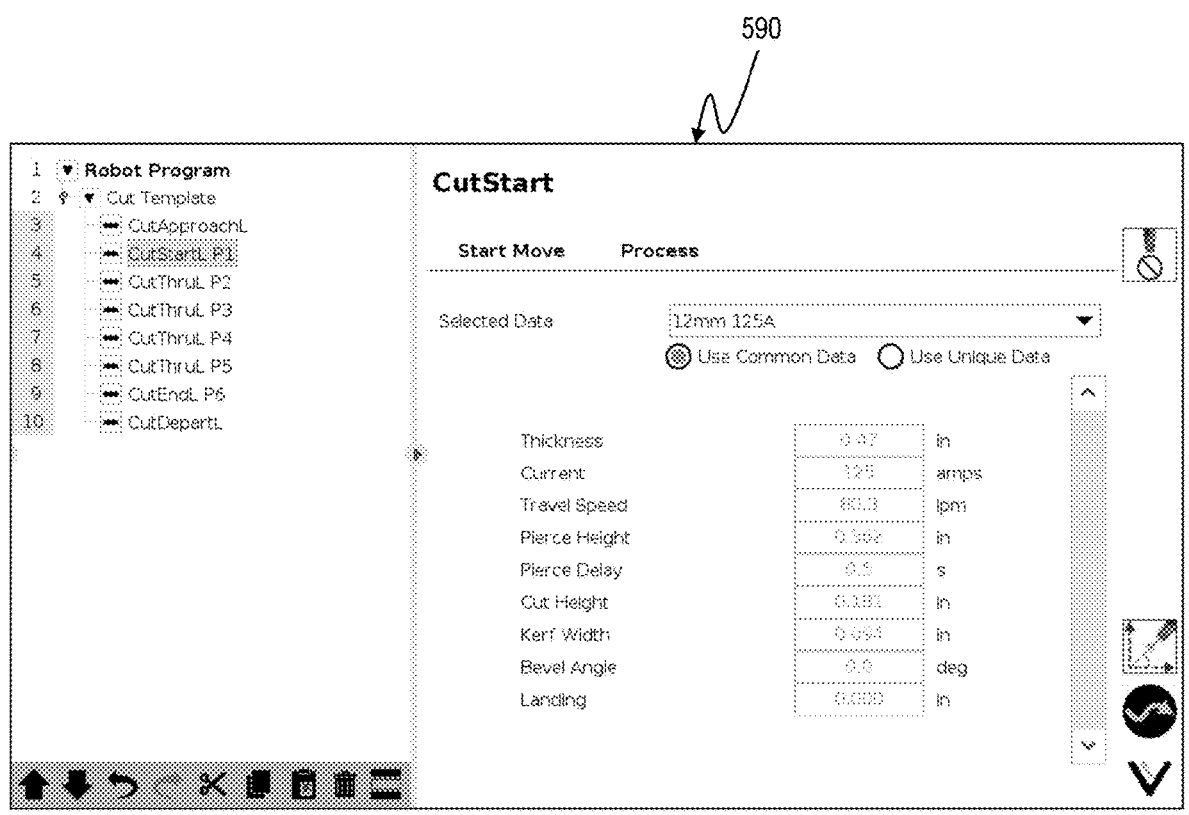
FIG. 42 is a pictorial representation or screen shot of a Cut Template Shape workflow illustrating cut process data.
Figure 43:
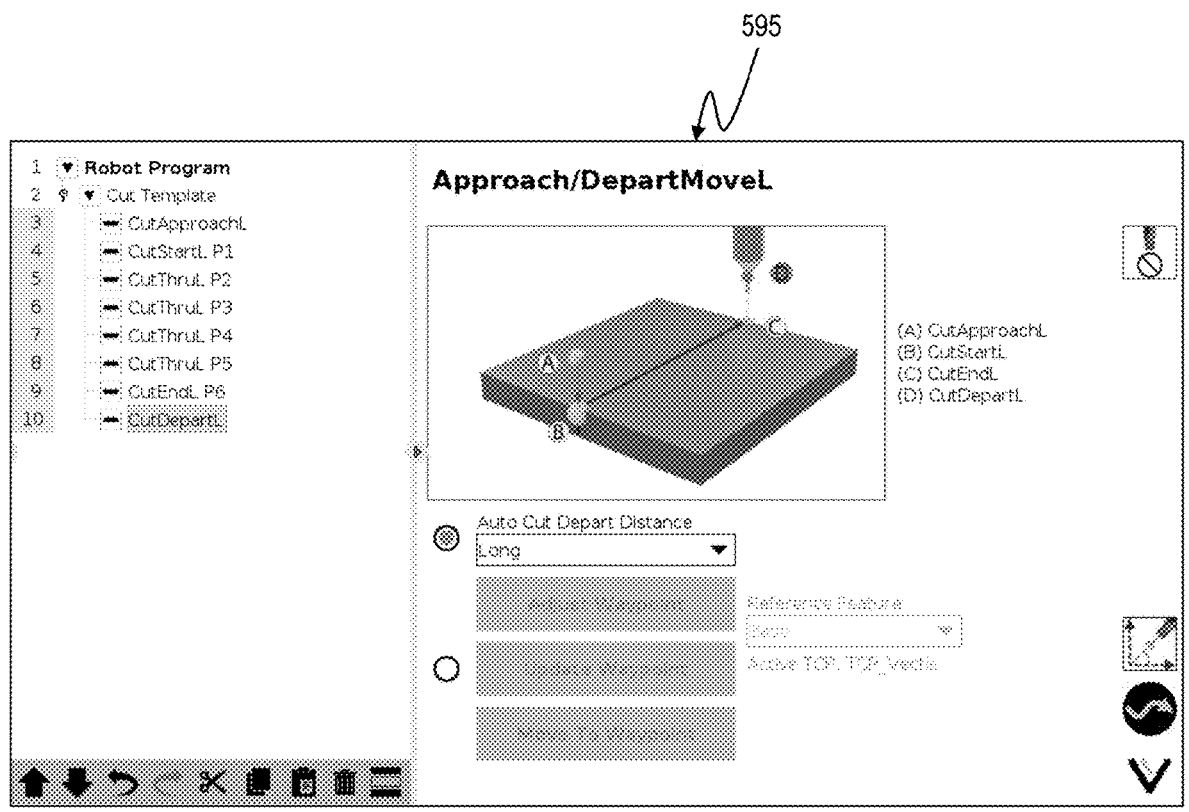
FIG. 43 is a pictorial representation or screen shot of a Cut Template Shape workflow illustrating a cut depart point and distance.
Figure 44:
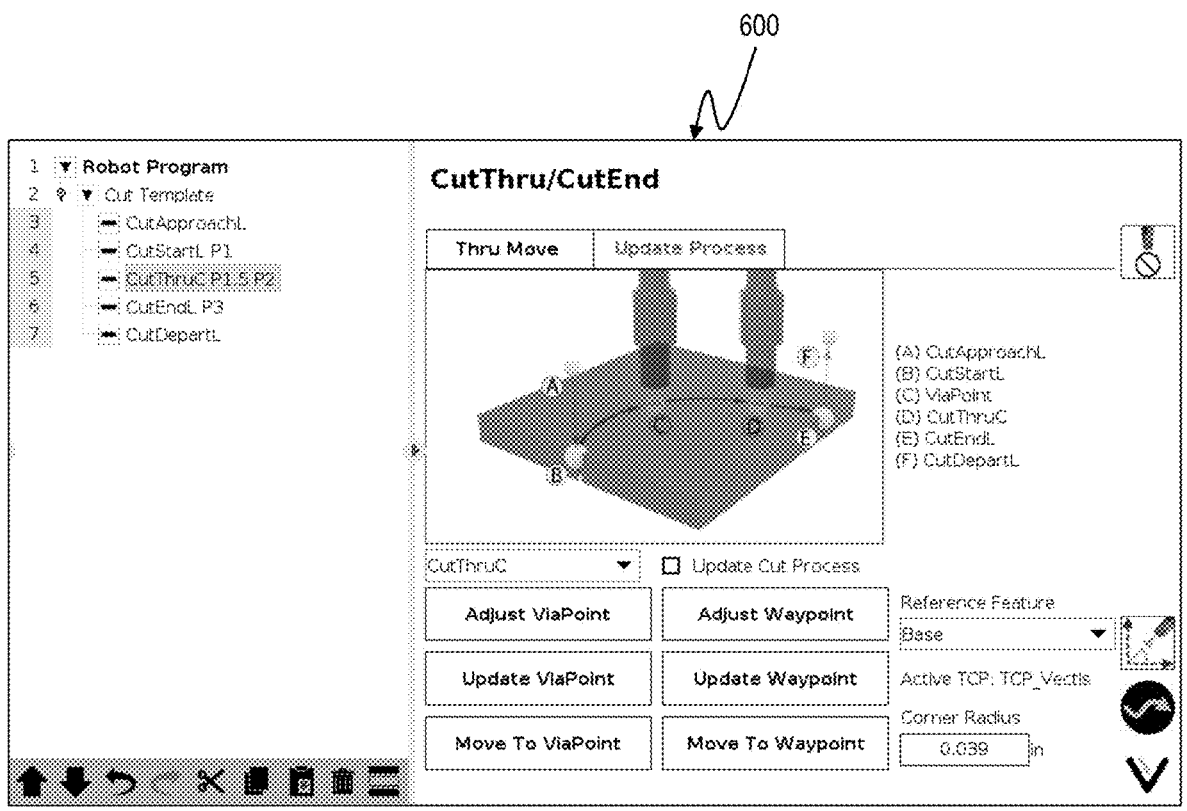
FIG. 44 is a pictorial representation or screen shot of a CutThru/CutEnd Template illustrating a circular cut thru move.
Figure 45:
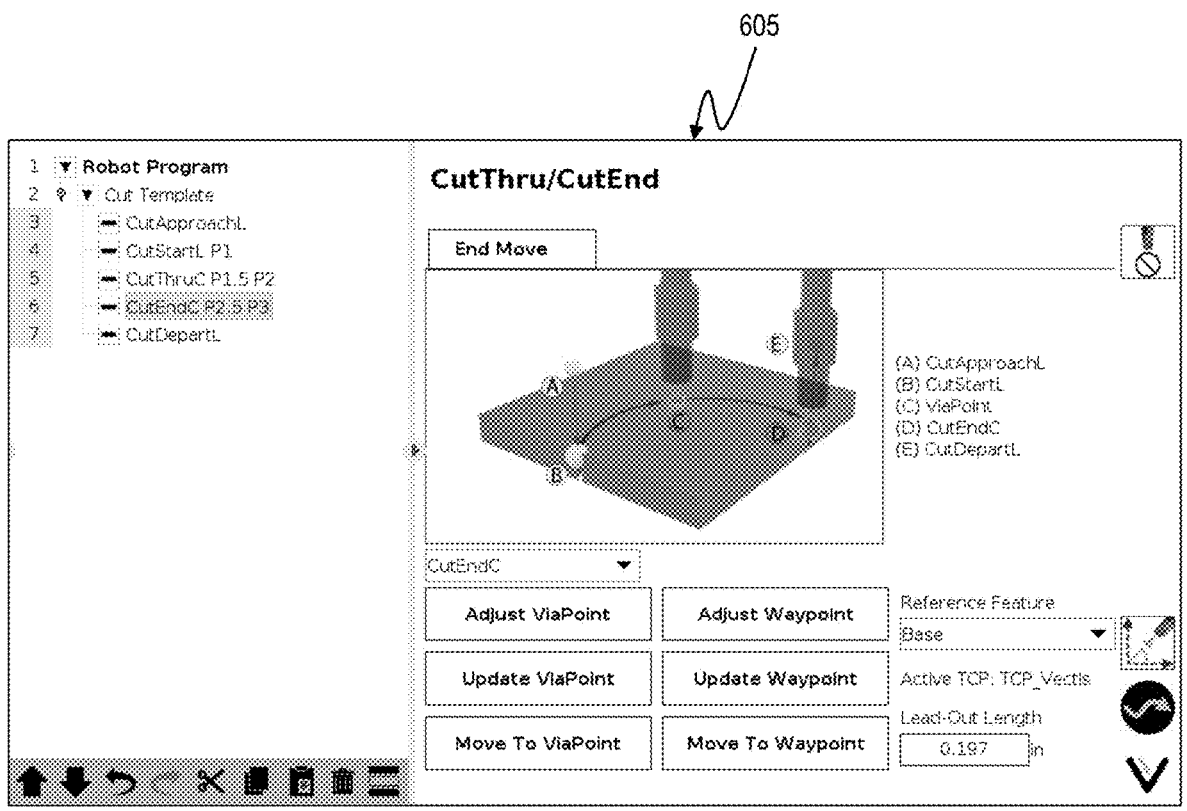
FIG. 45 is a pictorial representation or screen shot of a CutThru/CutEnd Template illustrating a circular cut end move.
Figure 46:
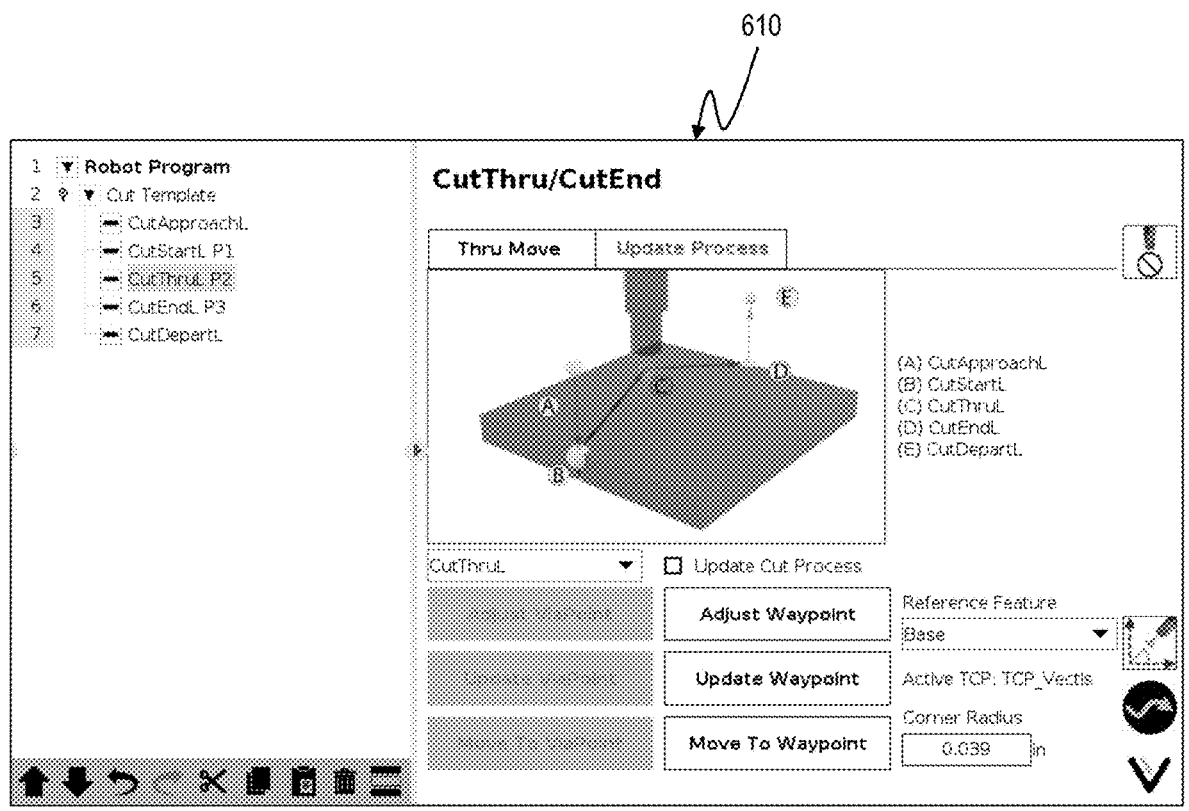
FIG. 46 is a pictorial representation or screen shot of a CutThru/CutEnd Template illustrating a linear cut having at least two segments and a waypoint.

Referring to FIG. 40, screenshot 580, each shape template will have necessary positions that define the center position of the shape as well as the direction of the shape. The ApproachDepart distances are shown in Approach/Depart-MoveL, screenshot 585 as point A, respectively in FIG. 41. FIG. 42, illustrates another CutStart screenshot 590 of a display of cut data such as travel speed, pierce height, pierce delay, cut height, kerf width, and so forth. FIG. 43 is a pictorial representation or screen shot 595 of a Cut Template Shape workflow illustrating a cut depart point and distance CutThru/CutEnd screenshot 600 in FIG. 44 displays through move parameters such as CutApproach, CutStart, ViaPoint, CutThruC, CutEnd and CutDepart as points A through F, respectively for a curved cut path. The CutDepart point D for a curved cut path is shown in the CutThru/CutEnd screenshot 605 in FIG. 45. FIG. 46, screenshot 610 shows through move parameters for a linear cut having at least two segments and having a waypoint at point C. While only selected embodiments have been chosen to illustrate the present invention, it will be apparent to those skilled in the art from this disclosure that various changes and modifications can be made herein without departing from the scope of the invention as defined in the appended claim. Furthermore, the foregoing descriptions of the embodiments according to the present invention are provided for illustration only, and not for the purpose of limiting the invention as defined by the appended claim and its equivalents.

What is claimed is:

1. A collaborative robot cutting system for producing precise structural components from raw work material for application in the assembly, construction, fabrication and/or completion of assembled products, the collaborative robot cutting system comprising:
 a mobile base;
 at least one programmable collaborative robot operatively connected to the mobile base, the programmable collaborative robot including a robot arm, a base operatively connected to the robot arm and adapted to mount the robot arm to the mobile base, and an electrically isolating pad positioned intermediate the base and the mobile base;

a cutting implement operatively connected to the at least one programmable collaborative robot;

a power supply operatively connected to the cutting implement;

a control system; and a safety system adapted to reduce an operating speed of the system in accordance with recognized safety standards in response to conditions detected by the system.

2. The collaborative robot cutting system of claim 1 wherein the at least one programmable collaborative robot comprises a robot arm having a plurality of arm segments sequentially pivotally and/or rotatably interconnected to one another and structured and arranged to have a preselected reach length or distance.

3. The collaborative robot cutting system of claim 2 wherein the at least one programmable collaborative robot includes a safety feature built into the control system and the robot arm, the safety feature being adapted to interrupt movement of the robot arm, should it come in contact with an operator or another object.

4. The collaborative robot cutting system of claim 3 wherein the collaborative robot cutting system operates at a preprogrammed operating speed, the collaborative robot cutting system further including an operator protection safety system adapted to generate one or more non-visible safety zones or barriers surrounding the collaborative robot cutting system, to detect the presence of an object, operator, other personnel or a vehicle in at least one of the one or more safety zones or non-visible safety barriers, and to reduce the operating speed of the collaborative robot cutting system for safety purposes in response to the detection of an object, operator, other personnel or a vehicle in at least one of the one or more safety zones or non-visible safety barriers.

5. The collaborative robot cutting system of claim 4 wherein the mobile base includes a frame and the safety system comprises at least one LIDAR emitter/detector operatively mounted on a lower corner of the frame.

6. The collaborative robot cutting system of claim 5 wherein the frame includes a plurality of supporting legs operatively connected to the frame; a leveling device operatively connected to each of the plurality of supporting legs; a bottom or lower storage platform adapted to stow and transport the cutting system power supply and control system; and an upper gridded work surface or worktable having a plurality of apertures formed therein, each of the apertures being adapted to releasably receive a clamp or other securement device for holding a workpiece, fixture, assembly or raw work material in a fixed position during the performance of a cutting sequence using the cutting system.

7. The collaborative robot cutting system of claim 6 wherein the mobile base and the upper gridded work surface or worktable are adapted to be extended in size for use in the cutting of large metal plates, sheets and piece parts.

8. The collaborative robot cutting system of claim 7 further including an upper cantilever arm or beam operatively connected to the upper gridded work surface or worktable, wherein the cantilever arm or beam is adapted to receive the collaborative robot cutting arm in mounting engagement therewith.

9. The collaborative robot cutting system of claim 8 wherein the cantilever arm or beam.is selectively rotatable about an axis to bring the cutting system to the work without moving the mobile base.

10. The collaborative robot cutting system of claim 9 further including a pivot connection or mounting plate adapted to provide rotatable positioning of the cantilever beam and collaborative robot cutting system over extended radial points above large work material or structures.

11. The collaborative robot cutting system of claim 10 including a retractable pin mechanism including a pin and actuating handle which is urged by a suitable biasing mechanism into locking engagement with one of a plurality of apertures positioned at spaced-apart radial locations on a bottom surface of the mounting plate.

12. The collaborative robot cutting system of claim 10 further including a slewing ring secured to a bottom surface of the mounting plate, a servo motor operatively connected to the frame, and a pinion gear operatively connected to the servo motor and adapted to rotatably engage the slewing ring, whereby the cantilever beam and collaborative robot cutting system are selectively rotated to a desired radial position in response to rotational forces exerted on the slewing ring by the pinion gear.

13. The collaborative robot cutting system of claim 1 wherein the collaborative robot cutting system is operatively connected to the mobile base by a magnetic base.

14. The collaborative robot cutting system of claim 13 further including a cam lock base adapted to connect the collaborative robot cutting system to the magnetic base.

15. The collaborative robot cutting system of claim 14 wherein the magnetic base is releasably positioned at any location suitable for the work material to be cut.

16. The collaborative robot cutting system of claim 13 wherein the magnetic base is releasably positioned at any location suitable for the work material to be cut.

17. A collaborative robot cutting system for producing precise structural components from raw work material for application in the assembly, construction, fabrication and/or completion of assembled products, the collaborative robot cutting system comprising:

at least one programmable collaborative robot;

a cutting implement operatively connected to the at least one programmable collaborative robot;

a power supply operatively connected to the cutting implement;

a control system;

a mobile base, the mobile base including a frame, the frame having a plurality of supporting legs operatively connected thereto, a leveling device operatively connected to each of the plurality of supporting legs, a bottom or lower storage platform adapted to stow and transport the power supply and the control system; and an upper gridded work surface or worktable adapted to be extended in size for use in the cutting of large metal plates, sheets and piece parts, the upper gridded work surface having a plurality of apertures formed therein, each of the apertures being adapted to releasably receive a clamp or other securement device for holding a workpiece, fixture, assembly or raw work material in a fixed position during the performance of a cutting sequence using the cutting system;

an upper cantilever arm or beam operatively connected to the upper gridded work surface or worktable; a pivot connection or mounting plate adapted to operatively connect the upper cantilever arm or beam to the upper gridded work surface or worktable and to provide rotatable positioning of the cantilever arm or beam about an axis over extended radial points above large work material or structures, wherein the cantilever arm or beam.is selectively rotatable to bring the collaborative robot cutting system to the work material without moving the mobile base;

the at least one programmable collaborative robot including a robot arm, a base operatively connected to the robot arm and adapted to mount the robot arm to the upper cantilever arm or beam to the upper gridded work surface, and an electrically isolating pad positioned intermediate the base and the upper cantilever arm or beam;

a retractable pin mechanism including a pin and actuating handle which is urged by a suitable biasing mechanism into locking engagement with one of a plurality of apertures positioned at spaced-apart radial locations on a bottom surface of the pivot connection or mounting plate; and a safety system adapted to reduce an operating speed of the system in accordance with recognized safety standards in response to conditions detected by the system.

18. The collaborative robot cutting system of claim 17 wherein the collaborative robot cutting system operates at a preprogrammed operating speed, the safety system comprising an operator protection safety system adapted to generate one or more non-visible safety zones or barriers surrounding the collaborative robot cutting system, each of the at least one or more non-visible safety zones or barriers being adapted to detect the presence of an object, operator, other personnel or a vehicle in at least one of the one or more safety zones or non-visible safety barriers, and to reduce the operating speed of the collaborative robot cutting system for safety purposes in response to the detection of an object, operator, other personnel or a vehicle in at least one of the one or more safety zones or non-visible safety barriers.

19. The collaborative robot cutting system of claim 17 wherein the control system includes a programming or hand-guided jog button operatively connected to the control system and to a teach pendant, the hand-guided jog button and teach pendant being adapted to allow an operator to set up and program the cutting system in an intuitive and graphical manner.

* * * * *